(12) United States Patent
Wilcox et al.

(10) Patent No.: US 8,390,918 B2
(45) Date of Patent: Mar. 5, 2013

(54) ELECTROPHORETIC DISPLAYS WITH CONTROLLED AMOUNTS OF PIGMENT

(75) Inventors: Russell J. Wilcox, Natick, MA (US); Lan Cao, Arlington, MA (US); Guy M. Danner, Somerville, MA (US); Richard J. Paolini, Jr., Framingham, MA (US); Richard M. Webber, Brookline, MA (US)

(73) Assignee: E Ink Corporation, Cambridge, MA (US)

( * ) Notice: Subject to any disclaimer, the term of this patent is extended or adjusted under 35 U.S.C. 154(b) by 974 days.

(21) Appl. No.: 12/121,211

(22) Filed: May 15, 2008

(65) Prior Publication Data

US 2008/0266245 A1 Oct. 30, 2008

Related U.S. Application Data

(63) Continuation-in-part of application No. 10/837,062, filed on Apr. 30, 2004, now abandoned, which is a continuation-in-part of application No. 11/625,907, filed on Jan. 23, 2007, now Pat. No. 7,679,814, said application No. 12/121,211 is a continuation-in-part (Continued)

(51) Int. Cl.
*G02B 26/00* (2006.01)
(52) U.S. Cl. ........................................................ 359/296
(58) Field of Classification Search .................. 359/296; 345/107; 252/582, 583; 430/32, 34, 38; 204/600, 450
See application file for complete search history.

(56) References Cited

U.S. PATENT DOCUMENTS

| 3,668,106 | A | | 6/1972 | Ota |
| 3,756,693 | A | | 9/1973 | Ota |
| 3,767,392 | A | | 10/1973 | Ota |
| 3,792,308 | A | | 2/1974 | Ota |
| 3,870,517 | A | | 3/1975 | Ota et al. |
| 3,892,568 | A | | 7/1975 | Ota |
| 4,273,422 | A | * | 6/1981 | Saxe .............................. 359/296 |
| 4,418,346 | A | | 11/1983 | Batchelder |
| 5,745,094 | A | | 4/1998 | Gordon, II et al. |
| 5,760,761 | A | | 6/1998 | Sheridon |
| 5,777,782 | A | | 7/1998 | Sheridon |
| 5,808,783 | A | | 9/1998 | Crowley |
| 5,872,552 | A | | 2/1999 | Gordon, II et al. |

(Continued)

FOREIGN PATENT DOCUMENTS

EP 1 099 207 B1 3/2002
EP 1 145 072 B1 5/2003

(Continued)

OTHER PUBLICATIONS

Tuinier et al., "Depletion-induced phase separation in colloid-polymer mixtures", Advances in Colloid and Interface Science, 103, (2003) 1-31.

(Continued)

*Primary Examiner* — Tuyen Tra
(74) *Attorney, Agent, or Firm* — David J. Cole

(57) ABSTRACT

An electrophoretic medium has walls defining a microcavity containing an internal phase. This internal phase comprises electrophoretic particles suspended in a suspending fluid and capable of moving therethrough upon application of an electric field to the electrophoretic medium. The average height of the microcavity differs by not more than about 5 μm from the saturated particle thickness of the electrophoretic particle divided by the volume fraction of the electrophoretic particles in the internal phase.

20 Claims, 21 Drawing Sheets

Related U.S. Application Data of application No. 10/063,236, filed on Apr. 2, 2002, now Pat. No. 7,170,670, said application No. 11/625,907 is a continuation-in-part of application No. 10/711,829, filed on Oct. 7, 2004, now Pat. No. 7,230,750, and a continuation-in-part of application No. 10/708,130, filed on Feb. 9, 2004, now Pat. No. 7,002,728, which is a continuation-in-part of application No. 10/063,803, filed on May 15, 2002, now Pat. No. 6,822,782, said application No. 11/625,907 is a continuation-in-part of application No. 10/905,746, filed on Jan. 19, 2005, now abandoned, said application No. 11/625,907 is a continuation-in-part of application No. 10/907,140, filed on Mar. 22, 2005, now Pat. No. 7,327,511.

(60) Provisional application No. 60/320,158, filed on May 2, 2003, provisional application No. 60/320,169, filed on May 6, 2003, provisional application No. 60/280,951, filed on Apr. 2, 2001, provisional application No. 60/481,486, filed on Oct. 8, 2003, provisional application No. 60/481,572, filed on Oct. 28, 2003, provisional application No. 60/481,574, filed on Oct. 29, 2003, provisional application No. 60/291,081, filed on May 15, 2001, provisional application No. 60/481,920, filed on Jan. 20, 2004, provisional application No. 60/521,010, filed on Feb. 5, 2004, provisional application No. 60/555,529, filed on Mar. 23, 2004, provisional application No. 60/585,879, filed on Jul. 7, 2004.

(56) References Cited

U.S. PATENT DOCUMENTS

| | | | |
|---|---|---|---|
| 5,930,026 | A | 7/1999 | Jacobson et al. |
| 5,961,804 | A | 10/1999 | Jacobson et al. |
| 6,017,584 | A | 1/2000 | Albert et al. |
| 6,054,071 | A | 4/2000 | Mikkelsen, Jr. |
| 6,055,091 | A | 4/2000 | Sheridon et al. |
| 6,067,185 | A * | 5/2000 | Albert et al. ............ 359/296 |
| 6,097,531 | A | 8/2000 | Sheridon |
| 6,118,426 | A | 9/2000 | Albert et al. |
| 6,120,588 | A | 9/2000 | Jacobson |
| 6,120,839 | A | 9/2000 | Comiskey et al. |
| 6,124,851 | A | 9/2000 | Jacobson |
| 6,128,124 | A | 10/2000 | Silverman |
| 6,130,773 | A | 10/2000 | Jacobson et al. |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,172,798 | B1 * | 1/2001 | Albert et al. ............ 359/296 |
| 6,177,921 | B1 | 1/2001 | Comiskey et al. |
| 6,184,856 | B1 | 2/2001 | Gordon, II et al. |
| 6,225,971 | B1 | 5/2001 | Gordon, II et al. |
| 6,232,950 | B1 | 5/2001 | Albert et al. |
| 6,241,921 | B1 | 6/2001 | Jacobson et al. |
| 6,249,271 | B1 | 6/2001 | Albert et al. |
| 6,252,564 | B1 | 6/2001 | Albert et al. |
| 6,262,706 | B1 | 7/2001 | Albert et al. |
| 6,262,833 | B1 | 7/2001 | Loxley et al. |
| 6,271,823 | B1 | 8/2001 | Gordon, II et al. |
| 6,300,932 | B1 | 10/2001 | Albert |
| 6,301,038 | B1 | 10/2001 | Fitzmaurice et al. |
| 6,312,304 | B1 | 11/2001 | Duthaler et al. |
| 6,312,971 | B1 | 11/2001 | Amundson et al. |
| 6,323,989 | B1 | 11/2001 | Jacobson et al. |
| 6,327,072 | B1 | 12/2001 | Comiskey et al. |
| 6,376,828 | B1 | 4/2002 | Comiskey |
| 6,377,387 | B1 | 4/2002 | Duthaler et al. |
| 6,392,785 | B1 | 5/2002 | Albert et al. |
| 6,392,786 | B1 | 5/2002 | Albert |
| 6,413,790 | B1 | 7/2002 | Duthaler et al. |
| 6,422,687 | B1 | 7/2002 | Jacobson |
| 6,445,374 | B2 | 9/2002 | Albert et al. |
| 6,445,489 | B1 | 9/2002 | Jacobson et al. |
| 6,459,418 | B1 | 10/2002 | Comiskey et al. |
| 6,473,072 | B1 | 10/2002 | Comiskey et al. |
| 6,480,182 | B2 | 11/2002 | Turner et al. |
| 6,498,114 | B1 | 12/2002 | Amundson et al. |
| 6,504,524 | B1 | 1/2003 | Gates et al. |
| 6,506,438 | B2 | 1/2003 | Duthaler et al. |
| 6,512,354 | B2 | 1/2003 | Jacobson et al. |
| 6,515,649 | B1 | 2/2003 | Albert et al. |
| 6,518,949 | B2 | 2/2003 | Drzaic |
| 6,521,489 | B2 | 2/2003 | Duthaler et al. |
| 6,531,997 | B1 | 3/2003 | Gates et al. |
| 6,535,197 | B1 | 3/2003 | Comiskey et al. |
| 6,538,801 | B2 | 3/2003 | Jacobson et al. |
| 6,545,291 | B1 | 4/2003 | Amundson et al. |
| 6,580,545 | B2 | 6/2003 | Morrison et al. |
| 6,639,578 | B1 | 10/2003 | Comiskey et al. |
| 6,652,075 | B2 | 11/2003 | Jacobson |
| 6,657,772 | B2 | 12/2003 | Loxley |
| 6,664,944 | B1 | 12/2003 | Albert et al. |
| D485,294 | S | 1/2004 | Albert |
| 6,672,921 | B1 | 1/2004 | Liang et al. |
| 6,680,725 | B1 | 1/2004 | Jacobson |
| 6,683,333 | B2 | 1/2004 | Kazlas et al. |
| 6,693,620 | B1 | 2/2004 | Herb et al. |
| 6,704,133 | B2 | 3/2004 | Gates et al. |
| 6,710,540 | B1 | 3/2004 | Albert et al. |
| 6,721,083 | B2 | 4/2004 | Jacobson et al. |
| 6,724,519 | B1 | 4/2004 | Comiskey et al. |
| 6,727,881 | B1 | 4/2004 | Albert et al. |
| 6,738,050 | B2 | 5/2004 | Comiskey et al. |
| 6,750,473 | B2 | 6/2004 | Amundson et al. |
| 6,753,999 | B2 | 6/2004 | Zehner et al. |
| 6,788,449 | B2 | 9/2004 | Liang et al. |
| 6,816,147 | B2 | 11/2004 | Albert |
| 6,819,471 | B2 | 11/2004 | Amundson et al. |
| 6,822,782 | B2 | 11/2004 | Honeyman et al. |
| 6,825,068 | B2 | 11/2004 | Denis et al. |
| 6,825,829 | B1 | 11/2004 | Albert et al. |
| 6,825,970 | B2 | 11/2004 | Goenaga et al. |
| 6,831,769 | B2 | 12/2004 | Holman et al. |
| 6,839,158 | B2 | 1/2005 | Albert et al. |
| 6,842,167 | B2 | 1/2005 | Albert et al. |
| 6,842,279 | B2 | 1/2005 | Amundson |
| 6,842,657 | B1 | 1/2005 | Drzaic et al. |
| 6,864,875 | B2 | 3/2005 | Drzaic et al. |
| 6,865,010 | B2 | 3/2005 | Duthaler et al. |
| 6,866,760 | B2 | 3/2005 | Paolini, Jr. et al. |
| 6,870,657 | B1 | 3/2005 | Fitzmaurice et al. |
| 6,870,661 | B2 | 3/2005 | Pullen et al. |
| 6,900,851 | B2 | 5/2005 | Morrison et al. |
| 6,906,779 | B2 | 6/2005 | Chan-Park et al. |
| 6,922,276 | B2 | 7/2005 | Zhang et al. |
| 6,950,220 | B2 | 9/2005 | Abramson et al. |
| 6,958,848 | B2 | 10/2005 | Cao et al. |
| 6,967,640 | B2 | 11/2005 | Albert et al. |
| 6,980,196 | B1 | 12/2005 | Turner et al. |
| 6,982,178 | B2 | 1/2006 | LeCain et al. |
| 6,987,603 | B2 | 1/2006 | Paolini, Jr. et al. |
| 6,995,550 | B2 | 2/2006 | Jacobson et al. |
| 7,002,728 | B2 | 2/2006 | Pullen et al. |
| 7,012,600 | B2 | 3/2006 | Zehner et al. |
| 7,012,735 | B2 | 3/2006 | Honeyman et al. |
| 7,023,420 | B2 | 4/2006 | Comiskey et al. |
| 7,030,412 | B1 | 4/2006 | Drzaic et al. |
| 7,030,854 | B2 | 4/2006 | Baucom et al. |
| 7,034,783 | B2 | 4/2006 | Gates et al. |
| 7,038,655 | B2 | 5/2006 | Herb et al. |
| 7,061,663 | B2 | 6/2006 | Cao et al. |
| 7,071,913 | B2 | 7/2006 | Albert et al. |
| 7,075,502 | B1 | 7/2006 | Drzaic et al. |
| 7,075,703 | B2 | 7/2006 | O'Neil et al. |
| 7,079,305 | B2 | 7/2006 | Paolini, Jr. et al. |
| 7,106,296 | B1 | 9/2006 | Jacobson |
| 7,109,968 | B2 | 9/2006 | Albert et al. |
| 7,110,163 | B2 | 9/2006 | Webber et al. |

| Patent/Pub No. | Date | Inventor(s) |
|---|---|---|
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,265,895 B2 | 9/2007 | Miyazaki et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,375,875 B2 | 5/2008 | Whitesides et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,442,587 B2 | 10/2008 | Amundson et al. |
| 7,443,571 B2 | 10/2008 | LeCain et al. |
| 7,453,445 B2 | 11/2008 | Amundson |
| 7,492,339 B2 | 2/2009 | Amundson |
| 7,492,497 B2 | 2/2009 | Paolini, Jr. et al. |
| 7,513,813 B2 | 4/2009 | Paolini, Jr. et al. |
| 7,528,822 B2 | 5/2009 | Amundson et al. |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,551,346 B2 | 6/2009 | Fazel et al. |
| 7,554,712 B2 | 6/2009 | Patry et al. |
| 7,561,324 B2 | 7/2009 | Duthaler et al. |
| 7,583,251 B2 | 9/2009 | Arango et al. |
| 7,583,427 B2 | 9/2009 | Danner et al. |
| 2002/0060321 A1 | 5/2002 | Kazlas et al. |
| 2002/0090980 A1 | 7/2002 | Wilcox et al. |
| 2002/0180687 A1* | 12/2002 | Webber .................. 345/107 |
| 2003/0102858 A1 | 6/2003 | Jacobson et al. |
| 2003/0214697 A1 | 11/2003 | Duthaler et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0180476 A1 | 9/2004 | Kazlas et al. |
| 2004/0190114 A1 | 9/2004 | Jacobson et al. |
| 2004/0263947 A1 | 12/2004 | Drzaic et al. |
| 2005/0001810 A1 | 1/2005 | Yakushiji et al. |
| 2005/0007336 A1 | 1/2005 | Albert et al. |
| 2005/0012980 A1 | 1/2005 | Wilcox et al. |
| 2005/0018273 A1 | 1/2005 | Honeyman et al. |
| 2005/0062714 A1 | 3/2005 | Zehner et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0148088 A1 | 7/2005 | Ong |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0253777 A1 | 11/2005 | Zehner et al. |
| 2005/0259068 A1 | 11/2005 | Nihei et al. |
| 2005/0259312 A1 | 11/2005 | Miyazaki et al. |
| 2005/0270261 A1 | 12/2005 | Danner et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2006/0291034 A1 | 12/2006 | Patry et al. |
| 2007/0013683 A1 | 1/2007 | Zhou et al. |
| 2007/0035532 A1 | 2/2007 | Amundson et al. |
| 2007/0035808 A1 | 2/2007 | Amundson et al. |
| 2007/0052757 A1 | 3/2007 | Jacobson |
| 2007/0057908 A1 | 3/2007 | Jacobson |
| 2007/0069247 A1 | 3/2007 | Amundson et al. |
| 2007/0085818 A1 | 4/2007 | Amundson et al. |
| 2007/0091417 A1 | 4/2007 | Cao et al. |
| 2007/0091418 A1 | 4/2007 | Danner et al. |
| 2007/0097489 A1 | 5/2007 | Doshi et al. |
| 2007/0103427 A1 | 5/2007 | Zhou et al. |
| 2007/0109219 A1 | 5/2007 | Whitesides et al. |
| 2007/0146310 A1 | 6/2007 | Paolini, Jr. et al. |
| 2007/0152956 A1 | 7/2007 | Danner et al. |
| 2007/0153361 A1 | 7/2007 | Danner et al. |
| 2007/0200795 A1 | 8/2007 | Whitesides et al. |
| 2007/0200874 A1 | 8/2007 | Amundson et al. |
| 2007/0211002 A1 | 9/2007 | Zehner et al. |
| 2007/0211331 A1 | 9/2007 | Danner et al. |
| 2007/0223079 A1 | 9/2007 | Honeyman et al. |
| 2007/0247697 A1 | 10/2007 | Sohn et al. |
| 2007/0285385 A1 | 12/2007 | Albert et al. |
| 2007/0286975 A1 | 12/2007 | Fazel et al. |
| 2008/0013155 A1 | 1/2008 | Honeyman et al. |
| 2008/0013156 A1 | 1/2008 | Whitesides et al. |
| 2008/0023332 A1 | 1/2008 | Webber et al. |
| 2008/0024429 A1 | 1/2008 | Zehner |
| 2008/0024482 A1 | 1/2008 | Gates et al. |
| 2008/0030832 A1 | 2/2008 | Paolini, Jr. et al. |
| 2008/0043318 A1 | 2/2008 | Whitesides et al. |
| 2008/0048969 A1 | 2/2008 | Whitesides et al. |
| 2008/0048970 A1 | 2/2008 | Drzaic et al. |
| 2008/0054879 A1 | 3/2008 | LeCain et al. |
| 2008/0057252 A1 | 3/2008 | Danner et al. |
| 2008/0074730 A1 | 3/2008 | Cao et al. |
| 2008/0117495 A1 | 5/2008 | Arango et al. |
| 2008/0129667 A1 | 6/2008 | Zehner et al. |
| 2008/0130092 A1 | 6/2008 | Whitesides et al. |
| 2008/0136774 A1 | 6/2008 | Harris et al. |
| 2008/0137176 A1 | 6/2008 | Isobe et al. |
| 2008/0150888 A1 | 6/2008 | Albert et al. |
| 2008/0165122 A1 | 7/2008 | Duthaler et al. |
| 2008/0174853 A1 | 7/2008 | Danner et al. |
| 2008/0211764 A1 | 9/2008 | Albert et al. |
| 2008/0211765 A1 | 9/2008 | Comiskey et al. |
| 2008/0218839 A1 | 9/2008 | Paolini, Jr. et al. |
| 2008/0254272 A1 | 10/2008 | Danner et al. |
| 2008/0264791 A1 | 10/2008 | Paolini, Jr. et al. |

| | | | |
|---|---|---|---|
| 2008/0266245 | A1 | 10/2008 | Wilcox et al. |
| 2008/0266646 | A1 | 10/2008 | Wilcox et al. |
| 2008/0273132 | A1 | 11/2008 | Hsu et al. |
| 2008/0291129 | A1 | 11/2008 | Harris et al. |
| 2008/0299859 | A1 | 12/2008 | Paolini, Jr. et al. |
| 2008/0309350 | A1 | 12/2008 | Danner et al. |
| 2008/0316582 | A1 | 12/2008 | Danner et al. |
| 2009/0000729 | A1 | 1/2009 | Danner et al. |
| 2009/0004442 | A1 | 1/2009 | Danner |
| 2009/0009852 | A1 | 1/2009 | Honeyman et al. |
| 2009/0027762 | A1 | 1/2009 | Comiskey et al. |
| 2009/0029527 | A1 | 1/2009 | Amundson et al. |
| 2009/0034057 | A1 | 2/2009 | LeCain et al. |
| 2009/0040594 | A1 | 2/2009 | Albert et al. |
| 2009/0046082 | A1 | 2/2009 | Jacobson et al. |
| 2009/0109519 | A1 | 4/2009 | Wu et al. |
| 2009/0109522 | A1 | 4/2009 | Paolini, Jr. et al. |
| 2009/0122389 | A1 | 5/2009 | Whitesides et al. |
| 2009/0168067 | A1 | 7/2009 | LeCain et al. |
| 2009/0174651 | A1 | 7/2009 | Jacobson et al. |
| 2009/0179923 | A1 | 7/2009 | Amundson et al. |
| 2009/0195568 | A1 | 8/2009 | Sjodin |

FOREIGN PATENT DOCUMENTS

| | | |
|---|---|---|
| JP | 62-207375 | 9/1987 |
| JP | 10-258582 | 9/1998 |
| JP | 2000-319301 | 11/2000 |
| JP | 2000-322007 | 11/2000 |
| JP | 2002-250944 | 9/2002 |
| JP | 2002-287176 | 10/2002 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |
| WO | WO 2004/099862 | 11/2004 |

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.
Amundson, K., et al., "Flexible, Active-Matrix Display Constructed Using a Microencapsulated Electrophoretic Material and an Organic-Semiconductor-Based Backplane", SID 01 Digest, 160 (Jun. 2001).
Au, J. et al., "Ultra-Thin 3.1-in, Active-Matrix Electronic Ink Display for Mobile Devices", IDW'02, 223 (2002).
Bach, U., et al., "Nanomaterials-Based Electrochromics for Paper-Quality Displays", Adv. Mater, 14(11), 845 (2002).
Bouchard, A. et al., "High-Resolution Microencapsulated Electrophoretic Display on Silicon", SID 04 Digest, 651 (2004).
Caillot, E. et al. "Active Matrix Electrophoretic Information Display for High Performance Mobile Devices", IDMC Proceedings (2003).
Chen, Y., et al., "A Conformable Electronic Ink Display using a Foil-Based a-Si TFT Array", SID 01 Digest, 157 (Jun. 2001).
Comiskey, B., et al., "An electrophoretic ink for all-printed reflective electronic displays", Nature, 394, 253 (1998).
Comiskey, B., et al., "Electrophoretic Ink: A Printable Display Material", SID 97 Digest (1997), p. 75.
Danner, G.M. et al., "Reliability Performance for Microencapsulated Electrophoretic Displays with Simulated Active Matrix Drive", SID 03 Digest, 573 (2003).
Drzaic, P., et al., "A Printed and Rollable Bistable Electronic Display", SID 98 Digest (1998), p. 1131.
Duthaler, G., et al., "Active-Matrix Color Displays Using Electrophoretic Ink and Color Filters", SID 02 Digest, 1374 (2002).
Gates, H. et al., "A5 Sized Electronic Paper Display for Document Viewing", SID 05 Digest, (2005).
Henzen, A. et al., "An Electronic ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Jacobson, J., et al., "The last book", IBM Systems J., 36, 457 (1997).
Jo, G-R, et al., "Toner Display Based on Particle Movements", Chem. Mater, 14, 664 (2002).
Johnson, M. et al., "High Quality Images on Electronic Paper Displays", SID 05 Digest, 1666 (2005).
Kazlas, P. et al., "Card-size Active-matrix Electronic Ink Display", Eurodisplay 2002, 259 (2002).
Kazlas, P., et al., "12.1" SVGA Microencapsulated Electrophoretic Active Matrix Display for Information Applicances, SID 01 Digest, 152 (Jun. 2001).
Kitamura, T., et al., "Electrical toner movement for electronic paper-like display", Asia Display/IDW '01, p. 1517, Paper HCS1-1 (2001).
O'Regan, B. et al., "A Low Cost, High-efficiency Solar Cell Based on Dye-sensitized colloidal $TiO_2$ Films", Nature, vol. 353, Oct. 24, 1991, 773-740.
Pitt, M.G., et al., "Power Consumption of Microencapsulated Electrophoretic Displays for Smart Handheld Applications", SID 02 Digest, 1378 (2002).
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), 24 (Mar. 2002).
Yamaguchi, Y., et al., "Toner display using insulative particles charged triboelectrically", Asia Display/IDW '01, p. 1729, Paper AMD4-4 (2001).
Zehner, R. et al., "Drive Waveforms for Active Matrix Electrophoretic Displays", SID 03 Digest, 842 (2003).

* cited by examiner

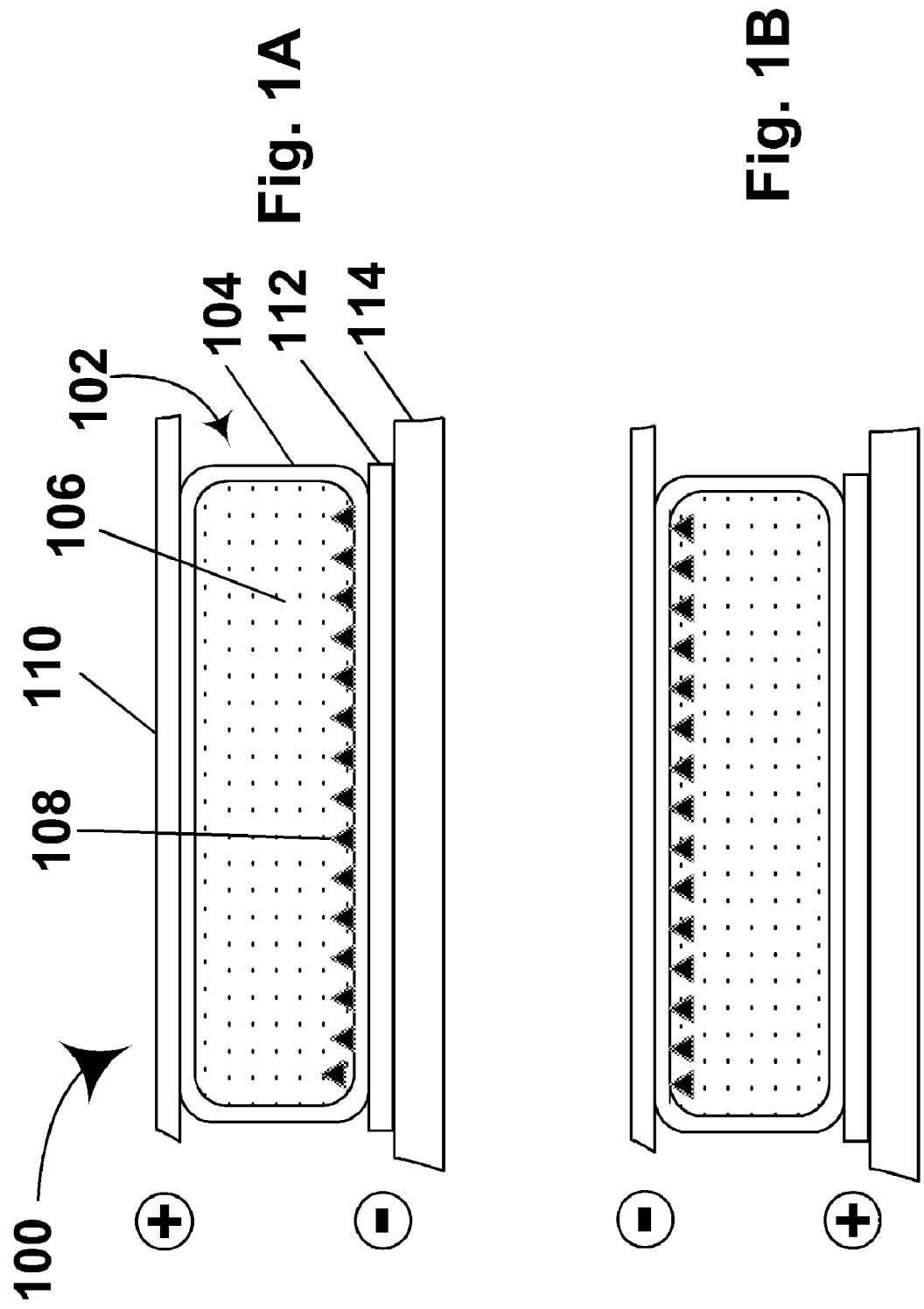

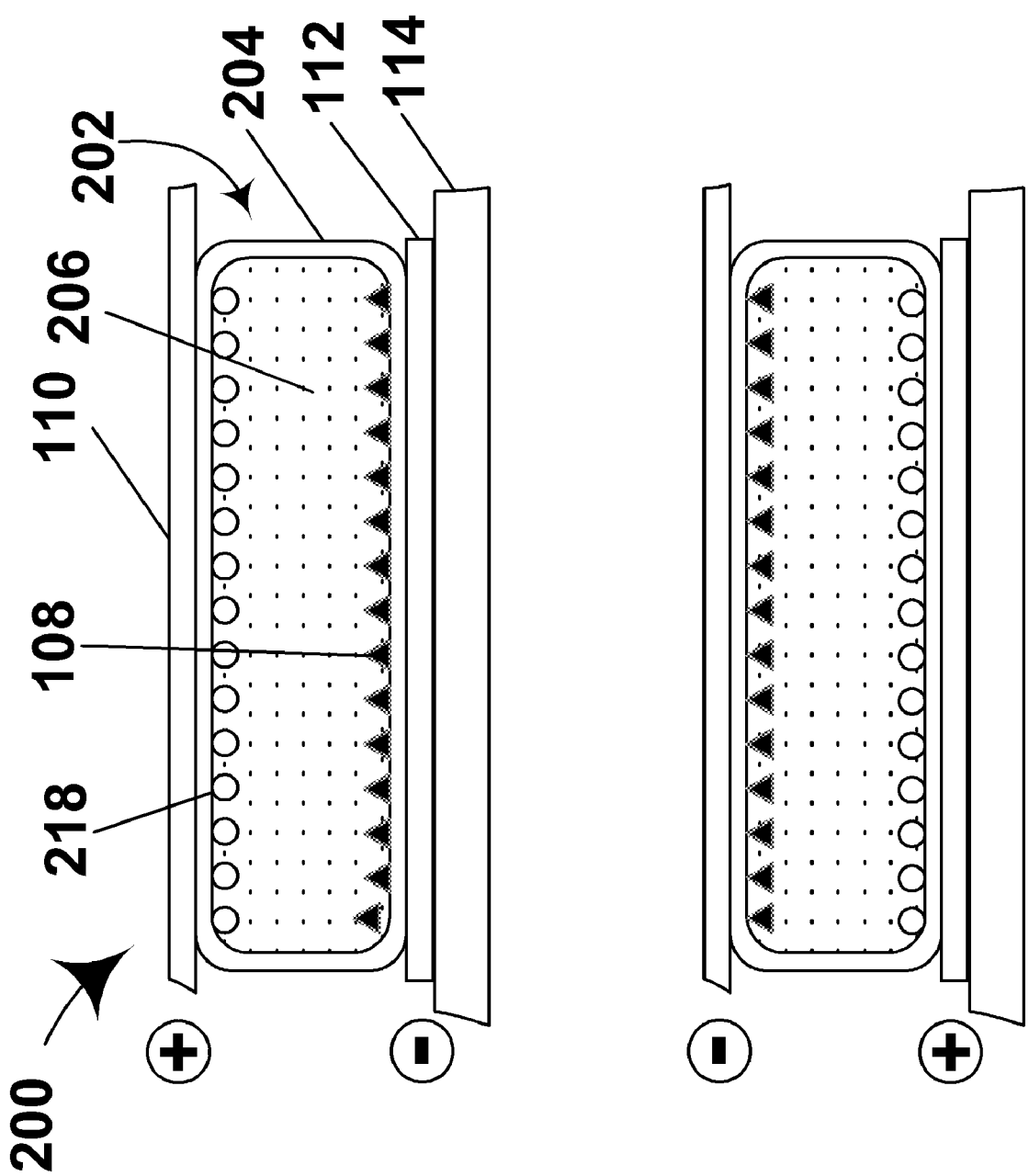

ELECTROPHORETIC DISPLAYS WITH CONTROLLED AMOUNTS OF PIGMENT

REFERENCE TO RELATED APPLICATIONS

This application is a continuation-in-part of copending application Ser. No. 10/837,062, filed Apr. 30, 2004 (Publication No. 2005/0012980), which claims benefit of Provisional Application Ser. No. 60/320,158, filed May 2, 2003, and of Provisional Application Ser. No. 60/320,169, filed May 6, 2003.

This application is also a continuation-in-part of copending application Ser. No. 11/625,907, filed Jan. 23, 2007 (Publication No. 2007/0146310). Application Ser. No. 11/625,907 is itself a continuation-in-part of application Ser. No. 10/063, 236, filed Apr. 2, 2002 (now U.S. Pat. No. 7,170,670, issued Jan. 30, 2007), which claims benefit of Application Ser. No. 60/280,951, filed Apr. 2, 2001. Application Ser. No. 11/625, 907 is also a continuation-in-part of application Ser. No. 10/711,829, filed Oct. 7, 2004 (now U.S. Pat. No. 7,230,750, issued Jun. 12, 2007), which claims benefit of Application Ser. No. 60/481,486, filed Oct. 8, 2003; Application Ser. No. 60/481,572, filed Oct. 28, 2003; and Application Ser. No. 60/481,574, filed Oct. 29, 2003. Application Ser. No. 10/711, 829 is also a continuation-in-part of application Ser. No. 10/708,130, filed Feb. 9, 2004 (now U.S. Pat. No. 7,002,728, issued Feb. 21, 2006), which itself is a continuation-in-part of application Ser. No. 10/063,803 filed May 15, 2002 (now U.S. Pat. No. 6,822,782, issued Nov. 23, 2004), which claims benefit of Application Ser. No. 60/291,081, filed May 15, 2001. Application Ser. No. 11/625,907 is also a continuation-in-part of copending application Ser. No. 10/905,746, filed Jan. 19, 2005 (Publication No. 2005/0156340), which claims benefit of Application Ser. No. 60/481,920, filed Jan. 20, 2004 and Application Ser. No. 60/521,010, filed Feb. 5, 2004. Application Ser. No. 11/625,907 is also a continuation-in-part of application Ser. No. 10/907,140, filed Mar. 22, 2005 (now U.S. Pat. No. 7,327,511, issued Feb. 5, 2008), which claims benefit of Application Ser. No. 60/555,529, filed Mar. 23, 2004 and Application Ser. No. 60/585,879, filed Jul. 7, 2004.

This application is also related to:
(a) U.S. Pat. No. 7,116,466; and
(b) copending application Ser. No. 11/162,188, filed Aug. 31, 2005 (Publication No. 2006/0038772), which claims benefit of Application Ser. No. 60/605,761, filed Aug. 31, 2004.

The entire contents of these patents and copending applications, and of all other U.S. patents and published and copending applications mentioned below, are herein incorporated by reference.

BACKGROUND OF INVENTION

This invention relates to electrophoretic displays containing controlled amounts of pigment. This invention also relates to an electrophoretic medium with improved image stability, and more specifically, to an electrophoretic medium and display which allow improved image stability without unacceptable increases in the switching time or the drive voltage of the display.

Particle-based electrophoretic displays have been the subject of intense research and development for a number of years. In this type of display, a plurality of charged particles move through a suspending fluid under the influence of an electric field. Electrophoretic displays can have attributes of good brightness and contrast, wide viewing angles, state bistability, and low power consumption when compared with liquid crystal displays. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. In practice, some electrophoretic displays, including some of the displays of the present invention, are capable of achieving multiple gray states, and, as demonstrated below, are stable not only in their extreme black and white optical states, but also in their intermediate gray states. Although such displays should properly be described as "multi-stable" rather than "bistable", the latter term may be used herein for convenience.) The optical property which is changed by application of an electric field is typically color perceptible to the human eye, but may alternatively or in addition, be any one or more of reflectivity, retroreflectivity, luminescence, fluorescence, phosphorescence, or color in the broader sense of meaning a difference in absorption or reflectance at non-visible wavelengths. Problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; 7,223,672; 7,230,750; 7,230,751; 7,236,790; 7,236,792; 7,242,513; 7,247,379; 7,256,766; 7,259,744; 7,280,094; 7,304,634; 7,304,787; 7,312,784; 7,312,794; 7,312,916; 7,237,511; 7,339,715; 7,349,148; 7,352,353;

7,365,394; and 7,365,733; and U.S. Patent Applications Publication Nos. 2002/0060321; 2002/0090980; 2003/0102858; 2003/0151702; 2003/0222315; 2004/0105036; 2004/0112750; 2004/0119681; 2004/0155857; 2004/0180476; 2004/0190114; 2004/0257635; 2004/0263947; 2005/0000813; 2005/0007336; 2005/0012980; 2005/0018273; 2005/0024353; 2005/0062714; 2005/0099672; 2005/0122284; 2005/0122306; 2005/0122563; 2005/0134554; 2005/0151709; 2005/0152018; 2005/0156340; 2005/0179642; 2005/0190137; 2005/0212747; 2005/0253777; 2005/0280626; 2006/0007527; 2006/0038772; 2006/0139308; 2006/0139310; 2006/0139311; 2006/0176267; 2006/0181492; 2006/0181504; 2006/0194619; 2006/0197737; 2006/0197738; 2006/0202949; 2006/0223282; 2006/0232531; 2006/0245038; 2006/0262060; 2006/0279527; 2006/0291034; 2007/0035532; 2007/0035808; 2007/0052757; 2007/0057908; 2007/0069247; 2007/0085818; 2007/0091417; 2007/0091418; 2007/0109219; 2007/0128352; 2007/0146310; 2007/0152956; 2007/0153361; 2007/0200795; 2007/0200874; 2007/0201124; 2007/0207560; 2007/0211002; 2007/0211331; 2007/0223079; 2007/0247697; 2007/0285385; 2007/0286975; 2007/0286975; 2008/0013155; 2008/0013156; 2008/0023332; 2008/0024429; 2008/0024482; 2008/0030832; 2008/0043318; 2008/0048969; 2008/0048970; 2008/0054879; 2008/0057252; and 2008/0074730; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Hereinafter, the term "microcavity electrophoretic display" will be used to cover both encapsulated and microcell electrophoretic displays.

Known microcavity electrophoretic displays can be divided into two main types, referred to hereinafter for convenience as "single particle" and "dual particle" respectively. A single particle medium has only a single type of electrophoretic particle suspended in a colored medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode, so that the particles are hidden by the colored suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles are black and the other type white. If the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility, will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid to sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Certain of the aforementioned E Ink and MIT patents and applications describe electrophoretic media which have more than two types of electrophoretic particles within a single capsule. For present purposes, such multi-particle media are regarded as a sub-class of dual particle media.

Both single and dual particle electrophoretic displays may be capable of intermediate gray states having optical characteristics intermediate the two extreme optical states already described.

Microcavity electrophoretic displays may have microcavities of any suitable shape; for example, several of the aforementioned E Ink and MIT patents and applications (see especially U.S. Pat. Nos. 6,067,185 and 6,392,785) describe encapsulated electrophoretic displays in which originally-spherical capsules are flattened so that they have substantially the form of oblate ellipsoids. When a large number of such oblate ellipsoidal capsules are deposited upon a substrate, the walls of the capsules may contact one another, until the capsules approach a close-packed condition in which the walls of adjacent capsules are flattened against one another so that the capsules assume substantially the form of polygonal prisms. In theory, in a close-packed layer of capsules, the individual capsules would have the form of hexagonal prisms, and indeed micrographs of some encapsulated electrophoretic media show a close approach to this condition. However, more typically the individual capsules have substantially the form of irregular polygonal prisms. In polymer-dispersed encapsulated electrophoretic media, there are of course no individual capsules, but the droplets of internal phase may assume forms similar to the capsule forms already discussed.

Thus, microcavities in microcavity electrophoretic displays may be irregular. The following discussion will consider microcavities in a laminar film having substantial dimensions in a plane considered as having X and Y axes, and a much smaller dimension perpendicular to this plane, this dimension being denoted the Z axis. The average internal height of the microcavity along the Z axis will be denoted the "internal phase height" or "IP height" of the microcavity. The average area parallel to the XY plane of the microcavity (averaged along the Z axis) excluding capsule or cavity walls will be denoted the "IP area", while the corresponding average area including the capsule or cavity walls will be denoted the "capsule area". The maximum diameter parallel to the XY plane of the microcavity at any height excluding capsule or cavity walls will be denoted the "IP diameter", while the corresponding average diameter including the capsule or cavity walls will be denoted the "capsule diameter".

It has long been known that, to optimize the optical performance of electrophoretic and other electro-optic displays, it is desirable to maximize the active fraction of the display area, i.e., the fraction of the display area which can change optical state when an electric field is applied to the electro-optic medium. Inactive areas of the display, such as the black masks often used in liquid crystal displays, and the area occupied by capsule or microcavity walls in microcavity electrophoretic displays, do not change optical state when an electric field is applied, and hence reduce the contrast between the extreme optical states of the display. However, there is relatively little consideration in the published literature relating to other parameters affecting the optical performance of electrophoretic displays, and in particular the amount of pigment needed in the electrophoretic medium. This may be due, in part, to the fact that most electrophoretic displays discussed in the literature have been single particle electrophoretic displays, and in such displays the limiting factor on the thickness of the electrophoretic medium is normally the optical density of the dye in the suspending fluid, and not the amount of pigment present. This is not the case with dual particle electrophoretic displays, and may not be the case with single particle displays using dyes with optical densities higher than those used in most prior art electrophoretic displays.

It has now been found that the optical performance of electrophoretic displays is substantially affected by variations in the amount of pigment present in the electrophoretic medium, the IP height of the medium, and the pigment loading of the internal phase (i.e., the proportion of the volume of the internal phase which is comprised of pigment), and this invention relates to electrophoretic media and displays in which the relationships among these various parameters are controlled so as to improve, and desirably to optimize, the optical performance of the media and displays.

Although as already mentioned, electrophoretic displays exhibit bistability, this bistability is not unlimited, and images on the display slowly fade with time, so that if an image is to be maintained for extended periods, the image must be refreshed periodically (and the intervals at which such refreshing is necessary is a convenient quantitative measure of image stability). Also, in many systems which lack image stability, it is necessary to apply so-called "blanking pulses" at regular intervals; such blanking pulses involve first driving all the pixels of the display to one optical state (for example, a white state), then driving all the pixels to the opposite optical state (for example, black), and then writing the desired image. Since such refreshing and blanking of the display inherently consumes energy, and the blanking pulses are distracting for a user who is trying to concentrate on an image, it is desirable to minimize such refreshing and blanking, that is to say, to increase the bistability of the display so that the intervals between refreshing and/or blanking of the image can be increased, and the power consumption of the display thus reduced. For example, one potential application of electrophoretic displays is in personal digital assistants (PDA's) where the inherent size and weight limitations of the device, and the need for the screen to be visible under a wide variety of lighting conditions, render low power consumption and reflective mode of electrophoretic displays very attractive. It is common for the user of a PDA to keep a single image, such as a list of telephone numbers, on the screen for an extended period, and in order to keep the energy consumption of the PDA and distractions to the user to an absolute minimum, it is desirable that this be achievable without the need for any refreshing or blanking of the display during this extended period.

It has been found that the main factor limiting image stability in electrophoretic displays of the types described in the aforementioned patents and applications is settling of the electrophoretic pigment particles under gravity. Since the rate of such settling is to a first approximation inversely proportional to the viscosity of the liquid phase in which the pigment particles are suspended, the stability of the image can be increased by increasing the viscosity of the liquid phase. Unfortunately, as is well known to those skilled in the technology of electrophoretic displays, the electrophoretic mobility of the pigment particles (the rate at which the particles move through the liquid phase under a given electric field) is also inversely proportional to the viscosity of the liquid phase, and thus the switching time of the display (the time required to change a given pixel of the display from one of its optical states to the other essentially the time necessary for the pigment particles to move through the thickness of the liquid medium) is directly proportional to the viscosity of the liquid medium. Accordingly, although it is well within the level of skill in the art to vary the viscosity of the liquid medium over a wide range, it has hitherto appeared that any chosen viscosity necessarily represents a compromise, in that increasing the viscosity will increase image stability at the cost of increased switching time. Furthermore, especially in the case of small displays such as PDA displays where it may be necessary to move through several "pages" or screens of information to find a desired datum, users will not tolerate switching times substantially in excess of about 1 second. (Although it is possible to counteract an increase in switching time due to increased viscosity of the suspending fluid by increasing the drive voltage applied to the display, this brings its own set of problems. Increasing the drive voltage necessarily increases the energy consumption of each driving pulse, and may increase the complexity and cost of the electronic circuitry required to control the driving pulses. Furthermore, in many battery-driven devices, it is not practicable to increase the driving voltage above certain limits.) Thus, it has hitherto appeared that the maximum image stability which can be achieved in a PDA or similar electrophoretic display is limited to a value which is substantially lower than is desirable for energy conservation purposes.

It has now been found that the addition of certain polymers to the suspending fluid used in electrophoretic displays provides an increase in image stability greater than can be accounted for by the increase in viscosity of the fluid caused by the addition of the polymer. Accordingly, the use of these polymers in the suspending fluid allows for substantial increases in image stability without excessive increase in the switching time of the display.

SUMMARY OF INVENTION

Accordingly, this invention provides an electrophoretic medium having walls defining at least one microcavity containing an internal phase, this internal phase comprising a plurality of at least one type of electrophoretic particle suspended in a suspending fluid and capable of moving therethrough upon application of an electric field to the electrophoretic medium, the average height of the at least one microcavity differing by not more than about 5 µm from the saturated particle thickness of the electrophoretic particle divided by the volume fraction of the electrophoretic particles in the internal phase.

The term "saturated particle thickness" of electrophoretic particles in a microcavity is used herein to denote the thickness of the layer of particles which would be formed over the IP area of the microcavity using an internal phase containing just sufficient electrophoretic particles that, if application of a specific electric field to the medium for a time T suffices to switch the electrophoretic medium between its extreme optical states, variations in the time of application of this specific electric field within the range of 0.95 to 1.05 T will not change the optical properties of either extreme state of the electrophoretic medium by more than 2 units of L*, where L* has the usual CIE definition:

$$L^* = 116(R/R_0)^{1/3} - 16,$$

where R is the reflectance and $R_0$ is a standard reflectance value). This saturated particle thickness is calculated without regard to packing factors; in other words, the saturated particle thickness is the hypothetical thickness of the layer which would be formed over the IP area if the electrophoretic particles formed a completely solid layer, without voids, over this area. For example, if an electrophoretic medium has an IP height of 50 µm and contains 10 percent by volume of electrophoretic particles, its saturated particle thickness is 5 µm. As will readily be apparent to those familiar with the packing of multi-particle layers, this thickness does not correspond to the actual thickness of the layer of particles formed when all the particles are driven to one end surface of the microcavity, since inevitably this particle layer will contain a substantial volume fraction of voids. For the sake of simplicity, suppose the electrophoretic medium comprises spherical particles of essentially uniform diameter which form an essentially close-packed layer. Since the packing fraction for close-packed uniform spheres is approximately 0.64, the actual thickness of the layer formed on one end surface of the microcavity will be about 5/0.64 or 7.8 µm.

In preferred forms of the present invention, variations in the time of application of this specific electric field within the range of 0.9 to 1.1 T will not change the optical properties of either extreme state of the electrophoretic medium by more than 2 units of L*, and in especially preferred forms of the invention variations in the time of application of this specific electric field within the range of 0.8 to 1.2 T will not change the optical properties of either extreme state of the electrophoretic medium by more than 2 units of L*.

The saturated particle thickness is typically between about 1 and about 5 µm, and desirably between about 1.5 and about 2.5 µm. The volume fraction of electrophoretic particles in the internal phase (i.e., the fraction of the volume of the internal phase occupied by the electrophoretic particles) is typically from 3 to 40 percent, and desirably in the range to 6 to 18 percent.

The electrophoretic medium of the present invention may be of any of the types described above. Thus, the electrophoretic medium may be a single particle medium comprising a single type of electrophoretic particle in a colored suspending fluid. Alternatively, the electrophoretic medium may be a dual particle medium comprising a first type of electrophoretic particle having a first optical characteristic and a first electrophoretic mobility and a second type of electrophoretic particle having a second optical characteristic different from the first optical characteristic and a second electrophoretic mobility different from the first electrophoretic mobility. In such a dual particle medium, the suspending fluid may be uncolored. The electrophoretic medium may be of the microcell type, in which the electrophoretic particles and the suspending fluid are retained within a plurality of cavities formed within a carrier medium. Alternatively, the electrophoretic medium may be an encapsulated electrophoretic medium, in which the electrophoretic particles and the suspending fluid are held within a plurality of capsules.

One type of display in which the present invention may be especially useful is the so-called "shutter mode" microcavity display. A shutter mode microcavity display is a microcavity display having one "opaque" optical state in which the display (or any given pixel thereof) displays the color or other optical characteristic of an electrophoretic particle, and a second optical state in the which the electrophoretic medium or pixel thereof is light-transmissive. Such a shutter mode display may be of the single or dual particle type, and may have more than the two specified optical states; for example, a dual particle shutter mode display using black and white electrophoretic particles, may have a black opaque state, a white opaque state and a light-transmissive state. The light-transmissive state of a shutter mode display is typically produced by confining the electrophoretic particles in a minor proportion of the cross-sectional area of each microcavity so that light is free to pass through the major proportion of this cross-sectional area. The confinement of the electrophoretic particles to the minor proportion of the cross-sectional area may be effected by using a shaped microcavity (see, for example, the aforementioned U.S. Pat. Nos. 6,130,774 and 6,172,798), by placement of electrodes in specific positions relative to the microcavity (see, for example, the aforementioned U.S. Pat. No. 7,170,670 and Japanese Published Patent Applications Nos. 2002-174828 and 2001-356374), or by dielectrophoretic driving of the electrophoretic particles (see, for example, U.S. Pat. No. 7,259,744).

Although the second optical state of a shutter mode display has been referred to above as "light-transmissive", a shutter mode display may incorporate a colored or uncolored reflector adjacent the microcavity medium and on the opposed side thereof from that normally by an observer (this opposed surface hereinafter for convenience being referred to as the "rear surface" of the microcavity medium) so that (as described for example in the aforementioned U.S. Pat. No. 7,259,744) the light-transmissive optical state of the display actually displays the color (if any) of the reflector. In particular, an advantageous form of color microcavity display may be formed by providing a backplane having a plurality of pixel electrodes, forming a color filter or reflector on the backplane, and then forming a layer of a shutter mode microcavity medium over the color filter or reflector. A microcell medium might be formed by photolithographic techniques, by forming a layer of photoresist over the color filter, and exposing and developing in the conventional manner to form cells walls separating a plurality of microcells. Alternatively, a layer, typically a polymer layer, might be provided over the color filter and microcavities formed mechanically therein, or a preformed layer containing microcavities provided over the color filter. In either case, the microcavities formed can be filled with an electrophoretic mixture (electrophoretic particles plus suspending fluid) and sealed.

Regardless of the exact method used for its manufacture and the exact type of electrophoretic medium employed, this type of color shutter mode display has the advantages that positioning the color filter with respect to the pixel electrodes is simplified, since the pixel electrodes are readily visible during formation or attachment of the filter, and, more importantly, that the positioning of the color filter adjacent the pixel electrodes avoids visible artifacts which may occur due to parallax when a color filter substantially separated from a backplane (for example, a color filter on the opposed side of the electrophoretic medium from the backplane) is viewed off-axis.

One problem with such shutter mode microcavity displays is ensuring good contrast ratio, since even in the light-transmissive optical state of such a shutter mode display, the minor proportion of each microcavity occupied by the electrophoretic particles still displays the color of those particles (or a mixture of the relevant colors, in the case of a dual particle display), and this continuing display of the color of the electrophoretic particles reduces the contrast ratio. The present invention enables one to control the amount of electrophoretic particles needed in a microcavity display, thus minimizing the proportion of each microcavity occupied by the electrophoretic particles in the light-transmissive state of the display and maximizing the contrast ratio, while still providing sufficient electrophoretic particles to ensure good optical properties in the first optical state of the display.

A preferred white electrophoretic particle for use in the present electrophoretic media comprises titania ($TiO_2$). If the electrophoretic medium is of the dual particle type, it may further comprise dark colored particles formed from carbon black or copper chromite, the dark colored particles formed from carbon black or copper chromite and having an electrophoretic mobility different from the electrophoretic mobility of the titania particles.

Useful embodiments of the present invention may have an IP height between about 10 and about 30 µm and a volume fraction of electrophoretic particles of between about 3 and about 15 percent. Preferred embodiments have an IP height between about 12 and about 25 µm and a volume fraction of electrophoretic particles of between about 5 and about 12 percent. The viscosity of the internal phase is typically less than about 5 mPa sec, and typically greater than about 1 mPa sec.

The suspending fluid used in the electrophoretic media of the present invention may have dissolved or dispersed therein a polymer having a number average molecular weight in excess of about 20,000, the polymer being essentially non-absorbing on the electrophoretic particles. When, as is commonly the case, the suspending fluid is a hydrocarbon, the polymer may be a polyisobutylene having a viscosity average molecular weight in the range of about 400,000 to 1,200,000 g/mole, the polyisobutylene comprising from about 0.25 to about 2.5 percent by weight of the suspending fluid.

Alternatively, the suspending fluid used in the electrophoretic media of the present invention may have dissolved or dispersed therein a polymer having an intrinsic viscosity of $\eta$ in the suspending fluid and being substantially free from ionic or ionizable groups in the suspending fluid, the polymer being present in the suspending fluid in a concentration of from about 0.5 $[\eta]^{-1}$ to about 2.0 $[\eta]^{-1}$.

This invention extends to an electrophoretic display comprising an electrophoretic medium of the present invention and at least one electrode disposed adjacent the electrophoretic medium and arranged to apply an electric field thereto. Typically, such an electrophoretic display will have a rear electrode structure having a plurality of electrodes arranged to apply an electric field to the electrophoretic medium.

In another aspect, this invention provides an electrophoretic suspension intended for use in an electrophoretic display and comprising more than about 5 percent by weight of white particles, the suspension having a viscosity of from about 2 to about 7 mPa sec.

This electrophoretic suspension of the present invention may include any of the preferred features of the electrophoretic medium of the present invention, as already described.

BRIEF DESCRIPTION OF DRAWINGS

Preferred embodiments of the invention will now be described, though by way of illustration only, with reference to the accompanying drawings, in which:

FIGS. 1A and 1B are schematic cross-sections through a first electrophoretic display of the present invention in which the electrophoretic medium comprises a single type of particle in a colored suspending fluid;

FIGS. 2A and 2B are schematic cross-sections, generally similar to those of FIGS. 1A and 1B respectively through a second electrophoretic display of the present invention in which the electrophoretic medium comprises two different types of particle, bearing charges of opposite polarity, in an uncolored suspending fluid;

DETAILED DESCRIPTION

Figure 3A:
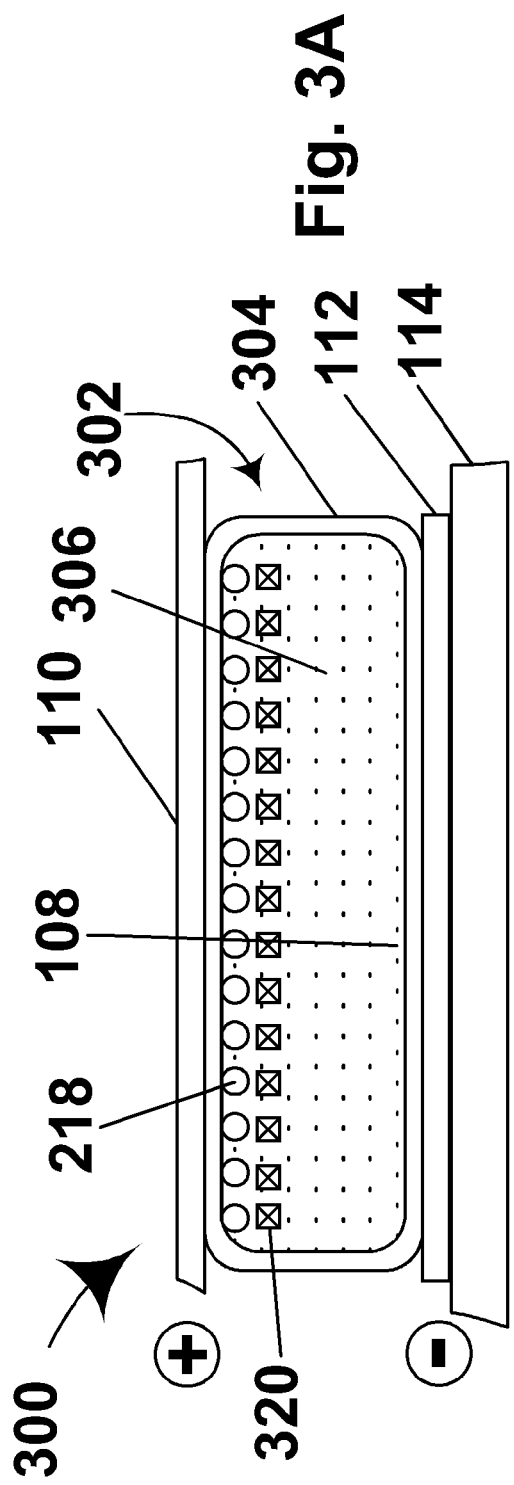
FIGS. 3A and 3B are schematic cross-sections, generally similar to those of FIGS. 2A and 2B respectively through a third electrophoretic display of the present invention in which the electrophoretic medium comprises two different types of particle, bearing charges of the same polarity but differing in electrophoretic mobility, in an uncolored suspending fluid.

As already indicated, it has been found that, in microcavity electrophoretic displays, there is an optimum IP height related to two key variables, namely the saturated particle thickness of the electrophoretic particles, i.e., the minimum thickness of each pigment to achieve an adequate optical state, and the volume fraction of that pigment in the internal phase of the display.

At first glance, it might appear that achieving an "adequate optical state" in an electrophoretic display is solely a function of the desired optical property of the pigments used for any given application. However, it has been found that if an electrophoretic medium does not contain sufficient pigment, the optical properties of the medium may be adversely affected; for example, if an electrophoretic medium contains insufficient white pigment, the reflectivity of the white state of the medium may be lower than the same state of a similar medium containing more white pigment.

For various technical reasons, it is generally desirable to keep an electrophoretic medium as thin as possible consistent with good optical properties. Since the rate at which electrophoretic particles move is determined by electric field strength, and since (all other factors being equal) the electric field strength in an electrophoretic display is proportional to the voltage applied between the electrodes divided by the distance between these electrodes, it is generally desirable to keep this distance to a minimum (i.e., to keep the electrophoretic medium as thin as possible) in order to keep the operating voltage as low as possible, a low operating voltage being desirable to reduce energy consumption by the display (especially in portable, battery-driven devices) and to minimize the cost and complexity of electronic circuitry needed to drive the display. Also, keeping the electrophoretic medium as thin as possible reduces the distance which the electrophoretic particles need to travel during switching of the display between its extreme optical states and thus, at a constant electric field, increases the switching speed of the display. Also, in certain applications, electrophoretic displays are attractive because they can be made flexible, and it is easier to produce a flexible display with a thin electrophoretic medium. Hence, it might at first glance appear that an electrophoretic display should have a minimum IP height and a high volume fraction of pigment in the internal phase so as to provide sufficient pigment to ensure an optimum optical state when that pigment is visible.

However, there are some countervailing considerations. Increased pigment loading will typically result in higher viscosity of the internal phase, and this higher viscosity reduces electrophoretic particle velocity and slows the switching speed of the display for a given applied electric field.

Thus, the optimum formulation of an electrophoretic medium for any particular combination of pigment(s), suspending fluid, operating voltage and desired switching time is a complicated matter. The situation is further complicated by the complex relationships between applied voltages and optical states in electrophoretic media. As discussed in the aforementioned U.S. Pat. No. 7,012,600 and several other of the aforementioned E Ink and MIT patents and applications, electrophoretic media do not act as simple voltage transducers (as do liquid crystals) but rather act, to a first approximation, as impulse transducers, so that the final state of a pixel depends not only upon the electric field applied but also upon the state of the pixel prior to the application of the electric field. This type of behavior can cause serious complications when it is desired to produce an area of supposedly uniform color on a display. Consider, for example, a black and white display intended for use in reading black text, with or without illustrations, on a white background. When such a display is re-written (i.e., when a new page is displayed), unless both the electrophoretic medium formulation and the drive scheme employed are carefully chosen, there may be small variations among the optical states of the numerous pixels in the supposedly uniform white background, and the human eye is very sensitive to such small variations in optical states in a supposedly uniform area, especially since readers are accustomed to a highly uniform white background on a printed page.

In accordance with the present invention it has been found that, to secure good optical performance from a microcavity electrophoretic medium, it is important to correlate the average height of the microcavities with the saturated particle thickness (as defined above) and the volume fraction of the electrophoretic particles in the internal phase of the electrophoretic medium. It has been found that there is an optimum IP height for microcavity electrophoretic media. If the saturation thickness of a pigment is S and the volume fraction of the pigment in the internal phase is F, the optimum IP height is S/F, and in practice it is desirable that the actual IP height not differ from this optimum value by more than about 5 µm. When an electrophoretic medium contains two or more pigments, the value of S/F should be calculated separately for each pigment, and the optimum IP height set to the largest of the resultant values.

It will readily be apparent that, in an electrophoretic medium containing more than one type of electrophoretic particle, each type of particle will have its own saturated particle thickness. Single particle electrophoretic media typically comprise a white pigment in a dyed suspending fluid, while dual particle electrophoretic media typically comprise white and black particles in an uncolored suspending fluid. However, in both cases, the critical saturated particle thickness is usually that of the white particles, since the white particles scatter light while the black particles absorb it, and the pigment thickness needed to scatter light is greater than that required to absorb light.

It has been found that, if the microcavities in an electrophoretic medium have an IP height significantly greater than this optimum S/F value, display performance is reduced. One reason is that the distance that the pigment must travel in order to reach the microcavity wall is greater. A second reason is that for a given voltage field across the internal phase, the field strength is reduced. A low field strength reduces particle velocity. Furthermore, in a multi-pigment system in which particles of opposite charge may have a tendency to aggregate, a low field strength reduces the number of aggregates that are separated. On the other hand, if the microcavities have an IP height significantly less than this optimum value, the desired optical state may not be achieved due to insufficient optical density of pigment.

To evaluate various electrophoretic media, one can measure the total pigment "saturation thickness", achieved from a pulse length time and electric field level across an internal phase, under which a change in the pulse period would change the optical properties of the pigment by no more than a desired threshold amount for visual artifacts. In a typical system with a typical white/black switching speed around 300 ms, at a saturated thickness a pulse length change of 50 ms at 15V would change the optical properties by less than 2 L*. In systems employing faster switching electrophoretic media, a saturated thickness may be adequate if the optical properties would change by less than 2 L* for pulse length variation about 5-20% of the typical white/black switch speed of the medium. As already mentioned, for purposes of clear definition, the term "saturated particle thickness" of electrophoretic particles in a microcavity is used herein to denote the thickness (assuming 100 percent packing) of the layer of particles which would be formed over the IP area of the microcavity using an internal phase containing just sufficient electrophoretic particles that, if application of a specific electric field to the medium for a time T suffices to switch the electrophoretic medium between its extreme optical states, variations in the time of application of this specific electric field within the range of 0.95 to 1.05 T (i.e., variations in time of ±5 percent) will not change the optical properties of either extreme state of the electrophoretic medium by more than 2 units of L*. Desirably, the system should withstand variations in time of ±10 percent, and preferably ±20 percent, without changes in optical properties exceeding 2 L*.

A preferred white pigment for use in electrophoretic media is titania. The titania desirably has a surface coating of silica and/or alumina, and is also desirably polymer coated, as described in the aforementioned U.S. Pat. No. 6,822,782 or in the related U.S. Pat. No. 7,230,750. As is known in the art of pigments and paints, the titania particles should desirable be between 0.1 µm and 0.5 µm in diameter, and ideally between 0.2 µm and 0.4 µm in diameter, for greatest efficiency in scattering with minimal thickness. However a composite particle may also be used that contains multiple pigment particles. Titania particles, especially those described in the aforementioned U.S. Pat. Nos. 6,822,782 and 7,230,750, can have saturated particle thicknesses in the range of from about 1 to 10 µm, and desirably from about 1 to about 5 µm, depending somewhat upon the addressing waveform used. The present inventors have found that, in one preferred titania/carbon black dual particle electrophoretic medium of the present invention, using a preferred addressing pulse of 15 V and a pulse length of between 200 and 500 ms, the titania provided adequate coverage levels at thicknesses between 1.5 and 2.5 µm. In another preferred electrophoretic medium having a lower viscosity, faster switching internal phase driven by 15 V pulses with a pulse length of 100 ms, the titania also provided adequate coverage at thicknesses between 1.5 and 2.5 µm.

Copper chromite particles may be used in place of carbon black particles as the dark colored particles in dual particles media of the present invention (or, indeed, in single particle media where a dark particle is desired). The preparation and use of copper chromite particles in electrophoretic media is fully described in U.S. Pat. No. 7,002,728.

As discussed above, at first glance it appears desirable to formulate thin electrophoretic media with high pigment loadings, but the ability to do so is limited by the increase in viscosity associated with high pigment loadings. Some increase in pigment loading may be advantageous, as compared with pigment loadings used in prior art electrophoretic displays. For example, to achieve whiter systems, it can be moderately useful to increase titania loading to higher levels such as 5-7 μm thickness. Also, whereas some electrophoretic suspensions known in the art have employed a pigment loading of less than 2 percent by weight, it has been found that an internal phase comprising up to 45 percent by weight or 15 percent by volume of titania particles can have a viscosity that permits the particles to achieve an adequate velocity under electric fields of a strength useful in commercial devices, so as to enable the devices to use driving voltages typically 15 V or less. Preferred media of the present invention may typically have a titania loading of 5 to 15 percent by volume with an internal phase viscosity between 1 and 6 mPa sec. Given a saturated particle thickness of 1.5 to 2.5 μm, and a titania loading of 10 percent by volume, it has been found that visual artifacts are reduced when the IP height for a microcavity is between 15 μm and 25 μm, with the optimum value being substantially 20 μm.

Other types of internal phases may permit reduced viscosity, thus permitting a higher pigment loading. For example, an internal phase using a gaseous suspending fluid (see, for example, 2004/0112750) would be able to support a much higher pigment loading and correspondingly a lower IP height. Such gas-based phases could function with particle loadings as high as 90 percent by volume.

It is believed (although the invention is in no way limited by this belief) that one of the reasons for the improved optical states achieved by the present invention is that if, in a microcavity electrophoretic display, the pigment is not sufficiently thick, the display is vulnerable to image ghosting. The reasons for such image ghosting may include small voltage variations in the addressing system, slowly-decaying remnant voltages or polarization in the microcavities of the display, settling of the pigments over time, improper mixing of various pigments, and differences between the RC time constant of the internal phase and its external environment, including any binder present. All of these effects can cause variations in the amount of pigment visible to an observer, superimposed on the variations intended to be caused by the addressing of the display.

The "visual artifact level" of a display (typically a high resolution display) may be measured by any suitable means. In one method, many pixels are each subjected to a different switching history typical of the intended usage model. The greatest optical difference between any two pixels is the "maximum visual artifact level." Alternatively, a single pixel may be subjected to many different switching histories and a consistent test addressing pulse then applied. The greatest optical difference between the resulting optical states is another way to measure the "maximum visual artifact level."

To achieve consistent image quality with minimal visual artifacts, it is desirable that the electrophoretic medium contain a minimum adequate thickness of the pigment such that a small variation in pigment level has a minimal optical effect. For portable high-resolution display applications, this optical effect should ideally be no more than 1 to 2 L* units, given typical variations in actual pigment packing thicknesses.

The electrophoretic medium of the present invention may be of any of the types described in the aforementioned E Ink and MIT patents and applications, and preferred embodiments of such media will now be described with reference to FIGS. 1 to 3 of the accompanying drawings.

The first electrophoretic display (generally designed 100) of the invention shown in FIGS. 1A and 1B comprises an encapsulated electrophoretic medium (generally designated 102) comprising a plurality of capsules 104 (only one of which is shown in FIGS. 1A-1C), each of which contains a suspending liquid 106 and dispersed therein a plurality of a single type of particle 108, which for purposes of illustration will be assumed to be black. The particles 108 are electrophoretically mobile and may be formed of carbon black. In the following description, it will be assumed that the particles 108 are positively charged, although of course negatively charged particles could also be used if desired. (The triangular shape of the particles 108, and the square and circular shapes of other particles discussed below, are used purely to way of illustration to enable the various types of particles to be distinguished easily in the accompanying drawings, and in no way correspond to the physical forms of the actual particles, which are typically substantially spherical. However, we do not exclude the use of non-spherical particles in the present displays.) The display 100 further comprises a common, transparent front electrode 110, which forms a viewing surface through which an observer views the display 100, and a plurality of discrete rear electrodes 112, each of which defines one pixel of the display 100 (only one rear electrode 112 is shown in FIGS. 1A and 1B). For ease of illustration and comprehension, FIGS. 1A and 1B show only a single microcapsule forming the pixel defined by rear electrode 112, although in practice a large number (20 or more) microcapsules are normally used for each pixel. The rear electrodes 112 are mounted upon a substrate 114.

The suspending liquid 106 is colored such that the particles 108 lying in the positions shown in FIG. 1A adjacent the rear electrodes 112 are not visible to an observer viewing the display 100 via the front electrode 110. The necessary color in the suspending liquid 106 may be provided either by dissolving a dye in the liquid. Since the colored suspending liquid 106 and the particles 108 render the electrophoretic medium 102 opaque, the rear electrodes 112 and the substrate 114 can be transparent or opaque since they are not visible through the opaque electrophoretic medium 102.

The capsules 104 and the particles 108 can be made in a wide range of sizes. However, in general it is preferred that the thickness of the capsules, measured perpendicular to the electrodes, be in the range of about 15 to 500 μm, while the particles 108 will typically have diameters in the range of about 0.25 to about 2 μm.

FIG. 1A shows the display 100 with the rear electrode 112 negatively charged and the front electrode 110 positively charged. Under this condition, the positively-charged particles 108 are attracted to the negative rear electrode 112 and thus lie adjacent the rear electrode 112, where they are hidden from an observer viewing the display 100 through the front electrode 110 by the colored liquid 106. Accordingly, the pixel shown in FIG. 1A displays to the observer the color of the liquid 106, which for purposes of illustration will be assumed to be white. (Although the display 100 is illustrated in FIGS. 1A and 1B with the rear electrodes 112 at the bottom, in practice both the front and rear electrodes are typically disposed vertically for maximum visibility of the display 100. None of the specific embodiments of the invention described herein rely in any way upon gravity to control the movement of the particles; such movement under gravity is in practice far too slow to be useful for controlling particle movement.) FIG. 1B shows the display 100 with the front electrode 110 made negative relative to the rear electrode 112. Since the particles 108 are positively charged, they will be attracted to the negatively-charged front electrode 110, and thus the particles 108 move adjacent the front electrode 110, and the pixel displays the black color of the particles 108.

In FIGS. 1A and 1B, the capsules 104 are illustrated as being of substantially prismatic form, having a width (parallel to the planes of the electrodes) significantly greater than their height (perpendicular to these planes). This prismatic shape of the capsules 104 is deliberate. If the capsules 104 were essentially spherical, in the black state shown in FIG. 1B, the particles 108 would tend to gather in the highest part of the capsule, in a limited area centered directly above the center of the capsule. The color seen by the observer would then be essentially the average of this central black area and a white annulus surrounding this central area, where the white liquid 106 would be visible. Thus, even in this supposedly black state, the observer would see a grayish color rather than a pure black, and the contrast between the two extreme optical states of the pixel would be correspondingly limited. In contrast, with the prismatic form of microcapsule shown in FIGS. 1A and 1B, the particles 108 cover essentially the entire cross-section of the capsule so that no, or at least very little white liquid is visible, and the contrast between the extreme optical states of the capsule is enhanced. For further discussion on this point, and on the desirability of achieving close-packing of the capsules within the electrophoretic layer, the reader is referred to the aforementioned U.S. Pat. No. 6,067,185, and the corresponding published International Application WO 99/10767. Also, as described in the aforementioned E Ink and MIT patents and applications, to provide mechanical integrity to the electrophoretic medium, the microcapsules are normally embedded within a solid binder, but this binder is omitted from FIGS. 1 to 3 for ease of illustration.

The second electrophoretic display (generally designed 200) of the invention shown in FIGS. 2A and 2B comprises an encapsulated electrophoretic medium (generally designated 202) comprising a plurality of capsules 204, each of which contains a suspending liquid 206 and dispersed therein a plurality of positively charged black particles 108 identical discussed to those in the first display 100 discussed above. The display 200 further comprises a front electrode 110, rear electrodes 112, and a substrate 114, all of which are identical to the corresponding integers in the first display 100. However, in addition to the black particles 108, there are suspended in the liquid 206 a plurality of negatively charged, particles 218, which for present purposes will be assumed to be white.

Typically the liquid 206 is uncolored (i.e., essentially transparent), although some color may be present therein to adjust the optical properties of the various states of the display. FIG. 2A shows the display 200 with the front electrode 110 positively charged relative to the rear electrode 112 of the illustrated pixel. The positively charged particles 108 are held electrostatically adjacent the rear electrode 112, while the negatively charged particles 218 are held electrostatically against the front electrode 110. Accordingly, an observer viewing the display 200 through the front electrode 110 sees a white pixel, since the white particles 218 are visible and hide the black particles 108.

FIG. 2B shows the display 200 with the front electrode 110 negatively charged relative to the rear electrode 112 of the illustrated pixel. As in the corresponding optical state shown in FIG. 1B, the positively charged particles 108 are now electrostatically attracted to the negative front electrode 110, while the negatively charged particles 218 are electrostatically attracted to the positive rear electrode 112. Accordingly, the particles 108 move adjacent the front electrode 110, and the pixel displays the black color of the particles 108, which hide the white particles 218.

Figure 3B:
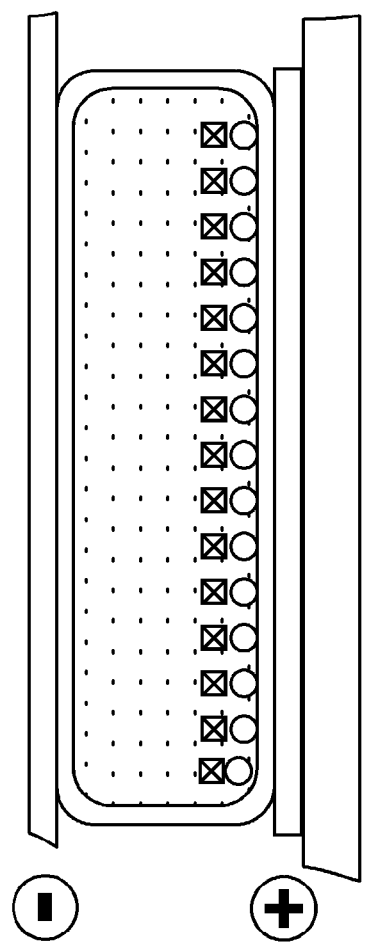

The third electrophoretic display (generally designated 300) of the invention shown in FIGS. 3A and 3B comprises an encapsulated electrophoretic medium (generally designated 302) comprising a plurality of capsules 304. The display 300 further comprises a front electrode 110, rear electrodes 112, and a substrate 114, all of which are identical to the corresponding integers in the displays 100 and 200 previously described. The display 300 resembles the display 200 described above in that the liquid 306 is uncolored and that white negatively charged particles 218 are suspended therein. However, that the display 300 differs from the display 200 by the presence of red negatively charged particles 320, which have a substantially lower electrophoretic mobility than the white particles 218.

FIG. 3A shows the display 300 with the front electrode 110 positively charged relative to the rear electrode 112 of the illustrated pixel. Both the negatively charged white particles 218 and the negatively charged red particles 320 are attracted to the front electrode 110, but since the white particles 218 have substantially higher electrophoretic mobility, that they reach the front electrode 110 first (note that the optical state shown in FIG. 3A is normally generated by abruptly reversing the polarity off the electrodes in the optical state shown in FIG. 3B, thus forcing both the white particles 218 and the red particles 320 to traverse the thickness of the capsule 304, and thus allowing the greater mobility of the white particles 218 to cause them to reach their positions adjacent the front electrode 110 before the red particles 320). Thus, the white particles 218 form a continuous layer immediately adjacent the front electrode 110, thereby hide being the red particles 320. Accordingly, an observer viewing the display 300 through the front electrode 110 sees a white pixel, since the white particles 218 are visible and hide the red particles 320.

FIG. 3B shows the display 300 with the front electrode 110 negatively charged relative to the rear electrode 112 of the illustrated pixel. Both the negatively charged white particles 218 and the negatively charged red particles 320 are attracted to the rear electrode 112, but since the white particles have higher electrophoretic mobility, when the optical state shown in FIG. 3B is produced by reversing the polarity on the electrodes in the optical state shown in FIG. 3A, the white particles 218 reach the rear electrode 112 more quickly than do the red particles 320, so that the white particles 218 form a continuous layer adjacent the electrode 112, leaving a continuous layer of the red particles 320 facing the front electrode 110. Accordingly, an observer viewing the display 300 through the front electrode 110 sees a red pixel, since the red particles 320 are visible and hide the white particles 218.

The present invention may be applied to any of the forms of encapsulated electrophoretic media shown in FIGS. 1 to 3. However, the present invention is not restricted to encapsulated electrophoretic media, and may also be applied to unencapsulated media and to polymer-dispersed electrophoretic media which, as previously described, are of a two-phase, with the suspending fluid and particles forming a discontinuous phase comprising a plurality of droplets, the droplets being surrounded by a continuous phase. In such a polymer-dispersed electrophoretic medium, the droplets desirably comprise at least about 40 percent by volume all of the electrophoretic medium; see the aforementioned U.S. Pat. No. 6,866,760.

As already mentioned, the suspending fluid of the electrophoretic medium of the present invention may contain a dissolved and/or dispersed polymer having a number average molecular weight in excess of about 20,000, this polymer being essentially non-absorbing on the particles. Such a polymer is very different from certain low molecular weight polymers used as charge control agents in certain prior art electrophoretic media. When such charge control agents are polymer-based (and not all are), they normally have molecular weight of only a few thousand at most, and, more importantly, must have functional groups which cause them to be absorbed on to the electrophoretic particles, since it is only by such absorption that they can exert their function of controlling the charge on the particles.

To ensure that the polymer is not substantially absorbed on to the electrophoretic particles, it is desirable to choose a polymer which is chemically highly compatible with, and thus highly soluble in, the suspending fluid. The polymer and suspending fluid combination should desirably be such that the fluid is at least a theta solvent for the polymer at room temperature. In order to extend the temperature range of the enhanced image stability, it is optimal if the fluid is at least a moderately good to good solvent for the image stability polymer. One method of choosing an appropriate polymer/fluid combination is to plot the intrinsic viscosity of the combination against the molecular weight of the polymer; desirable combinations are those in which the slope of a best linear fit of the log of the intrinsic viscosity against the log of the molecular weight is at least 0.5, and desirably in the range of about 0.55 to about 0.8.

Typically, the suspending fluid used in electrophoretic displays is an aliphatic hydrocarbon (alone or in combination with a halogenated hydrocarbon) and with such fluids, it is preferred that the polymer be a hydrocarbon polymer essentially free from functional groups, such as ionizable or ionic substituents, that may cause the polymer to interact with chemical sites on the electrophoretic particles, or to physically adsorb to the surfaces of the electrophoretic particles. For example, it appears that the presence of a substantial proportion of aromatic groups causes poor solubility or adsorption of a polymer onto the electrophoretic particles when the suspending fluid was an equal part by weight mixture of an aliphatic hydrocarbon and halogenated hydrocarbon, so that for this suspending fluid a hydrocarbon copolymer containing a significant fraction of polystyrene repeating units should not be used in such an electrophoretic medium. For electrophoretic media with aliphatic hydrocarbon/halogenated hydrocarbon suspending fluids, the polymer is preferably a polyolefin, polyisobutylene (poly-2-methylpropene) being the presently preferred polymer, although a variety of other types of polymers. for example polysiloxanes, and in particular polydimethylsiloxane, may also be used. Polyisobutylene is commercially available in molecular weight ranges appropriate for use in the present invention, inexpensive, stable at high temperatures, resistant to oxidation and does not contain easily reactive or ionizable components. As already mentioned, ionic or ionizable components are undesirable in the polymer since release of such components into the suspending fluid might cause undesirable changes in the charges on the electrophoretic particles, and thus upon their electrophoretic mobilities. The polyisobutylene desirably has a number average molecular weight in excess of 100,000, and preferably in the range of about 150,000 to about 3,000,000, and a weight average molecular weight in excess of 100,000 and preferably in the range of about 300,000 to about 3,000,000; similar molecular weight ranges may be used with other polymers. Polyisobutylenes falling within these molecular weight ranges are readily available commercially, for example from Sigma-Aldrich, Inc., P.O. Box 2060, Milwaukee Wis. 53201 under catalogue numbers 18145-5 and 18146-3. The polyisobutylene also desirably has a viscosity average molecular weight in the range of about 200,000 to 1,200,000 g/mole.

The optimum amount of polymer for producing stability in any specific system can readily be determined empirically. As shown in the Examples below, the optimum amount of polymer varies in a rather complicated manner with the degree of image stability required, the molecular weight of the polymer, and the maximum switching time of the medium which can be tolerated. However, by way of general guidance it may be stated that, at least in the case of the preferred polyisobutylenes described above, it is desirable that the polymer be added in an amount of from about 0.5 to about 2.5 percent by weight of the suspending fluid, and preferably in an amount of about 1 to about 2 percent by weight. Below about 0.5 percent, depending upon the molecular weight of the polymer, the polymer produces little or no increase in image stability other than that attributable to the increase in the viscosity of the suspending fluid, while polymer concentrations above about 2.5 percent cause an increase in viscosity which may render switching times unacceptable.

The addition of polymer to the suspending fluid is capable of improving the image stability of electrophoretic media by several orders of magnitude, while increasing the switching time of the media by a factor of only about 2 to 4. As shown in the Examples below, preferred media of the present invention can achieve image stabilities of at least about 1,000, and in some cases at least about 10,000 seconds or substantially more, whereas similar media without the polymer addition only achieve image stabilities of the order of 10 seconds. (All reference to image stability times herein are to such times as measured by the time required for $L^*$ of an optical state to change by 2 units, as described in Example 2 below.) Rather surprisingly, as illustrated in the Examples below, the addition of polymer to the suspending fluid has been found to stabilize not only the two extreme optical states of the medium (for example, black and white) but also intermediate gray optical states; as is well known to those skilled in the technology of electrophoretic displays, such gray states can be produced by subjecting the medium to electric pulses of reduced length and/or voltage as compared with the pulses needed to drive the medium from one extreme optical state to the other. This ability to stabilize gray states is important since it is desirable to use an electrophoretic display capable of gray scale in small displays (such as those used in PDA's) where the limited number of pixels in the display renders areal modulation ("half-toning") to achieve gray scale impracticable.

The improved image stability achieved by the addition of polymer to the suspending fluid is not significantly affected by temperature, at least within the working temperatures ranges of the media tested in the Examples below. Although the optical states of electrophoretic media vary with temperature, the period during which the initial state of the medium immediately after a change in optical states persists is not itself significantly affected by the temperature, as shown in Example 6 below.

The electrophoretic media of the present invention may be incorporated into any known type of electrophoretic display, including any of the types of display described in the aforementioned E Ink and MIT patents and published applications. The present invention provides an electrophoretic display comprising an electrophoretic medium of the present invention and at least one electrode arranged adjacent the medium and capable of applying an electric field to the medium. Such a display may have a second electrode in the form of a stylus or similar device capable of being moved across the medium to write thereon. In one form of the electrophoretic display of the present invention, two electrodes are disposed on opposed sides of the electrophoretic medium, at least one of the electrodes being substantially transparent such that the electrophoretic medium can be viewed through the substantially transparent electrode. As already indicated, when the electrophoretic medium of the present invention is encapsulated, typically the capsules are held within a solid binder, and one or both electrodes of the display may be secured to the binder by any convenient method, such as hot lamination.

The following Examples are now given, though by way of illustration only, to show details of particularly preferred reagents, conditions and techniques used in the electrophoretic media and displays of the present invention.

EXAMPLE 1

An internal phase was prepared comprising 10 percent by volume white particles and 1 percent by volume black particles (carbon black) by volume in a hydrocarbon suspending fluid; the internal phase had a viscosity of 4.75 mPa sec. The white particles comprised titania and had an average size of approximately 0.6 µm and a saturation particle thickness estimated at 1.5 to 2.5 µm. The internal phase was encapsulated in gelatin/acacia microcapsules substantially as described in Paragraphs [0069] to [0074] of U.S. Patent Publication No. 2002/0180687. The resultant microcapsules were separated into three batches differing in wet capsule diameter size distributions. Each batch was mixed into a slurry with a polymeric binder, coated to form an electrophoretic film, and laminated to a back electrode to form a switchable display pixel, substantially as described in Paragraphs [0075] and [0076] of the aforementioned 2002/0180687. During the coating process, suitable equipment settings such as speed, pressure and die height were used to achieve a range of wet film coat weights, which then dried into capsules of differing IP heights in part due to the effects of binder evaporation and surface tension. In one batch, the dry capsules were roughly spherical; in the second batch the dry capsules had substantially the form of oblate spheroids; and in the third batch the dry capsules had substantially the form of prolate spheroids, with heights greater than their diameters. In each case the spheroids ranged from circular in XY projection to hexagonal, varying with the packing density in the film of electrophoretic medium.

The three resultant electrophoretic media differed in estimated IP heights and typical pixel optical properties when switched with a 350 ms 15 V pulse, as shown in Table 1 below.

TABLE 1

| Estimated IP Height in Microcavity (µm) | White State L* | Dark State L* | Contrast Ratio | Maximum Visual Artifacts L* |
|---|---|---|---|---|
| 18 | 62 | 21 | 9.4:1 | 1.5 |
| 44 | 59 | 27 | 5.3:1 | 3.7 |
| 55 | 60 | 24 | 6.9:1 | 5.5 |

Assuming a saturation particle thickness for the titania of 2 µm, the optimum IP height according to the present invention should be 20 µm; the IP height calculated for the black pigment is substantially less, so that it is the optimum IP height for the titania which is important for this medium. It will be seen from the data in Table 1 above that the capsules having an estimated IP height of 18 µm, close to the calculated 20 µm, had substantially better optical properties, including an improved contrast ratio, as compared with the other two media having substantially greater IP heights.

EXAMPLES 2-12

These Examples use three different preferred media, and for convenience these preferred media are hereinafter called "Medium A", "Medium B" and "Medium C" respectively. These media, which are all of the encapsulated dual particle type using a polymer-coated titania white particle and a polymer-coated black particle with an uncolored suspending fluid, were prepared by the processes described below. The suspension medium used in Media A and B was a mixture of a hydrocarbon (Isopar G, available commercially from Exxon Corporation, Houston, Tex.; "Isopar" is a Registered Trade Mark) and a halogenated hydrocarbon oil (Halogenated hydrocarbon oil 1.8, available commercially from Halogenated Hydrocarbon Products Corporation, River Edge, N.J. referred to hereinafter for simplicity as "Halocarbon") containing a dispersant (Solsperse 17000, available commercially from Avecia Ltd., Blackley, Manchester, United Kingdom; "Solsperse" is a Registered Trade Mark). Medium C uses no halocarbon in the suspending fluid.

Preparation of Medium A Internal Phase

To make 1084.6 g of Medium A internal phase ready for encapsulation, 542.3 grams of Medium A precursor was prepared by combining 40.4 g of polymer-coated titania with 4.1 g of charging agent (Solsperse 17000), 4.1 g of surfactant (Span 85), and 123 g of 1:1 w/w Isopar/Halocarbon solvent. This dispersion was mixed overnight and then sonicated for approximately 1 to 2 hours. In a separate jar, 1.7 g of polymer-coated carbon black was combined with 123 g of 1:1 w/w Isopar/Halocarbon solvent; this dispersion was also mixed overnight and then sonicated for 1 to 2 hours. The titania and carbon black dispersions were then combined and diluted with 246 g of 1:1 w/w Isopar/Halocarbon solvent. Medium A internal phase was prepared by diluting the Medium A precursor with equal mass of 1:1 w/w Isopar/Halocarbon solvent. In those media which contained polyisobutylene, as described below, the final dilution solvent was prepared with the appropriate concentration of polyisobutylene. In those media which contain Isopar V, the procedure defined above was followed with Isopar V substituted for Isopar G.

Preparation of Medium B Internal Phase

To make 1000 g of Medium B internal phase ready for encapsulation, 120 g of titania and 9 g of carbon black were separately polymer coated. The polymer-coated titania was mixed with 3.0 percent of its own weight of the dispersant and made up into a 30 percent w/w stock solution in a 1:1 w/w Isopar/Halocarbon mixture. The polymer-coated carbon black was similarly made up into an approximately 5 percent w/w stock solution using a microfluidizer. The two resultant stock solutions were combined with sufficient additional 1:1 w/w Isopar/Halocarbon mixture to make 1000 g of the mixture, which was well shaken and stored on a roll mill for at least 24 hours before being used in the encapsulation process. (In those media which contained polyisobutylene or Isopar V, as described below, the addition of the polymer or substitution of Isopar V for Isopar G was effected at this mixing stage.)

Encapsulation of Internal Phases A and B, and Preparation of Displays

To encapsulate the internal phases thus prepared, in a 4 L reactor, gelatin (22.5 g) was dissolved in deionized water (1311.2 g) at 40° C. with stirring, care being taken to ensure that no foam was produced on the surface of the solution. Separately, acacia (16.7 g—available from Sigma-Aldrich) was dissolved in deionized water (327.8 g) and the resultant solution heated to 40° C. Also separately, the internal phase described above (580 g) was heated to 40° C. and then added, over a period of approximately 15 minutes to the gelatin solution; the gelatin solution was stirred during the addition, which was conducted by introducing the internal phase through a dropping funnel the outlet of which was placed below the surface of the gelatin solution. After the addition of the internal phase was complete, the rate of stirring was increased and the stirring continued for 30 minutes at 40° C. in order to emulsify the internal phase into droplets having an average diameter of about 200 µm for Medium A and about 80 µm for Medium B.

The acacia solution was then added over a period of about 1 minute, care being taken to avoid foaming. The pH of the mixture was lowered to approximately 4.9 using 10 percent aqueous acetic acid, and the vigorous stirring was continued to a further 40 minutes at the same temperature. The temperature of the mixture was lowered to 10° C. over a period of two hours, with continued vigorous stirring, and glutaraldehyde (8.35 g) was added. After this addition, the mixture was gradually warmed to 25° C. and stirred vigorously for a further 12 hours. Finally, stirring was discontinued, and the mixture was allowed to settle for 10-15 minutes, during which time approximately 25-50 mm of a foamy mixture separated on top of the liquid.

The liquid phase was then removed, leaving the foamy mixture in the reactor, and the capsules in this liquid phase washed three times by sedimentation and redispersion in deionized water. Medium A capsules were separated by size to yield a distribution between 100 and 300 µm diameter, with a mean diameter of about 200 µm. Medium B capsules were separated by size to yield a distribution between 50 and 120 µm diameter, with a mean diameter of 70-80 µm; such a distribution can be effected by sieving the capsules for 90 seconds on a 63 µm sieve and then for 30 seconds on a 38 µm sieve to produce the final capsule slurry.

The resulting capsule slurry was centrifuged and then mixed with an aqueous urethane binder (NeoRez R-9320, available from NeoResins, 730 Main Street, Wilmington Mass. 01887; "NeoRez" is a Registered Trade Mark) at a ratio of 1 part by weight binder to 9 parts by weight of capsules, and 0.3 weight percent of hydroxy was added as a slot-coating additive. The resultant mixture was slot coated on to a 125 µm thick indium-tin oxide coated polyester film moving at 1 m/sec relative to the slot coating head. The coated film was allowed to air dry for 10 minutes, then oven dried at 50° C. for 15 minutes to produce an electrophoretic medium approximately 50 µm thick containing essentially a single layer of capsules (see the aforementioned U.S. Pat. No. 6,839,158).

To provide an electrophoretic display which could be used to investigate the properties of the electrophoretic medium thus prepared, the capsule-coated surface of the coated film was then overcoated with the aforementioned NeoRez R-9320 binder using a doctor blade with a 13 mil (330 µm) gap setting (this binder serves both to planarize the capsule-coated surface and as a lamination adhesive) and the overcoated film dried at 50° C. for 20 minutes. The dried film was then hot laminated to a second polyester film coated, on the side facing the electrophoretic medium, with indium-tin oxide, to produce the final electrophoretic display or pixel.

Preparation of Medium C Internal Phase

To make 1064 g of Medium C internal phase ready for encapsulation, 678 grams of a first Medium C precursor was prepared by combining 406.8 g of polymer-coated titania with 271.2 g of Isopar solvent. This dispersion was mixed overnight and then sonicated for approximately 1 to 2 hours. In a separate jar, 16.7 grams of polymer-coated carbon black was combined with 67.0 grams of Isopar solvent; this dispersion was then high shear dispersed. The titania and carbon black dispersions were then combined and diluted with 194.9 g of Isopar solvent, 48.8 g of a 10 weight percent solution of charging agent (Solsperse 17000) in Isopar solvent, 5.2 g of surfactant (Span 85), and the necessary quantity of polymer in Isopar solvent. The resultant Medium C internal phase was mixed overnight prior to encapsulation.

Encapsulation of Internal Phase C, and Preparation of Displays

To encapsulate the internal phase thus prepared, in a 4 L reactor, gelatin (66.7 g) was dissolved in deionized water (2622.2 g) at 40° C. with stirring, care being taken to ensure that no foam was produced on the surface of the solution. Separately, acacia (66.7 g—available from Sigma-Aldrich) was dissolved in deionized water (655.6 g) and the resultant solution heated to 40° C. Also separately, the internal phase described above (1060 g) was heated to 40° C. and then added, over a period of approximately 15 minutes to the gelatin solution; the gelatin solution was stirred during the addition, which was conducted by introducing the internal phase through a dropping funnel the outlet of which was placed below the surface of the gelatin solution. After the addition of the internal phase was complete, the rate of stirring was increased and the stirring continued for 60 minutes at 40° C. in order to emulsify the internal phase into droplets having an average diameter of about 40 µm.

The acacia solution was then added over a period of about 1 minute, care being taken to avoid foaming. The pH of the mixture was lowered to approximately 4.9 using 10 percent aqueous acetic acid, and the vigorous stirring was continued to a further 40 minutes at the same temperature. The temperature of the mixture was lowered to 10° C. over a period of two hours, with continued vigorous stirring, and 16.7 g of a 50 weight percent solution of glutaraldehyde was added. After this addition, the mixture was gradually warmed to 25° C. and stirred vigorously for a further 12 hours.

The liquid phase was then removed and the capsules in this liquid phase washed one time by sedimentation and redispersion in deionized water. The capsules were separated by size to yield a distribution between 20 and 60 µm diameter, with a mean diameter of about 40 µm. Such a distribution can be effected by sieving the capsules for 90 seconds on a 38 µm sieve and then for 90 seconds on a 25 µm sieve to produce the final capsule slurry.

The resulting capsule slurry was adjusted to pH 8 with 1 weight percent ammonium hydroxide solution. Capsules were concentrated by centrifugation and then mixed with an aqueous urethane binder at a ratio of 1 part by weight binder to 8 parts by weight of capsules. The resultant mixture was bar coated on to a 125 µm thick indium-tin oxide coated polyester film so that after the coated film was allowed to air dry for 1 hour, an electrophoretic medium approximately 20 µm thick containing essentially a single layer of capsules was produced.

A polyurethane adhesive was coated on to a polyethylene terephthalate release sheet using a slot-die coater. The coated release sheet was transferred to an oven at 65° C. and dried for 10 minutes. During coating, the flow rate through the slot, and the coating-head speed, were adjusted to provide a film of adhesive that measured 15 µm thick when dry. The coated release sheet was then laminated to the microcapsule-coated polyester film using a Western Magnum roll laminator; the dried release sheet was laid on top of the microcapsule layer and laminated in the nip of the laminator at 50 PSI (0.46 mPa), with the upper roll at 300° F. (149° C.) and the lower roll at 275° F. (135° C.), at a linear speed of 0.7 ft/min (3.5 mm/sec). The resulting laminate was then cooled, and a single-pixel display produced by cutting a piece of appropriate size from the cooled laminate, removing the release sheet, and laying the film, adhesive side down, on a rear electrode and passing through the laminator using the same conditions as before.

EXAMPLE 2

This Example illustrates that the addition of PIB to the suspending fluid in Medium A produces an increase in image stability greater than that attributable to the increase in viscosity caused by the PIB addition.

A preliminary series of experiments were conducted to determine the effect on the viscosity of the 1:1 w/w Isopar/Halocarbon mixture used in Media A and B. This mixture itself was found to have a viscosity of approximately 0.0021 Pa sec at 25° C., and the addition of the pigments used in Media A and B only slightly increased this viscosity.

Figure 4:
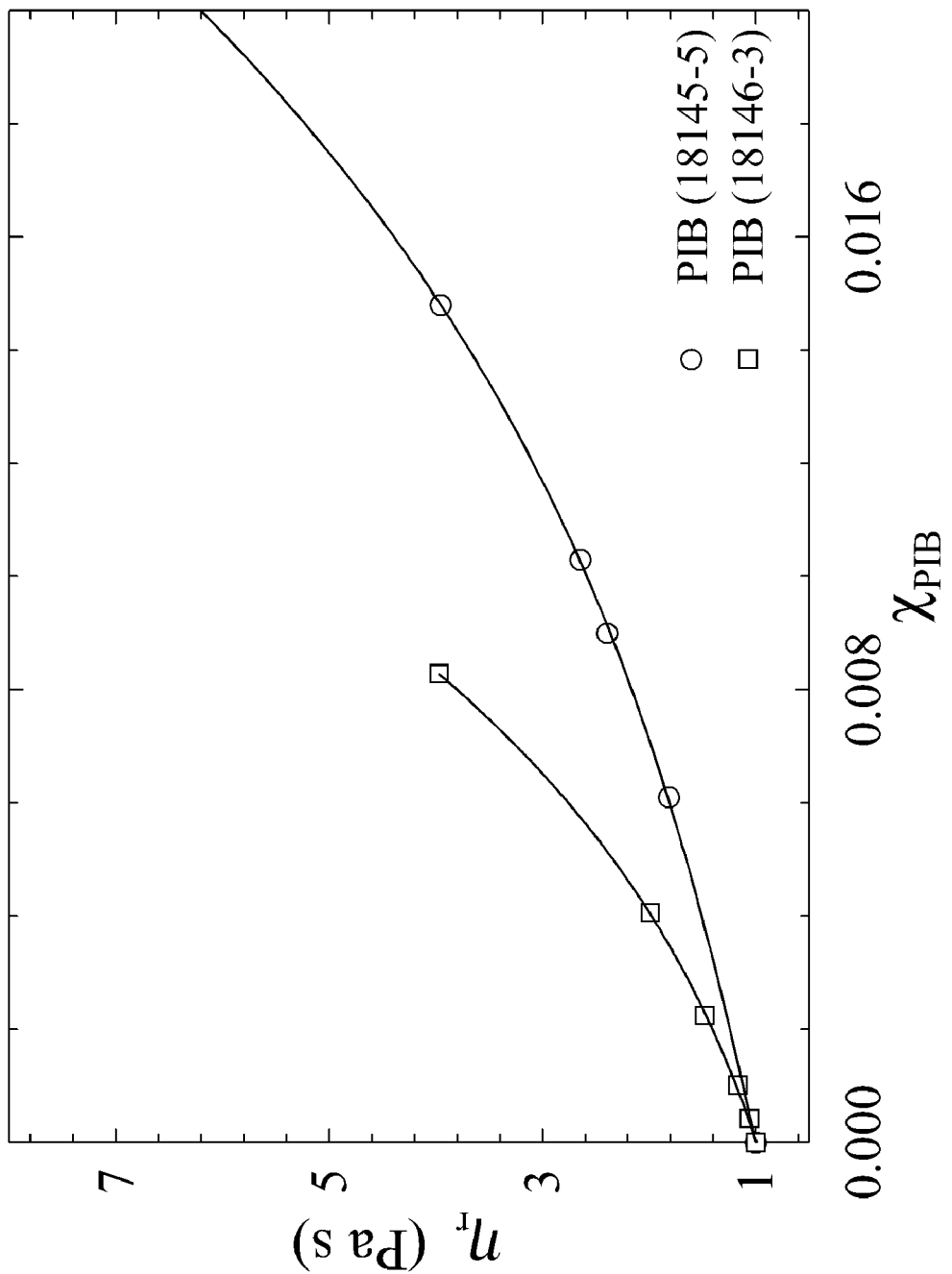
FIG. 4 is a graph showing the variation of the relative viscosity of a preferred suspension fluid used in the media of the present invention with the proportion of polymer added thereto, as described in Example 2 below.

The accompanying FIG. 4 shows the variation of relative viscosity ($\eta_{rel}$), that is, the ratio of the solution viscosity to that of 1:1 w/w Isopar/Halocarbon mixture, with weight fraction of PIB ($X_{PIB}$) in the solution, this variation being of the expected form; the "best fit" curve is a cubic polynomial fit to the data, except that higher $X_{PIB}$ values not plotted in FIG. 4 were included in the data used to determine the fit. The Figure shows the effect of weight fraction of polymer for the aforementioned PIB polymers 18145-5 and 18146-3. For all the polymer concentrations shown in FIG. 4, the solutions were Newtonian over the measured stress range of 0.01 to 10 Pa (measured using a 75 mm diameter, 1° cone and plate geometry on a Physica UDS 200 controlled stress rheometer), which was sufficient to cover both the stresses imposed on the fluid by pigment particles during gravitational settling, and the stresses imposed by electrophoretic movement of the particles.

Figure 5:
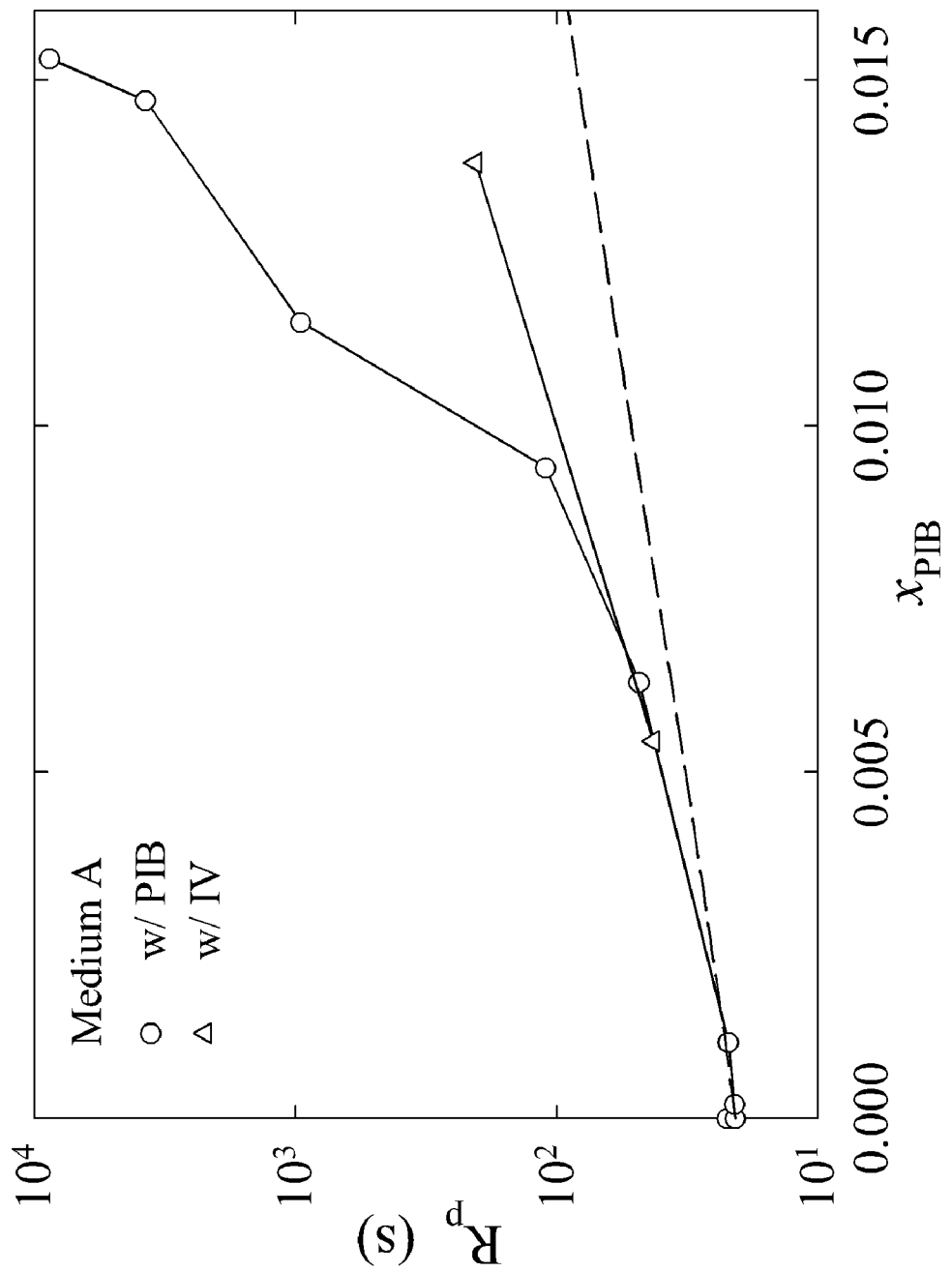
FIG. 5 is a graph showing the variation of image stability of a first preferred medium with the proportion of polymer added thereto, as described in Example 2 below.
Figure 7:
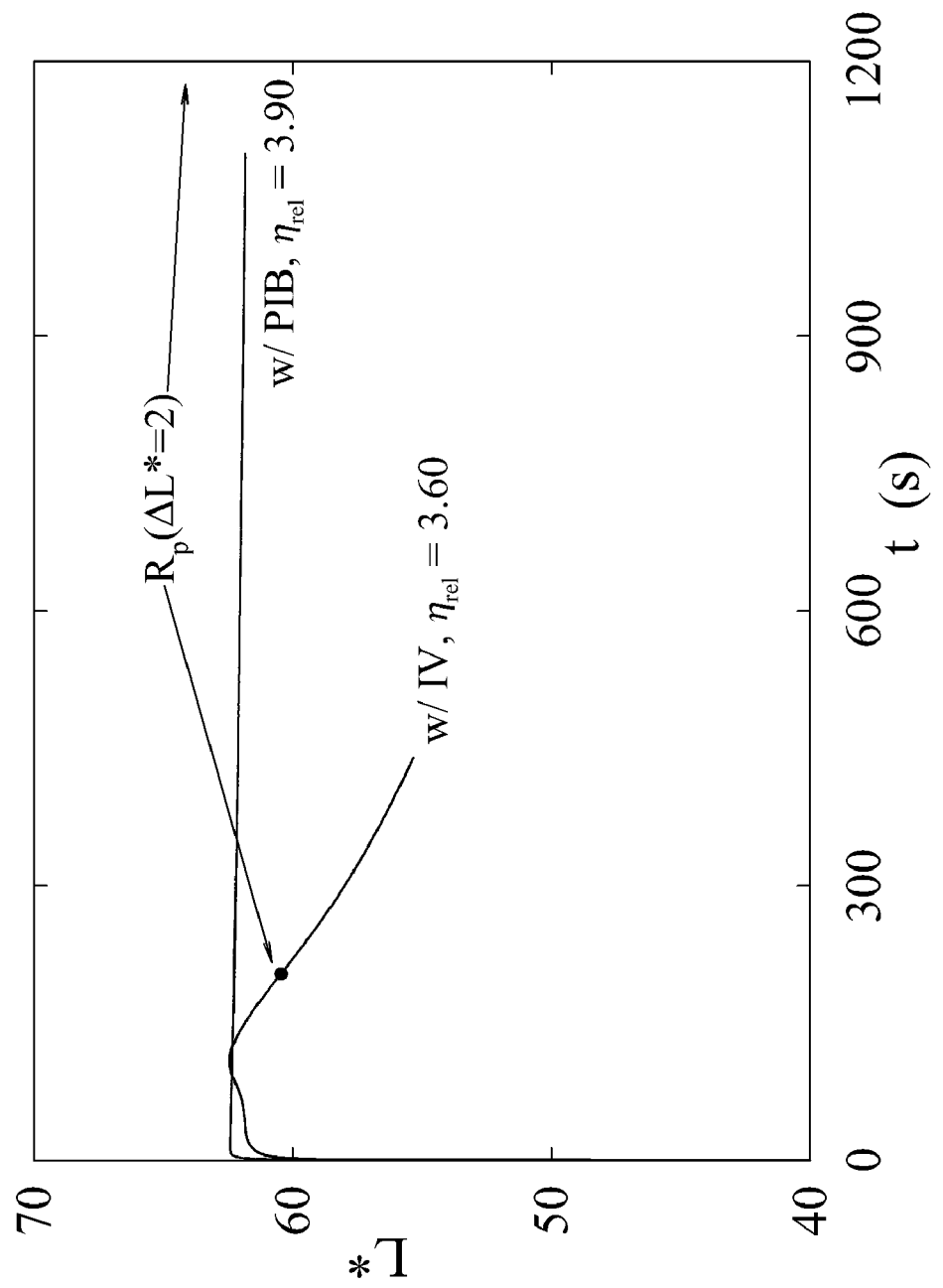
FIGS. 7 and 8 are graphs showing the variation with time of the white state of the first and second preferred media respectively, as compared with similar media having the same viscosities but lacking added polymer, as described in Example 4 below.
Figure 8:
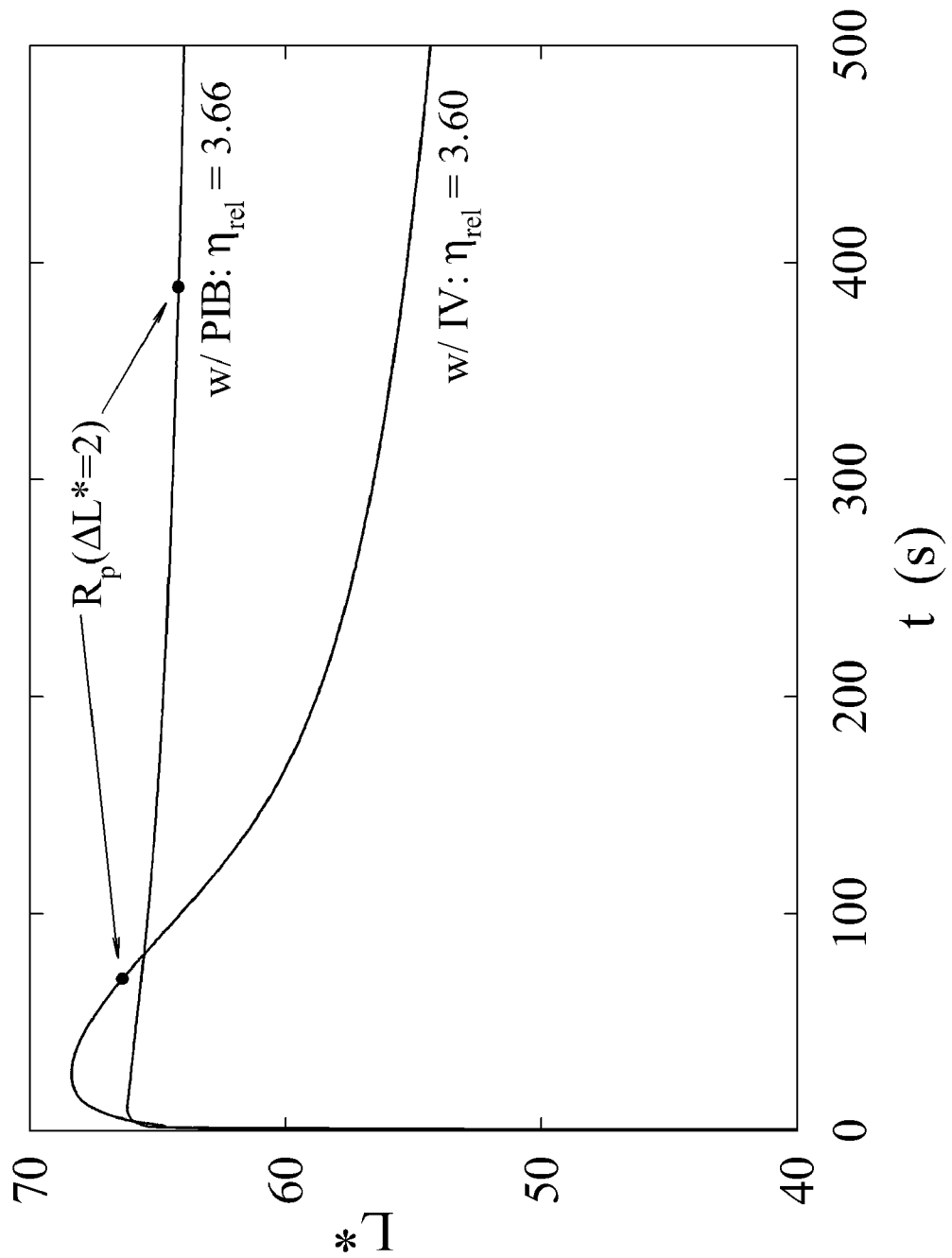

Further experiments were conducted to determine the image stability of displays using Medium A with varying concentrations of PIB. In these experiments, the image stability was measured by first switching pixels to their extreme black and white states for a large number of cycles, using 42V switching pulses; this step was done to erase history effects, if any, resulting from previous measurements on the same pixel. Immediately after these cycles, a voltage pulse necessary to produce a given optical state of the pixel was applied (the end of this pulse marks time zero for the image stability measurements), and thereafter the reflectivity of optical state of the pixel was measured at intervals of 50 ms. (Reflectivity as a function of time of off-axis illuminated pixels was determined using a photo diode detector. Photo detector voltage was transformed to reflectivity by calibrating the voltage response to reflectivity measured with a spectrophotometer over the range 700 to 400 nm where the spectrophotometer was calibrated with a diffuse reflectivity standard.) The results are shown in FIG. 5. In this Figure (and in other Figures described below), reflectance persistence is defined as the time required for lightness L* (see, for example, Hunt, R. W. G. "Measuring Color", 3rd edition, Fountain Press, Kingston-upon-Thames, England (1998). (ISBN 0 86343 387 1)) to change by 2 units from the maximum (minimum for black states in certain later Figures) observed after the conclusion of the addressing pulse; it should be noted that, as shown in FIGS. 7 and 8 below, this maximum does not necessarily occur at the end of the addressing pulse. (Measuring the change in L* from the maximum corresponds most nearly to measuring when a user might begin to notice some degradation of the image on a display. The human eye is far more sensitive to changes in the brightness of a given display over a limited period of time than to differences in brightness between two displays seen at widely different times. Hence, a user will tend to judge the degradation of the image on a display by the change from the recently-seen brightest image, at maximum L*, rather than by when the display reaches some absolute L* value.)

The broken line in FIG. 5 is the viscosity-concentration curve for PIB (18145-5) of FIG. 4 scaled to the reflectance persistence value at zero polymer concentration, and shows approximately the variation of reflectance persistence with polymer concentration which would be expected if changes in reflectance persistence were correlated with pigment settling, which in turn is correlated with changes in viscosity caused by addition of the polymer.

As an alternative means of showing that the changes in reflectance persistence achieved with PIB are not solely due to the change in viscosity caused by the addition of the PIB, experiments were also conducted in which part of the Isopar G in the suspending fluid was replaced by Isopar V, a chemically similar solvent from the same manufacturer but having a higher viscosity. The effect of this substitution is to increase the viscosity of the suspending fluid without introducing any polymer and without substantially changing the chemical environment experienced by the electrophoretic particles. The results from these Isopar V substitution experiments are plotted in FIG. 5 as the points designated "w/IV", these points being plotted at abscissae corresponding to PIB-containing media with the same viscosity.

From FIG. 5, it will be seen that, at PIB concentrations greater than about 0.9 percent by weight ($X_{PIB}$=0.009), the increase in reflectance persistence is greater than would be predicted on the basis of suspending liquid viscosity, and that the discrepancy between experimental and predicted values increases with PIB concentration. It should be noted that since the ordinate scale in FIG. 5 is logarithmic, the increase in reflectance persistence not attributable to change in viscosity is substantially greater than it might at first appear; at a PIB concentration of 1.5 percent by weight ($X_{PIB}$=0.015), the reflectance persistence is approximately 70 times that predicted on the basis of the broken line in FIG. 5, or approximately 30 times that predicted on the basis of the Isopar V experiments.

Similar effects of added polymer on dark state image stability have also been observed, although the threshold concentration of polymer required for enhanced image stability of the dark state is considerably lower than that for the white state. Because for most display applications it is desirable to provide both dark and white state image stability, the threshold concentration for white state image stability determines how much polymer to add. However, the difference in threshold concentrations for white and dark states means that it is possible to produce electrophoretic media that have long time or enhanced image stability of the dark state (as provided by addition of the soluble polymer) and poor image stability of the white state, or image stability of the white state that is provided by another means.

EXAMPLE 3

This Example illustrates that the addition of PIB to the suspending fluid in Medium B produces an increase in image stability greater than that attributable to the increase in relative viscosity caused by the PIB addition.

The PIB and Isopar V addition experiments of Example 2 were repeated with Medium B, except that 15 V switching pulses were used, this being the switching voltage for which Medium B was designed. The results are shown in the accompanying FIG. 6, from which it will be seen that the results achieved with Medium B are qualitatively similar to those achieved with Medium A, as described in Example 2 above, except that the reflectance persistence enhancement provided with PIB only occurs at higher concentrations (greater than about 1.1 percent by weight) with Medium B.

EXAMPLE 4

This Example illustrates that the images produced using Media A and B with the addition of PIB degrade more slowly than do the images from modified Media A and B having a suspending fluid of essentially the same viscosity but lacking PIB.

A Medium A display was prepared with 1.47 percent by weight of PIB added to produce a relative viscosity ($\eta_{rel}$, the ratio of the viscosity of the modified medium to the unmodified medium) of 3.90. A similar Medium A display was prepared by using Isopar V to provide a similar relative viscosity ($\eta_{rel}$=3.60). Also, a similar pair of Medium B displays were prepared, one modified with 1.40 percent by weight of PIB ($\eta_{rel}$=3.66) and the other with Isopar V ($\eta_{rel}$=3.60).

Both pairs of displays were driven to their white state as described in Examples 2 and 3 above, and the L* values of all four displays were monitored over time. The results for the Medium A displays are shown in FIG. 7 and those for the Medium B displays in FIG. 8. In both cases, it will be seen that the reflectance persistence of the medium containing PIB is much greater than that of the medium containing Isopar V; in the Medium A displays, the PIB-modified medium has a reflectance persistence substantially in excess of 1200 seconds, as compared with about 230 seconds for the Isopar V-modified medium, while in the Medium B displays the PIB-modified medium has a reflectance persistence of approximately 390 seconds, as compared with about 70 seconds for the Isopar V-modified medium.

These experiments again show that media modified with PIB display an increase in image stability far greater than that due to the increase in suspending fluid viscosity caused by the addition of the PIB.

EXAMPLE 5

This Example illustrates that this invention allows the stabilization not only of the extreme (black and white) optical states of an electrophoretic display, but also intermediate gray states.

Figure 9:
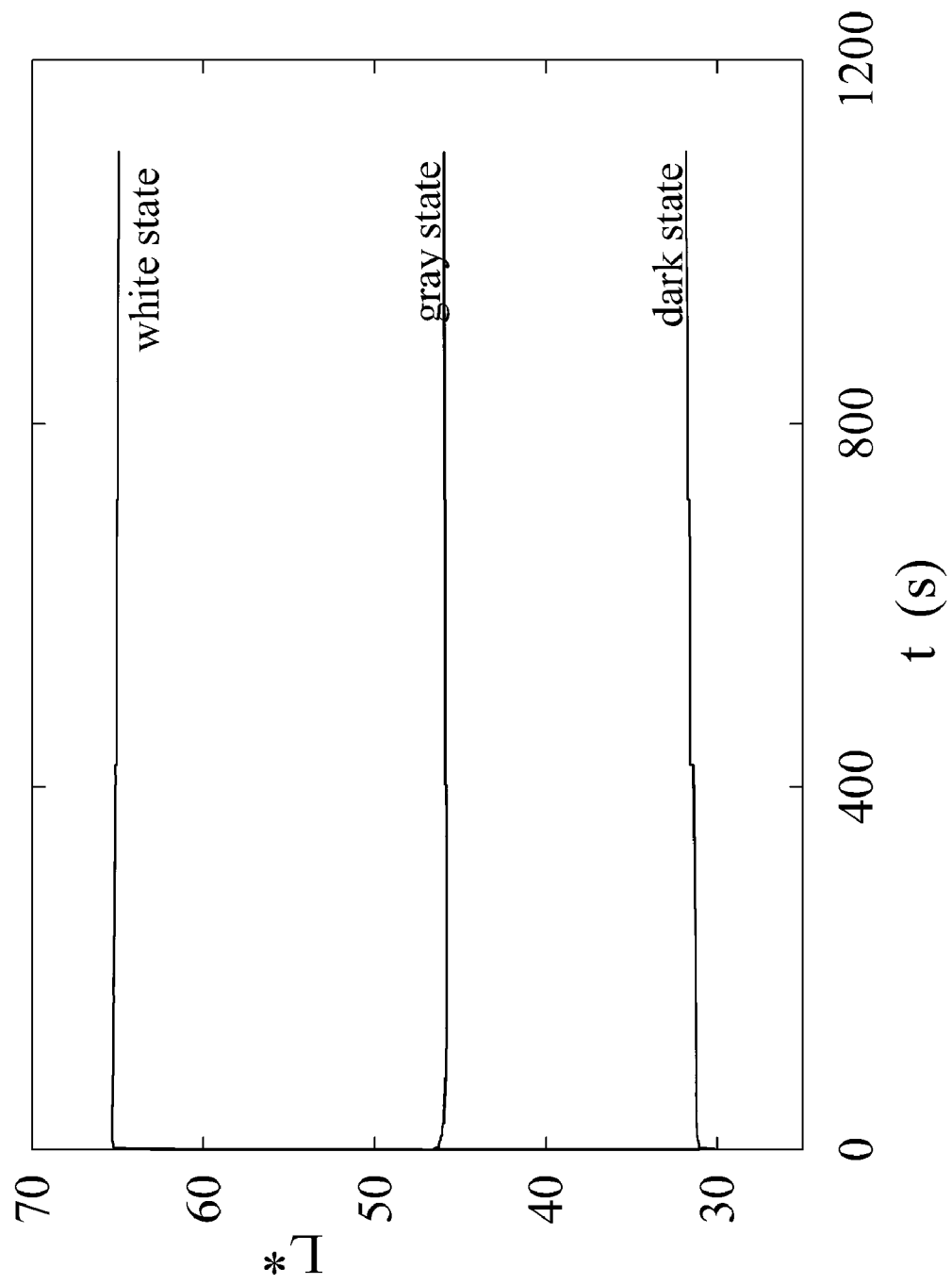
FIG. 9 is a graph showing the variation with time of white, black and gray states of the first preferred medium, as described in Example 5 below.

A display was prepared using Medium A containing 1.53 weight percent of PIB. The display was driven to its black and white states as described in Example 2 above, and also driven to an intermediate gray state by using a driving pulse shorter than that required to change the display from its black to its white state. The L* values of all three states were monitored over time, and the results are shown in FIG. 9. From this Figure, it will be seen that the addition of the PIB was successful in stabilizing the intermediate gray state as well as the black and white states.

EXAMPLE 6

This Example illustrates that the increase in image stability provided by the present invention is not significantly affected by temperature.

Figure 10:
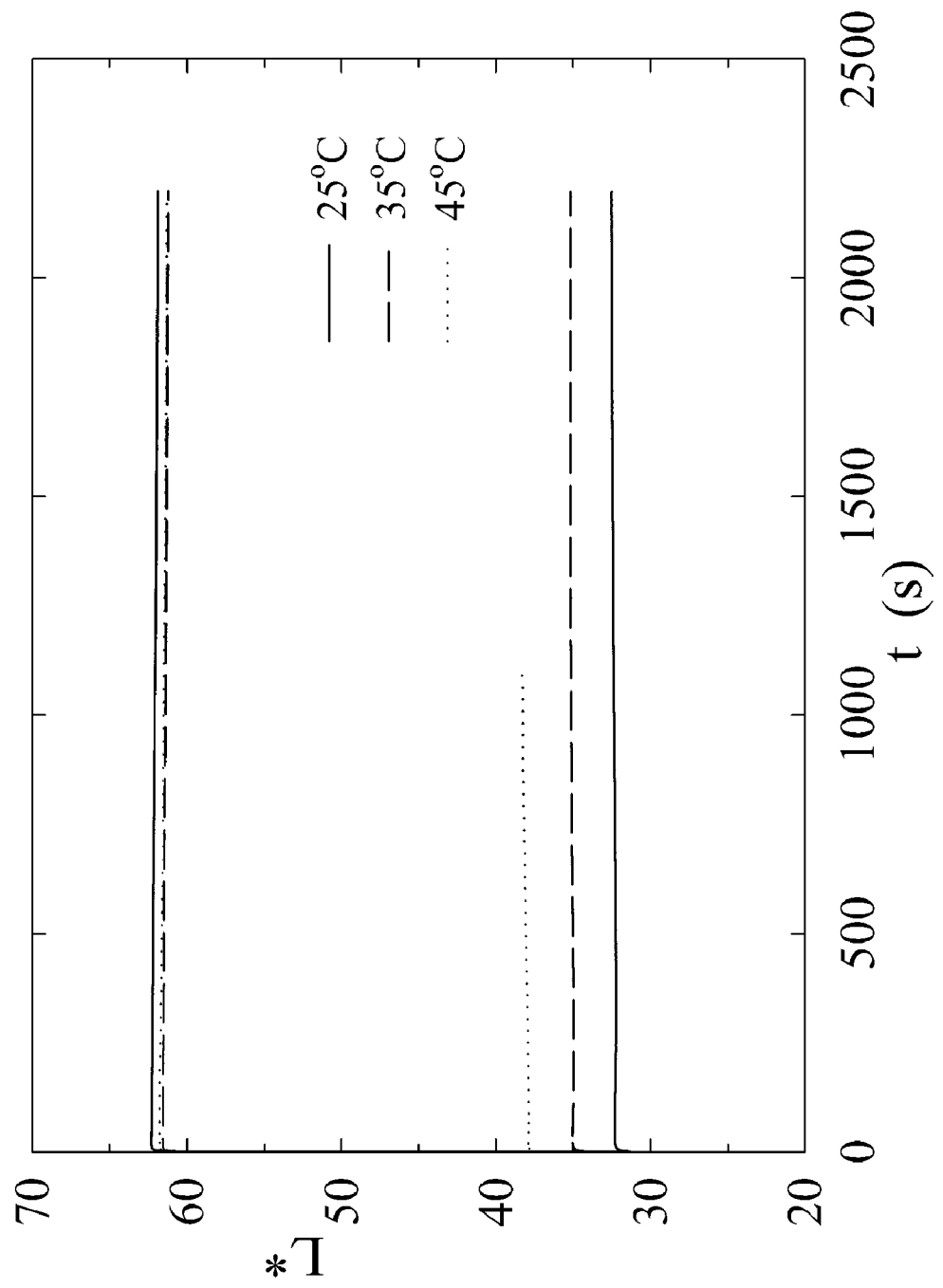
FIG. 10 is a graph showing the variation with time of the white and black states of the first preferred medium at varying temperatures, as described in Example 6 below.

The same PIB-containing Medium A as in Example 5 above was driven to its black and white states as described in Example 2 above while being maintained at temperatures of 25, 35 and 45° C., and the L* values of both states were monitored over time. The results are shown in FIG. 10, from which it can be seen that the increase in image stability provided by the addition of PIB was substantially unaffected by temperature. (The differences in L* of the black state are characteristic of this medium even without PIB addition, and these differences can be reduced by modifying the characteristics of the driving pulse used to bring about the black. However, to provide a true side-by-side comparison, no such adjustment of the characteristics of the driving pulse were made in these experiments.)

EXAMPLE 7

This Example illustrates a method for determining the optimum molecular weight range of a polymer to be used in the electrophoretic medium of the present invention.

Part A: Variation of Intrinsic Viscosity with Molecular Weight Range

A series of polyisobutylenes covering a broad molecular weight range were purchased from Sigma-Aldrich and Scientific Polymer Products, Inc.; according to the suppliers, this series of polyisobutylenes had viscosity average molecular weights ($M_v$) ranging from approximately $10^5$ to $4.6 \times 10^6$. Each polyisobutylene was dissolved separately in the aliphatic hydrocarbon/halocarbon solvent mixture used to prepare Media A and B and the intrinsic viscosities of the resultant solutions at 25° C. were measured in the same way as that used in Example 2 above to prepare the data shown in FIG. 4; the results are shown in FIG. 11.

As is well known to those skilled in polymer chemistry, viscosity data such as that shown in FIG. 4 can be used to determine the intrinsic viscosity for that polymer and solvent system. Intrinsic viscosity ([$\eta$]) is defined as the zero concentration limit of the ratio of specific viscosity ($\eta_{sp}$) to polymer concentration (C), where specific viscosity is defined as ($\eta_{rel}$-1); therefore, [$\eta$] can be determined directly from data such as that presented in FIGS. 4 and 11 (see for example Flory, P. J. "Principles of Polymer Chemistry", Cornell University Press: Ithaca, N.Y. (1953)). Intrinsic viscosity, [$\eta$], is a measure of the capacity of a polymer to enhance the viscosity of a solvent, it increases with molecular weight, and it is sensitive to solvent quality or the goodness of a solvent for a particular polymer chemistry.

Figure 11:
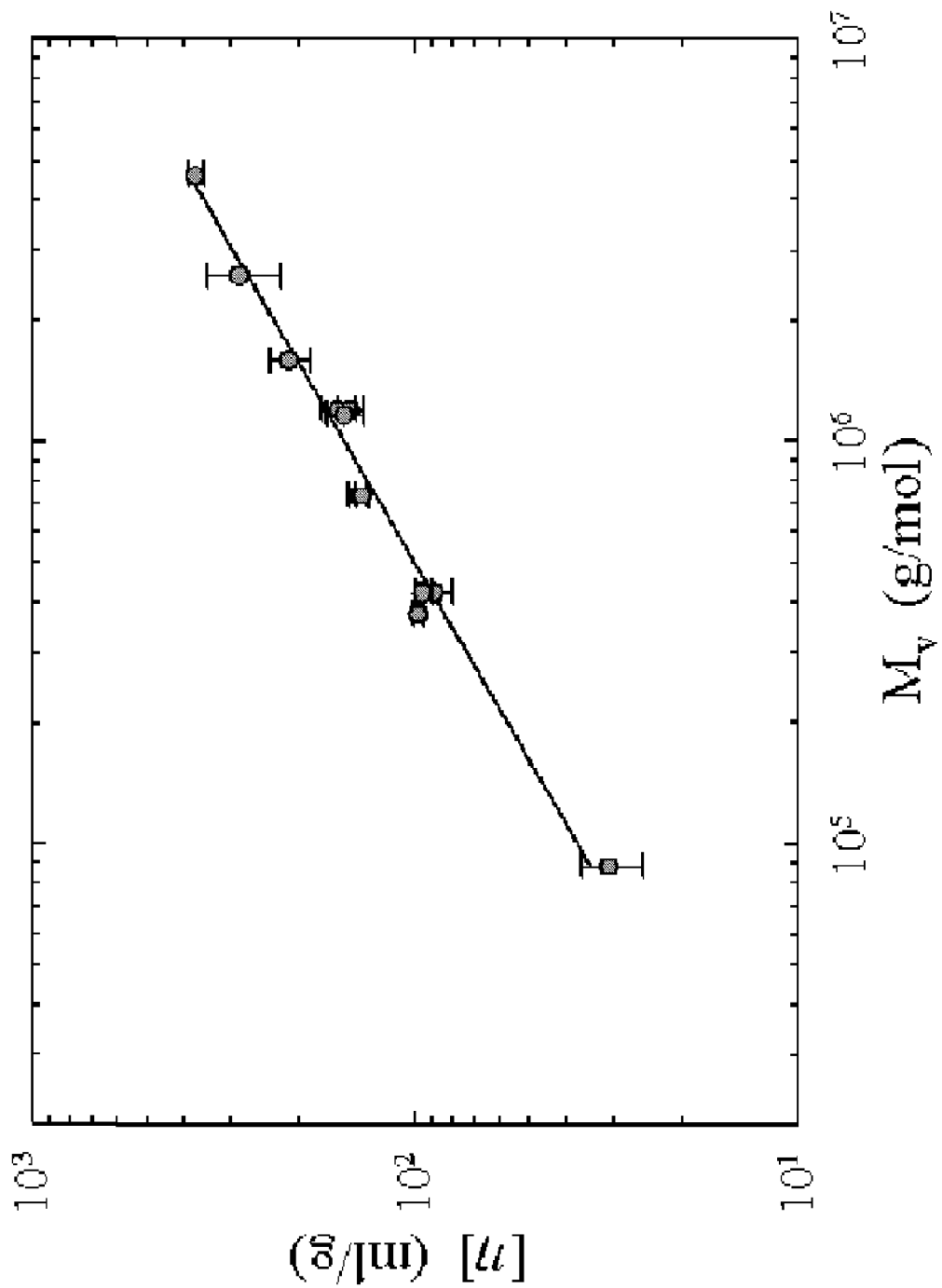
FIG. 11 is a graph showing the variation of intrinsic viscosity of a polymer-containing suspending fluid with viscosity average molecular weight of the polymer, as described in Example 7 below.

The line shown in FIG. 11 is a best linear fit to the data, and its slope is 0.61. The slope represents the exponent a in the Staudinger-Mark-Houwink equation:

$$[\eta]=kM_v^a$$

where $M_v$ is the viscosity average molecular weight and k is a constant, the intercept of the best fit shown in FIG. 11 (see Hiemenz, P. C. "Principles of Colloid and Surface Chemistry", Marcel Dekker: New York, N.Y. (1986).). Values for a vary with polymer and solvent, typically falling in the range 0.5<a<0.8, see, for example, the "Polymer Handbook", Third Edition, J. Brandrup and E. H. Immergut (eds.), Wiley Interscience: New York, N.Y. (1989). A value of 0.5 indicates theta solvency conditions for the dissolved polymer, where theta solvency for a polymer/solvent pair is the condition at which an infinite molecular weight polymer will precipitate from the solvent. Larger values of a, for example 0.7 or greater, indicate good or possibly athermal solvency. Therefore, the slope of 0.61 observed in FIG. 11 indicates that this aliphatic hydrocarbon/halogenated halocarbon solvent mixture is a moderately good solvent for PIB at 25° C.

It is common to use intrinsic viscosity measurements as a method for determining the viscosity average molecular weight of a polymer. For example, if one has a series of different molecular weight polymers of the same chemistry where the molecular weights have been determined using another technique, for example light scattering or gel permeation chromatography, measurement of the intrinsic viscosity in a particular solvent allows preparation of a plot of intrinsic viscosity versus the known molecular weight such as that shown in FIG. 11. Consequently, by measuring the intrinsic viscosity of a new sample of a polymer of that chemistry, a plot such as FIG. 11 can be used to determine the viscosity average molecular weight of that sample. This is an empirical procedure and must be established for each polymer chemistry and solvent combination. However, for a given polymer sample in the context of a curve such as FIG. 11, measurement of the intrinsic viscosity as a function of solvent type, for example over a series of mixtures of solvents or over a range of temperatures, allows one to judge the relative solvating power. For any given polymer sample used in FIG. 11, a decrease in intrinsic viscosity from that shown in FIG. 11 due to a change in say temperature or mixture ratio of the aliphatic hydrocarbon/halogenated halocarbon solvent mixture, suggests a worsening of the solvent quality.

Part B: Image Stability of Inks

Further experiments were conducted to determine the image stability of displays using Medium B with the same polymers as in Part A. For each polymer, displays with different concentrations of the polymer were prepared, using FIG. 11 to ensure that an appropriate viscosity range was covered. White and dark state image stability was measured for each display in the same way as described above, and image stability was plotted as a function of relative viscosity for each polymer in the same way as in FIG. 6.

Figure 6:
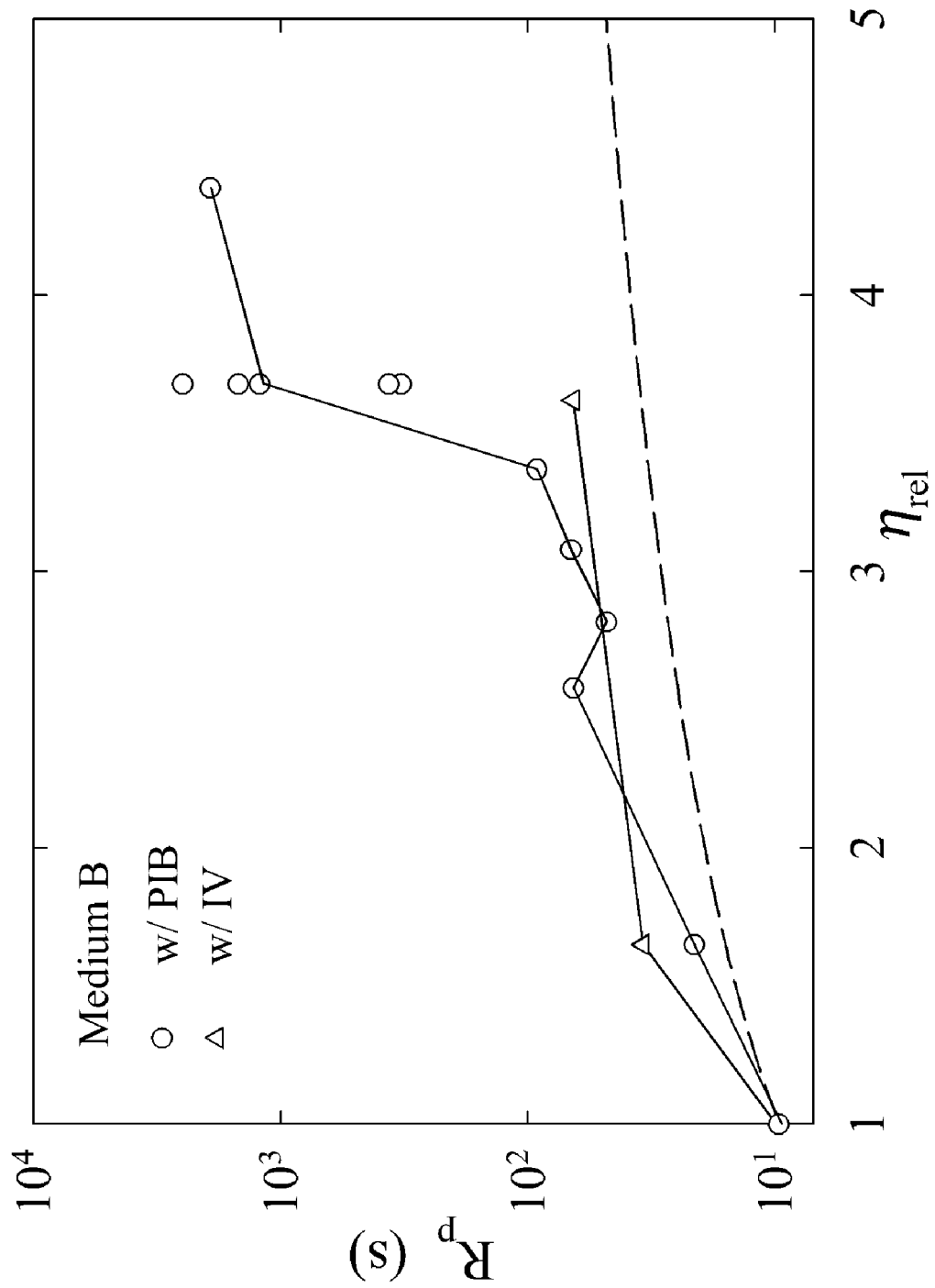
FIG. 6 a graph similar to FIG. 5 but showing the variation of image stability of a second preferred medium with the relative viscosity of the suspending fluid thereof, as described in Example 3 below.

In general the image stability behavior as a function of relative viscosity for each polymer was qualitatively similar to that illustrated in FIGS. 5 and 6; all of the different molecular weight polymers produced enhanced image stability once the polymer concentration was increased above a particular threshold concentration.

Figure 12:
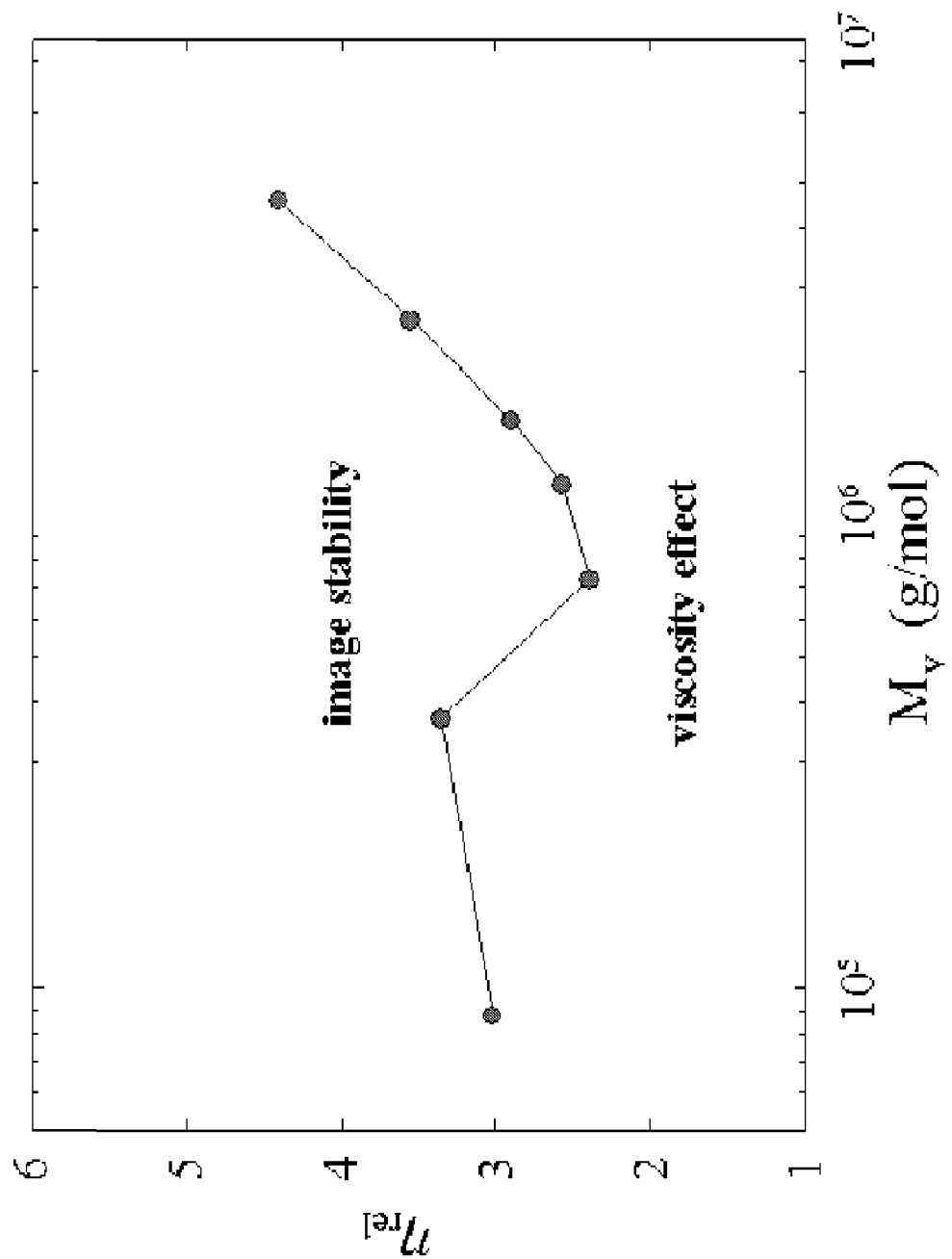
FIG. 12 is a graph showing the variation of onset relative viscosity of a polymer-containing electrophoretic medium with viscosity average molecular weight of the polymer, as described in Example 7 below.
Figure 13:
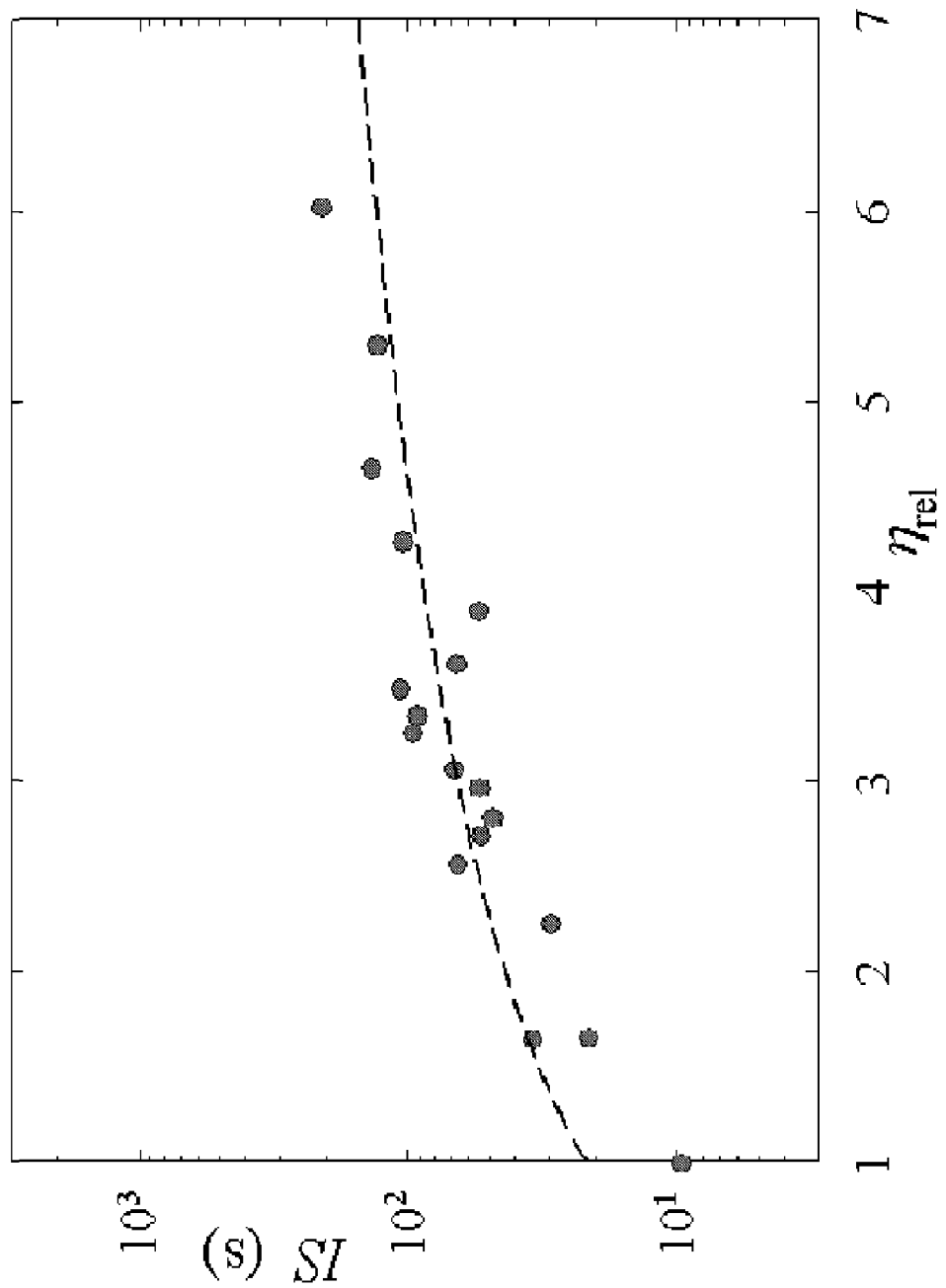
FIG. 13 is a graph showing the variation of image stability of a polymer-containing electrophoretic medium with relative viscosity of the suspending fluid, as described in Example 7 below.

The lowest relative viscosity at which enhanced image stability was observed was denoted as the onset concentration of polymer; this onset concentration decreased monotonically with increasing polymer molecular weight. Since Medium B viscosity varies with polymer concentration and molecular weight and in most practical applications it is usually of interest to minimize medium viscosity in order to minimize the optical switching time of the display, it is useful to measure the threshold or onset concentration of polymer required for enhanced image stability as an onset relative viscosity. FIG. 12 shows this onset relative viscosity as a function of polymer viscosity average molecular weight. At polymer concentrations below the curve in FIG. 12, the Medium B media exhibit image stability that is consistent with the viscosity of the polymer solution. This is illustrated in FIG. 13 which shows image stability (1S) as a function of the Medium B's relative viscosity where $\eta_{rel}$ was changed by addition of the various molecular weight polymers. As in FIGS. 5 and 6, the dashed line in FIG. 13 shows the viscosity scaling for particle sedimentation shifted vertically to $\eta_{rel}$=3.1; the figure indicates that at concentrations lower than the onset concentration (as indicated in FIG. 12), the effect of the polymer on image stability appears to be solely due to its effect on relative viscosity.

Figure 14:
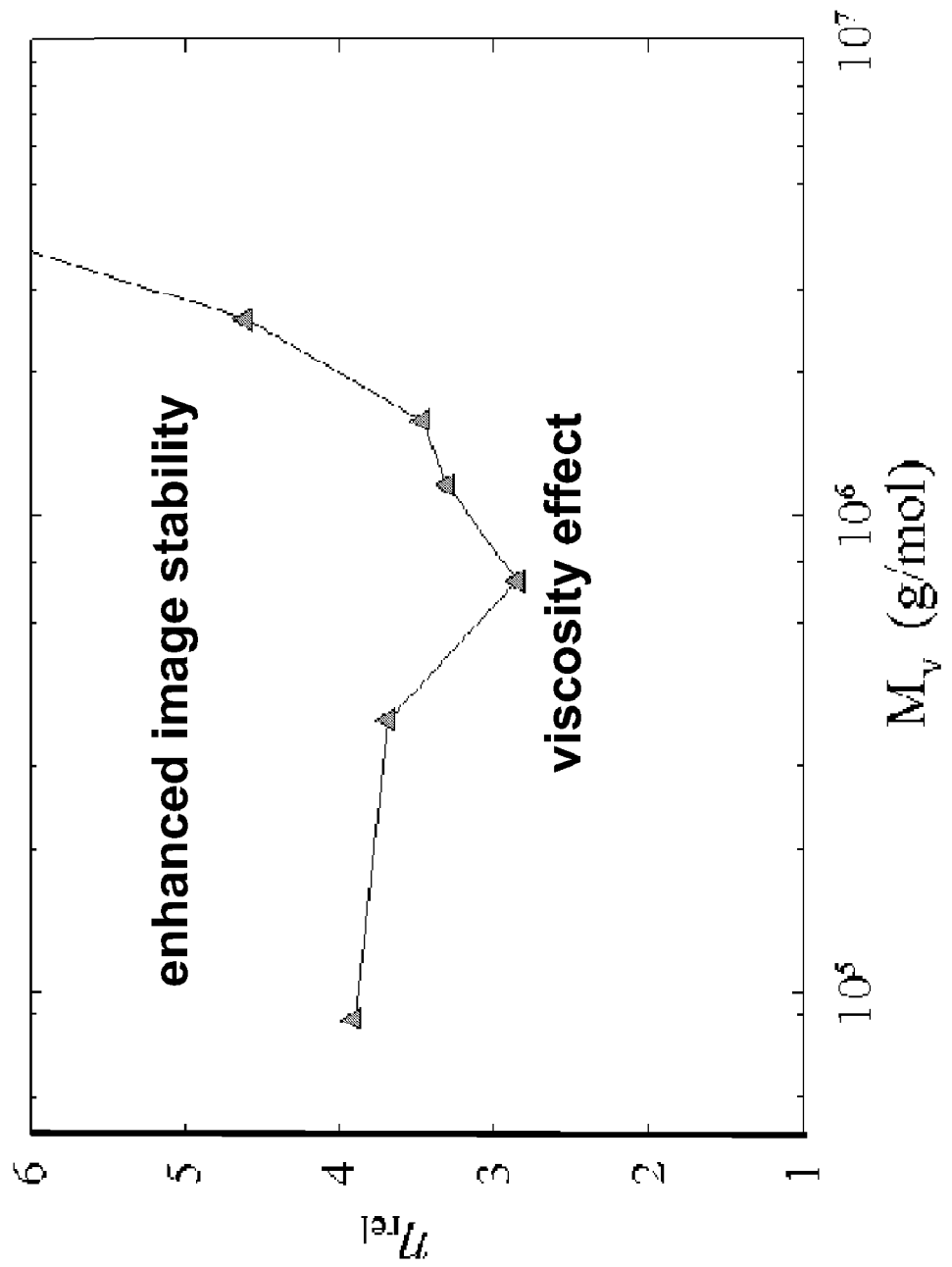
FIG. 14 is a graph showing the variation of relative viscosity required to achieve an image stability of at least 400 seconds with viscosity average molecular weight of the polymer, as described in Example 7 below.

At polymer concentrations greater than the onset concentration (and therefore at larger relative viscosities), Medium B media exhibit significantly enhanced image stability with respect to the viscosity of the medium. In general, for a given polymer molecular weight, image stability increases as polymer concentration is increased above the onset concentration, although as shown in FIG. 6 for some polymer molecular weights the increase in image stability with polymer concentration is quite strong. For others, for example the polyisobutylene with an $M_v$ of 4,600,000 g/mole, the increase is weaker. Therefore, for a polymer with any given molecular weight, the polymer concentration can be "tuned" to achieve a degree of image stability. (The data presented in this Example do not imply that image stability increases without bound as polymer concentration is increased. In any event, as the relative viscosity is increased beyond a certain point (say, 5 or 6), the optical switching time of the media becomes too slow to be of commercial interest. In addition, once image stabilities greater than say 105 or 106 seconds are reached, it becomes difficult to quantify image stability differences.) FIG. 12 shows that to minimize the onset relative viscosity required to achieve enhance image stability, a polyisobutylene with $M_v$ of approximately 730,000 g/mole should be used (in the suspending fluid used in these tests). Of course, a practical electrophoretic medium may require image stabilities greater than that observed at the onset relative viscosity. However, FIG. 14 shows that if, for example, an image stability of 400 seconds is desired, this can be achieved at the lowest relative viscosity by using the polyisobutylene with $M_v$ of 730,000 g/mole.

The experiments described in this Example show that the concentration, and therefore the relative viscosity, required to produce image stability is dependent on the molecular weight of the added polymer. Because in general it is desirable to minimize the optical switching time of an electrophoretic medium, it is also desirable to minimize the increase in viscosity due to the addition of polymer required to produce a particular image stability. For Medium B type media, where the hydrocarbon/halocarbon suspending fluid is a moderately good solvent for broad, molecular weight range, commercially available polyisobutylenes, the optimal viscosity average molecular weight falls in the range $400,000 < M_v < 1,200,000$ g/mole.

EXAMPLE 8

This Example illustrates the use of polymers having low polydispersity indices in the electrophoretic medium of the present invention.

The polyisobutylenes used in Example 7 above are inexpensive commercial materials with broad molecular weight distributions, as indicated by their polydispersity indices (PDI's) in excess of 1.5. The molecular weight distributions of these polymers were analyzed by gel permeation chromatography (GPC) in tetrahydrofuran and Table 2 below shows the values obtained for number average molecular weight ($M_n$), weight average molecular weight ($M_w$), and PDI ($=M_w/M_n$) of certain of the polymers used in Example 7. The samples are organized according to the viscosity average molecular weight $M_v$ reported by the manufacturer.

TABLE 2

Molecular weights for commercially available PIB samples

| $M_v$ | $M_n$ | $M_w$ | PDI |
|---|---|---|---|
| 87,800 | 63,500 | 117,800 | 1.86 |
| 400,000 | 192,700 | 508,000 | 2.64 |
| 729,400 | 331,300 | 953,000 | 2.89 |
| 1,200,000 | 704,700 | 1,129,000 | 1.60 |
| 1,586,000 | 553,700 | 1,566,000 | 2.83 |

As shown in Example 7, because the onset concentration for enhanced image stability was dependent on the molecular weight of the polymer, there was reason to suspect that narrow polymer molecular weight distributions would produce enhanced image stability at lower relative viscosities; by narrowing the molecular weight distribution, one is in effect removing low and high molecular weight material that does not contributing optimally to achieving the desired image stability. Accordingly, narrow molecular weight range polyisobutylene samples were purchased from Polymer Standards Service-USA Inc. (Silver Spring, Md.) and American Polymer Standards Corporation (Mentor, Ohio). According to these manufacturers, these narrow distribution polyisobutylenes were prepared by fractionating a commercially available high molecular weight polyisobutylene. Molecular weight distributions determined by GPC and light scattering, as reported by the manufacturer, are listed in Table 3 below. Table 3 also lists the intrinsic viscosity of the polymers in the hydrocarbon/halocarbon mixture used as the suspending fluid in the Medium B media, as determined empirically.

TABLE 3

Molecular weights and intrinsic viscosity [η] for narrow distribution PIB samples

| $M_n$ | $M_w$ | PDI | [η] (ml/g) |
|---|---|---|---|
| 164,200 | 301,800 | 1.84 | 58.4 |
| 247,000 | 302,000 | 1.22 | 64.6 |
| 451,000 | 583,000 | 1.29 | 80.3 |
| 703,000 | 856,000 | 1.22 | 113.5 |

The effect of molecular weight distribution range on viscosity can be seen by comparing the polymer with $M_v$ 400,000 in Table 2 with the polymer with $M_n$ 451,000 in Table 3. Although the weight average molecular weight of the polymer from Table 2 is slightly lower than that of the polymer from Table 3, the intrinsic viscosity and relative viscosity of the Table 2 polymer is higher than that of the Table 3 polymer. This occurs because the higher molecular weight components in the Table 2 polymer make disproportionately larger contributions to the viscosity of its solution. Since there was reason to believe that these higher molecular weight components do not add as much to enhancing the image stability of an electrophoretic medium, it appeared that enhanced image stability could be achieved at lower relative viscosities by decreasing the breadth of the polymer molecular weight distribution.

Figure 15:
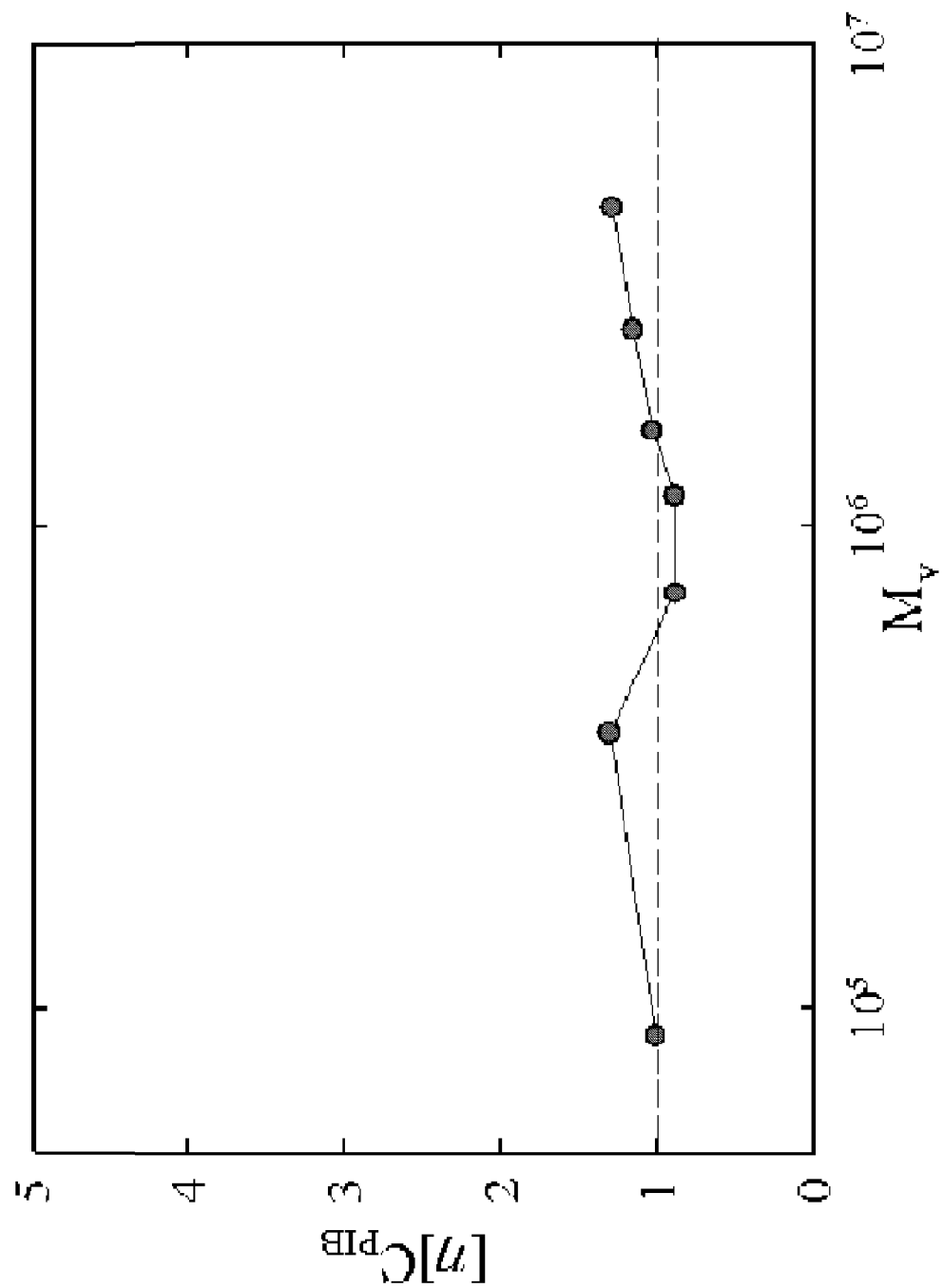
FIG. 15 is a graph showing the variation of onset concentration for enhanced image stability normalized by intrinsic viscosity of a polymer-containing electrophoretic medium with viscosity average molecular weight of the polymer, as described in Example 8 below.

Because only limited amounts of the Table 3 polymers were available and their cost per unit weight was orders of magnitude higher than those of the Table 2 polymers, the determination of onset concentrations was refined by replotting the data shown in FIG. 12 as a scaled onset concentration ([η]$C_{PIB}$) against viscosity average molecular weight ($M_v$) where $C_{PIB}$ is the concentration of polymer required to reach the onset of enhanced image stability. The results are shown in FIG. 15, which indicates that the onset concentration of polymer required to produce enhance image stability can be estimated as $[η]^{-1}$.

Figure 16:
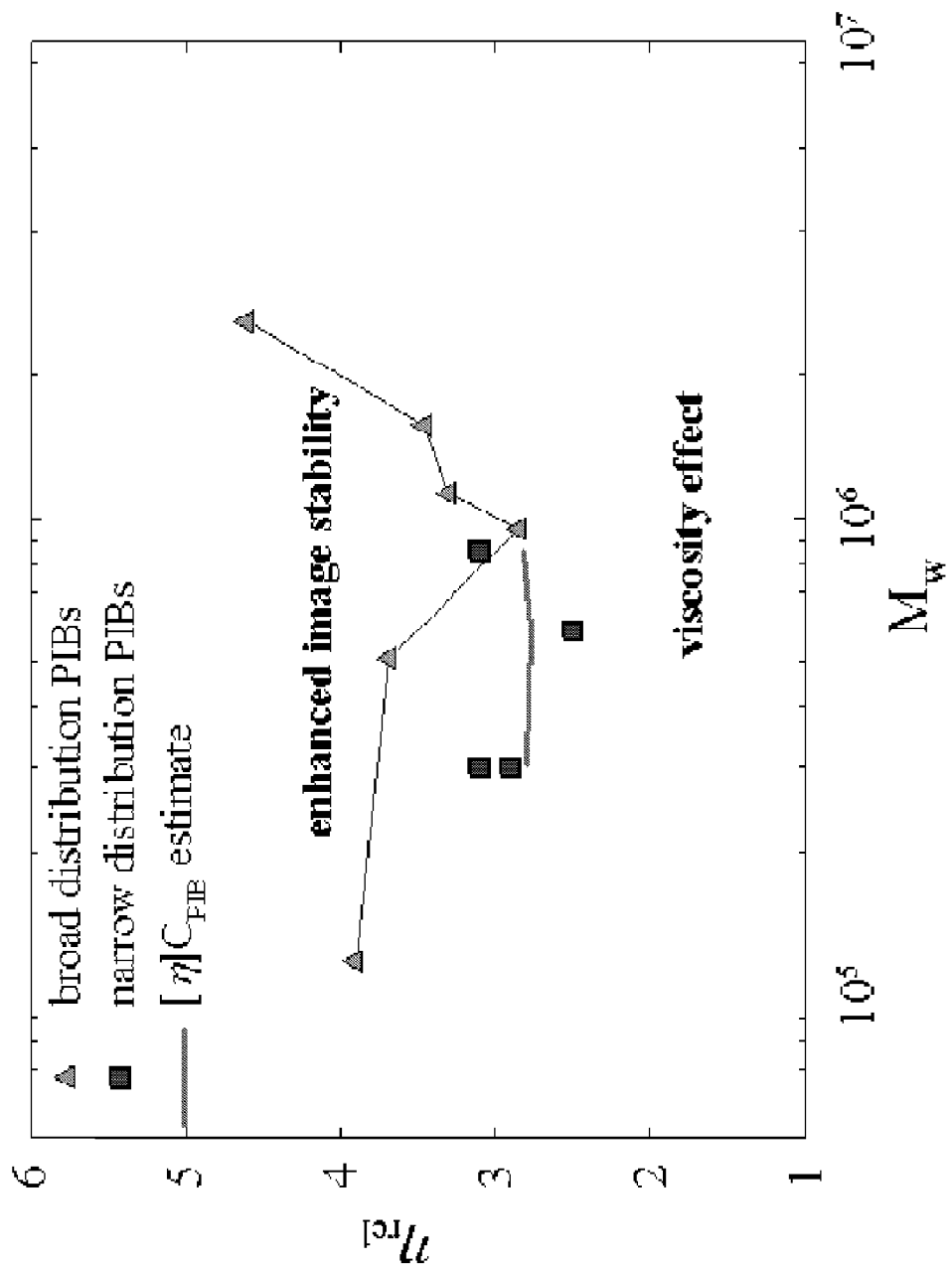
FIG. 16 is a graph showing the variation of relative viscosity required to achieve an image stability of at least 400 seconds with weight average molecular weight of the polymer, as described in Example 8 below.

Accordingly, Medium B displays were prepared using the Table 3 polymers over a range of polymer concentrations encompassing the $[η]^{-1}$ concentration guide. FIG. 16 shows the relative viscosity required to achieve image stability of 400 seconds against weight average molecular weight for the Table 3 polymers, and also reproduces the corresponding data from FIG. 13 for the Table 2 polymers. This Figure shows that enhanced image stability can be achieved at significantly lower relative viscosities by refining or narrowing the molecular weight distribution of the polymer. For example, for the Table 2 (broad distribution) polymer with $M_w$ 508,000, the $η_{rel}$ required to produce at least 400 seconds of image stability was approximately 3.7, while for the Table 3 (narrower distribution) polymer with $M_w$ 583,000, similar image stability was observed at an $η_{rel}$ of approximately 2.5.

FIG. 16 also illustrates that the $[η]^{-1}$ rule provides an excellent starting point for predicting the onset concentration of polymer necessary to produce image stability. In this Figure, the heavy line shows the $[η]^{-1}$ rule predictions for image stability of the Table 3 polymers where the experimentally determined [η] values for these polymers in the Medium B suspending fluid are given in Table 3. Because [η] is sensitive to the molecular weight distribution and the solvent quality of the suspending fluid of an electrophoretic medium for a polymer, this result indicates that the $[η]^{-1}$ rule provides a general method for predicting the concentration of a soluble polymer required to produce the onset of enhanced image stability in an electrophoretic medium.

The experiments described in this Example show that the relative viscosity increase of electrophoretic media caused by the addition of soluble polymer in accordance with the present invention can be minimized by reducing the breadth of the molecular weight distribution of the added polymer. The polymers used in Example 7 had polydispersity indices ranging from 1.6 to almost 3. By lowering the PDI to less than 1.3, the increase in relative viscosity due to addition of the polymer could be reduced by more than 30 percent for a polymer with a given $M_w$. This rule does not exclude using broad, multi-modal distribution polymers to achieve image stability in the present invention, in fact some commercial polyisobutylenes have extremely broad molecular weight distributions, yet are still useful in this invention.

Also, the experiments described in this Example provide a rule for estimating the minimum concentration of polymer (and therefore minimum viscosity for a particular molecular weight) required to produce enhanced image stability. The rule is that the onset concentration of a given molecular weight polymer required to produce enhanced image stability will be found in the vicinity of $[η]^{-1}$. This rule is useful because it can be applied to guide formulation in other polymer/suspending systems which may be of interest in electrophoretic media. Thus, for example, if one wishes to use polyisobutylene in a different electrophoretic medium or suspending fluid, one measures [η] for polyisobutylene in the new suspending fluid, then estimates that the polymer concentration at which enhanced image stability with the minimum increase in medium relative viscosity will be found in the vicinity of $[η]^{-1}$ and focuses one's formulation optimization in that range of polymer concentrations, say $0.5[η]^{-1} < C_{PIB} < 1.5[η]^{-1}$. This rule can also be applied when using other types of polymer, although additional consideration of acceptable polymers and the solvent quality of suspending fluids is also required; this is illustrated in Example 9 below.

EXAMPLE 9

This Example illustrates the solvent qualities needed in a suspending fluid for a polymer used in the electrophoretic medium of the present invention.

Figure 17:
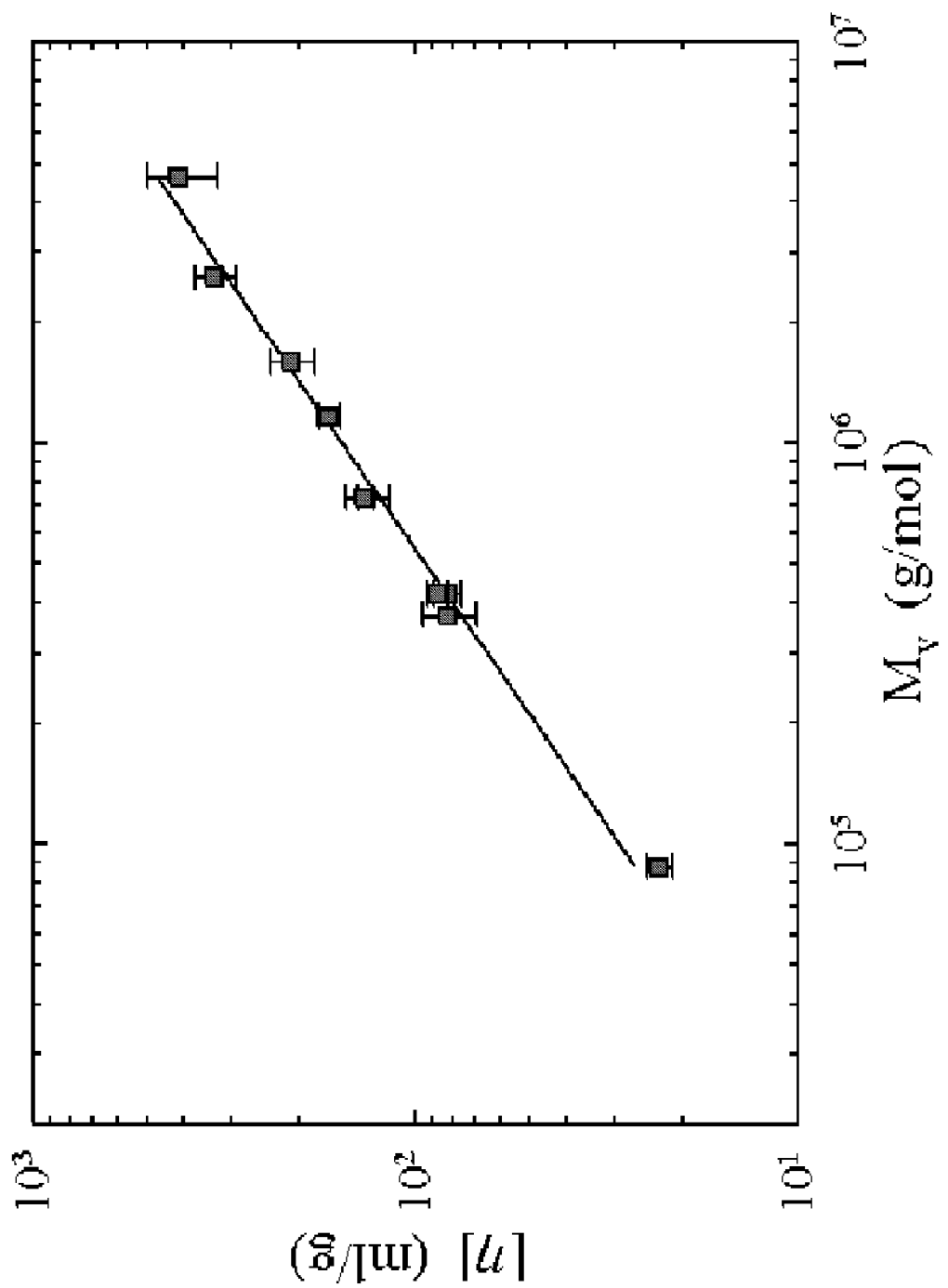
FIG. 17 is a graph showing the variation of intrinsic viscosity of a polymer-containing electrophoretic medium with viscosity average molecular weight of the polymer, as described in Example 9 below.

The experiments used to generate the data in FIG. 11 were repeated using the same polyisobutylenes, but in the pure aliphatic hydrocarbon suspending fluid used in Medium C media rather than the hydrocarbon/halocarbon mixture previously used; the results are shown in FIG. 17. The slope of the best linear fit line in this Figure is 0.73, indicating that the hydrocarbon was a good solvent for polyisobutylene, and less certainly (given the uncertainty in the data and the small number of samples) a better solvent than the hydrocarbon/halocarbon mixture previously used.

Medium C displays were prepared using the polyisobutylene with $M_v$ 730,000 g/mole, where the concentration of polymer was determined using the constant $[\eta]C_{PIB}$ rule derived in the previous Example. The displays produced had comparable image stability to that expected based on the behavior of Medium B displays prepared in Example 7 above.

Figure 18:
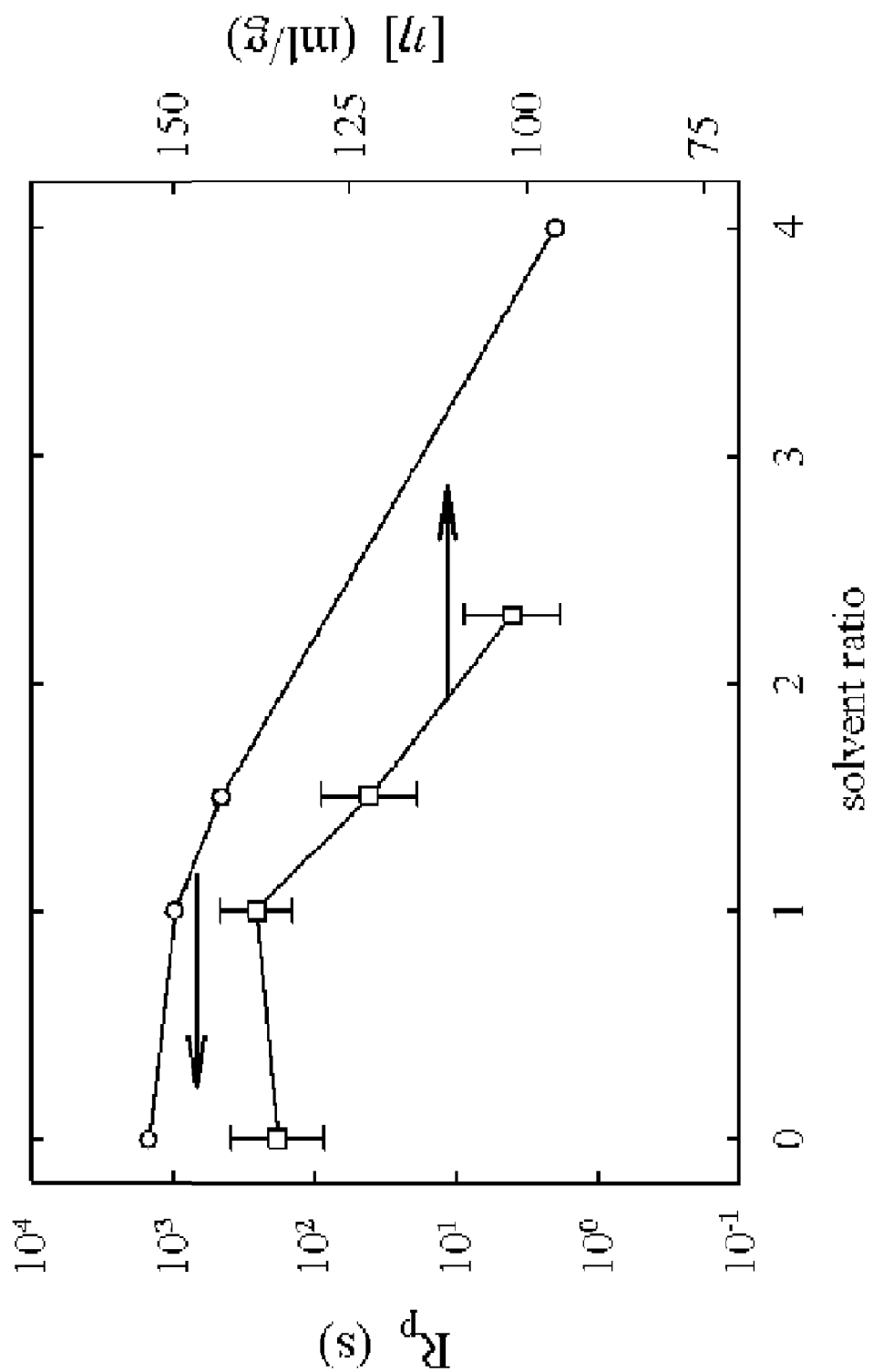
FIG. 18 is a graph showing the variation of white state image stability of a polymer-containing electrophoretic medium with halogenated hydrocarbon content of the suspending fluid, as described in Example 9 below.

The data in FIGS. 11 and 17 suggest that, at least at 25° C., increasing the amount of halocarbon in the hydrocarbon/halocarbon mixture used in the Media A and B displays decreases the overall quality of the suspending fluid for polyisobutylene. Indeed, it has been observed that polyisobutylene can be precipitated from concentrated solutions in aliphatic hydrocarbon by addition of halocarbon, suggesting that polyisobutylene is at best poorly soluble in the halocarbon itself. FIG. 18 shows the white state image stability performance of a series of Medium C displays as a function of halocarbon to aliphatic hydrocarbon mass ratio in the suspending fluid. FIG. 18 shows that as the concentration of halocarbon is increased, the image stability becomes poorer. With 80 weight percent halocarbon, the display behaves as if no polyisobutylene is present, and indeed this is consistent with an observation that the concentrated polyisobutylene stock solution used to prepare the displays did not mix into such a suspending fluid. FIG. 18 also shows that the intrinsic viscosity of $M_v$ 730,000 g/mole polyisobutylene as a function of solvent ratio; the decrease in $[\eta]$ with increasing halocarbon content indicates that the solvent quality gets poorer. On the basis of these observations, a solvent quality criterion for choosing a polymer and suspending fluid for producing enhanced image stability in an electrophoretic display can be suggested: the polymer/suspending fluid combination must be such that the fluid is at least a theta solvent for the polymer at room temperature. In order to extend the temperature range of the enhanced image stability, the suspending fluid should be at least a moderately good to good solvent for the polymer. As described earlier, this can be reflected in the scaling exponent a for intrinsic viscosity with molecular weight, where the above criterion suggests a slope of at least 0.5, optimally a slope of $0.55 < a < 0.8$.

Note that in preparing the displays used to generate the data shown in FIG. 18, no correction was made for the effect of solvent quality on $[\eta]$, although as shown $[\eta]$ decreased with increasing halocarbon content. Over the optimal solvent quality range specified in the previous paragraph, one can use the constant $[\eta]C_{PIB}$ rule to correct for the decrease in solvent quality with increasing halocarbon content.

The data provided in this Example define a range of acceptable solvent qualities for polymer/suspending fluid combinations for producing enhanced image stability in electrophoretic displays. The data show that polyisobutylene can be used to produce enhanced image stability over a range of suspending fluids, and that good enhanced image stability is observed when the fluid is verified to be at least a moderately good solvent for the polymer. As the solvent quality of the fluid for polyisobutylene is made poorer by changing its composition, the image stability is degraded. For producing enhanced image stability over the broadest possible operating temperature range, polymer/suspending fluid combinations should be chosen such that the scaling exponent a for intrinsic viscosity with molecular weight falls within the range $0.55 < a < 0.8$, with higher values of a being better.

Image stability in Medium C displays, which differ substantially in pigment concentration from Medium A and B displays, also demonstrates that the effectiveness of polymer in inducing image stability can be maintained over a broad concentration of pigment.

EXAMPLE 10

This Example illustrates the preparation of electrophoretic media having image stabilities of several hours to days.

Figure 19:
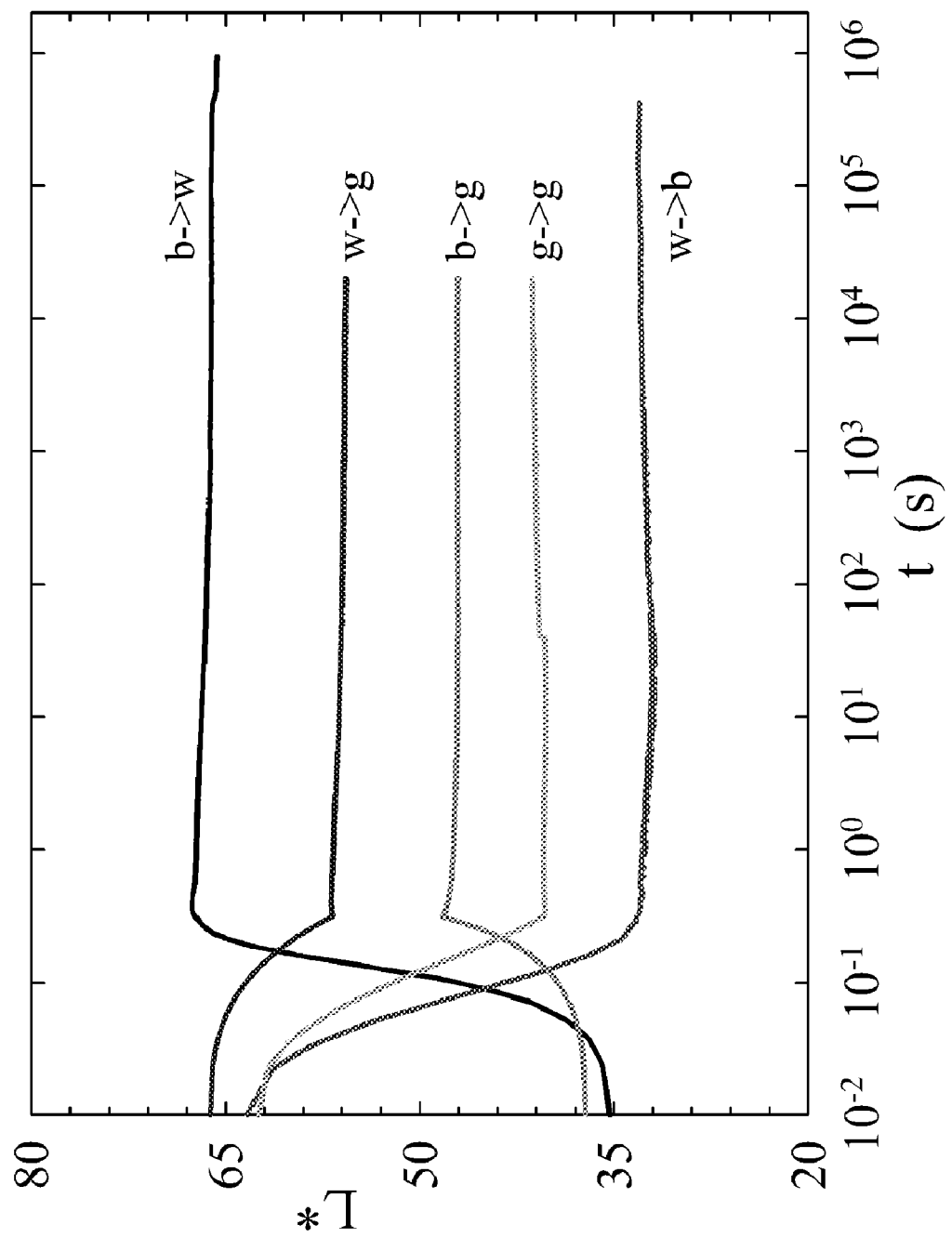
FIG. 19 is a graph showing the long term image stability of various optical states of an electrophoretic medium, as described in Example 10 below.

Medium C displays were prepared using 53.5 g of a 13 weight percent solution of 730,000 viscosity average molecular weight polyisobutylene in Isopar solvent in each 1064 g. of Medium C internal phase prepared as described above. The displays were then subjected to five different types of optical state transitions, namely black-to-white (b→w), white-to-black (w→b), black-to-gray (b→g), white-to-gray (w→g), and gray-to-gray (g→g) where black and white denote the extreme optical states of the display. The black-to-white (b→w) and white-to-black (w→b) transitions were effected by exposing the medium to 15 V for 0.3 seconds, with correspondingly shorter drive pulses for the other transitions; after application of this single drive pulse, the display was left unpowered for the remainder of each experiment. The L* of each display was measured in the manner previously described during and after the application of the drive pulse, and the results are shown in FIG. 19. Because the time scale of the measurements covers eight orders of magnitude, the onset of each transition appears digitized.

FIG. 19 shows that white and black states of these displays exhibit image stabilities of the order of $10^6$ seconds. Careful study of, for example, the b→w transition in FIG. 19, reveals that after the drive pulse was completed there was a slow decay in white state lightness; however, the total decay over the time scale covered in FIG. 19 was still only approximately 1-2 L*, so the image stability is greater than 106 seconds. The most significant change in lightness occurs at relatively short times with the rate of change decreasing to extremely low values as the measurement time exceeds $10^3$ seconds. Indeed, it was observed visually that these lightness states persist for months, i.e., over periods in excess of $10^7$ seconds, but this very long time image stability was not followed quantitatively. The image stability behavior was reproducible over months of switching and long time residence of the display in a lightness state does not affect the ability to achieve the lightness in subsequent transitions, i.e., no permanent image retention or image burn-in was observed.

FIG. 19 also shows that Medium C gray states were image stable, exhibiting lightness decay rates similar to those observed for the black and white states. The gray state image stability thus demonstrated enables development of a general image flow waveform for switching pixels, i.e., gray-to-gray addressing in an electrophoretic display.

This Example illustrates general image stability in a Medium C type electrophoretic medium, and shows the stability of black and white states, as well as intermediate gray states. This Example also shows that the stability of a given display state is the same independent of the path by which this state is reached, and that extremely long term image stability, at least of the order of 106 seconds, can be achieved in a low voltage rapidly addressed electrophoretic medium.

EXAMPLE 11

This Example illustrates that the image stabilities of the various states shown in Example 10 are substantially independent of temperature.

Portable information appliances, such as personal digital assistants (PDA's), and other consumer devices are exposed to a broad range of temperatures during normal use, and thus the displays used in appliances and devices need to operate over a range of (typically) 0 to 50° C. The experiments described in Example 10 were repeated over this temperature range, and it was confirmed that the image stability was not substantially affected by temperatures within this range.

Figure 20:
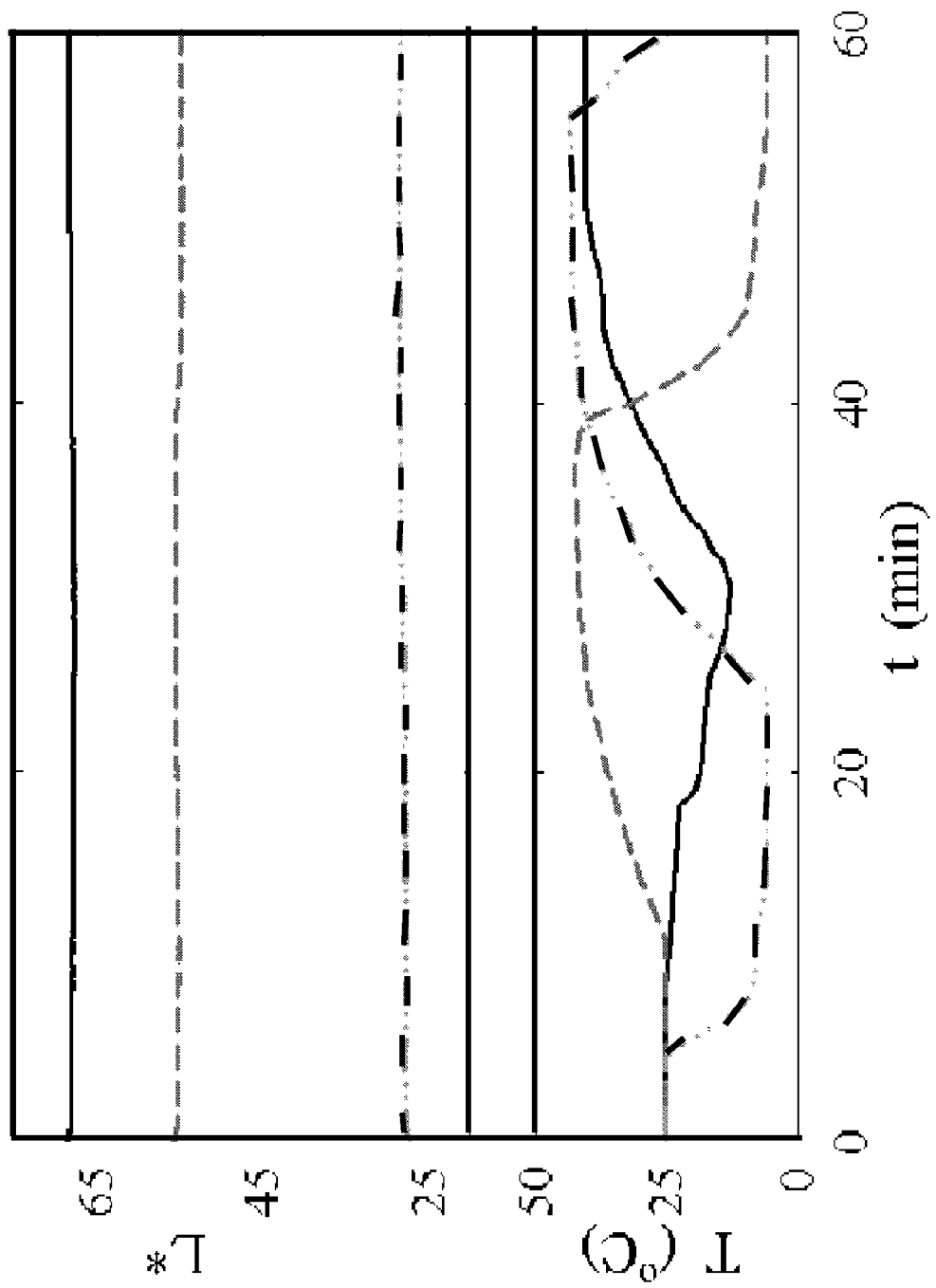
FIG. 20 is a graph showing the effect of temperature on the long term image stability of various optical states of an electrophoretic medium, as described in Example 11 below.

Experiments were also conducted to determine whether any changes occurred when a display was driven to a specific optical state at one temperature and the temperature of the display was thereafter changed. More specifically, the displays used in Example 10 were driven to their black, gray and white states at 25° C. in the manner described in that Example, and thereafter the displays were left unpowered while the temperature was varied over the range of 0 to 50° C. The results are shown in FIG. 20; the lower part of this Figure shows the variation of temperature of the black, gray and white displays with time, while the upper part of this Figure shows the variation of L* with time. It will be seen that changes in temperature within this range had substantially no effect on the optical states of the displays.

This Example shows that polymers such as polyisobutylene can be used to achieve image stability over the typical operating temperature range of a display. A display with this type of image stability can be expected to maintain an image even if the external environmental temperature alters the display temperature significantly.

EXAMPLE 12

This Example illustrates that addition of a polymer to an electrophoretic medium in accordance with the present invention provides a non-linear response to a low voltage impulse applied to the medium.

A hybrid Medium B/Medium C display was prepared using a suspending fluid, surfactant, binder, lamination adhesive and fabrication process substantially the same as the Medium B description above, but with a pigment loading and capsule size substantially the same as the Medium C description above. This hybrid medium contained polyisobutylene (18146-3) at a concentration such that $\eta_{rel}$ was 3.3. This display switched between its black and white states using a drive pulse of 15 V for 500 milliseconds, and had an image stability in excess of 106 seconds. The white state had an L* value of 68 and the black state an L* value of 22, as indicated by the broken lines in FIG. 21.

Figure 21:
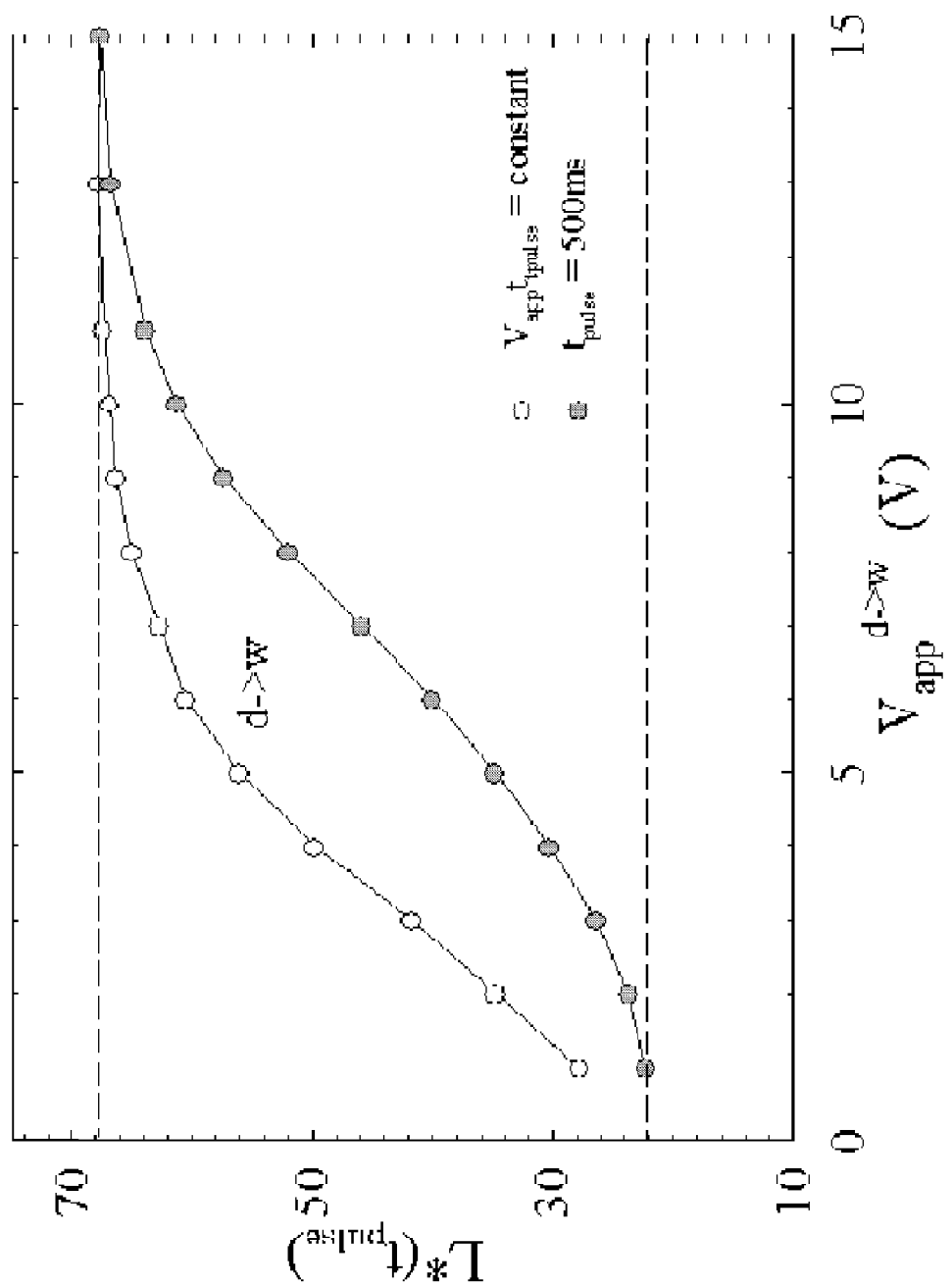
FIG. 21 is a graph showing the non-linear response to low electric fields of an electrophoretic medium, as described in Example 12 below.

When attempts were made to switch the display between its black and white states using lower voltages, it was observed that the response of the display was substantially non-linear. The open circles in FIG. 21 show the L* values resulting from the application to the black state of the display of driving pulses having combinations of voltage and pulse lengths having impulses (i.e., integrals of applied voltage with respect to time) identical to those of the 15V, 500 millisecond pulse which sufficed to switch the black state completely to the white state. It will be seen from FIG. 21 that below about 10 V, the response of the display to the applied impulse becomes substantially non-linear. For example, application of 2 V to the display for 3750 milliseconds produces a change in L* only from 22 to about 34, even though the impulse of such a drive pulse is the same as the 15V, 500 millisecond pulse which raises L* from 22 to 68. The filled circles in FIG. 21 show the L* values obtained by applying the specified voltage for 500 milliseconds; it will be seen that application of 2 V to the display for this period produces a change in L* of less than 2 units, a change which is almost imperceptible visually, so that the display exhibits an apparent threshold. Since careful observation does indicate that the display is still switching at low voltages, albeit slowly, an apparent threshold will be observed at 2 V, for time scales shorter than 3750 milliseconds, depending upon the tolerable change in L*. Although FIG. 21 only shows data for the black to white transition, similar behavior was observed for the white to black transition.

This weak threshold behavior is advantageous because it makes the display insensitive to any DC offset parasitic voltages (typically up to several hundred mV of both positive or negative bias) present in the backplane of an active matrix display (these parasitic voltages are continuous whenever the transistors of the backplane are powered).

It has been found that the impulse non-linearity of the electrophoretic medium can be adjusted by altering the concentration of the polymer used to produce the enhanced image stability. The severity of the non-linearity increases with increasing polymer concentration for concentrations above the onset concentration for any given molecular weight polymer. As the severity of the impulse non-linearity is increased, electrophoretic displays exhibit a greater apparent threshold voltage. High thresholds may be a desirable attribute to enable use of electrophoretic media with passive matrix addressing schemes.

This Example shows that adding a polymer to the suspending fluid to provide enhanced image stability in accordance with the present invention also changes the optical response of the medium, making this response non-linear to impulse in a manner analogous to the strong shear thinning behavior in rheology. This non-linear impulse response causes the medium to appear to exhibit a voltage threshold behavior. The nature or degree of the non-linearity can be adjusted by adjusting the polymer concentration, the severity of the non-linear behavior increasing with increasing polymer concentration and becoming significant at concentrations greater than the onset concentration. This phenomenon may be useful for developing inexpensive passively addressed displays.

Apart from the inclusion of the non-absorbing polymer, the electrophoretic media of the present invention may employ the same components and manufacturing techniques as in the aforementioned patents and applications. The following Sections A-E describe useful materials for use in the various components of the encapsulated electrophoretic displays of the present invention.

A. Electrophoretic Particles

There is much flexibility in the choice of particles for use in electrophoretic displays, as described above. For purposes of this invention, a particle is any component that is charged or capable of acquiring a charge (i.e., has or is capable of acquiring electrophoretic mobility), and, in some cases, this mobility may be zero or close to zero (i.e., the particles will not move). The particles may be neat pigments, dyed (laked) pigments or pigment/polymer composites, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles for use in the invention may further include scattering pigments, absorbing pigments and luminescent particles. The particles may be retroreflective, such as corner cubes, or they may be electroluminescent, such as zinc sulfide particles, which emit light when excited by an AC field, or they may be photoluminescent. Zinc sulfide electroluminescent particles may be encapsulated with an insulative coating to reduce electrical conduction. Finally, the particles may be surface treated so as to improve charging or interaction with a charging agent, or to improve dispersibility.

One particle for use in electrophoretic displays of the invention is titania. The titania particles may be coated with a metal oxide, such as aluminum oxide or silicon oxide, for example. The titania particles may have one, two, or more layers of metal-oxide coating. For example, a titania particle for use in electrophoretic displays of the invention may have a coating of aluminum oxide and a coating of silicon oxide. The coatings may be added to the particle in any order.

The electrophoretic particle is usually a pigment, a polymer, a laked pigment, or some combination of the above. A neat pigment can be any pigment, and, usually for a light colored particle, pigments such as rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, Hansa yellow, and benzidin yellow have also found use in similar displays. Any other reflective material can be employed for a light colored particle, including non-pigment materials, such as metallic particles.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Black, CBS (E.I. du Pont de Nemours and Company, Inc., Wilmington, Del., hereinafter abbreviated "du Pont"), Crocein Scarlet N Ex (du Pont) (27290), Fiber Black VF (du Pont) (30235), Luxol Fast Black L (du Pont) (Solv. Black 17), Nirosine Base No. 424 (du Pont) (50415 B), Oil Black BG (du Pont) (Solv. Black 16), Rotalin Black RM (du Pont), Sevron Brilliant Red 3 B (du Pont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Black 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Black 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 µm), Statex B-12 (Columbian Carbon Co.) (a furnace black of 33 µm average particle size), and chrome green.

Particles may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (CI Pigment Blue 24) and Persian orange (lake of CI Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used. Black particles may also be formed by staining latices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacrylamide, isocyanoethyl methacrylate and N-(isobutoxymethacryl-amide), and optionally including conjugated diene compounds such as diacrylate, triacrylate, dimethylacrylate and trimethacrylate. Black particles may also be formed by a dispersion polymerization technique.

In the systems containing pigments and polymers, the pigments and polymers may form multiple domains within the electrophoretic particle, or be aggregates of smaller pigment/polymer combined particles. Alternatively, a central pigment core may be surrounded by a polymer shell. The pigment, polymer, or both can contain a dye. The optical purpose of the particle may be to scatter light, absorb light, or both. Useful sizes may range from 1 nm up to about 100 µm, as long as the particles are smaller than the bounding capsule. The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two grams/milliliter ("g/ml"). This difference is preferably between about zero and about 0.5 g/ml.

Useful polymers for the particles include, but are not limited to: polystyrene, polyethylene, polypropylene, phenolic resins, du Pont Elvax resins (ethylene-vinyl acetate copolymers), polyesters, polyacrylates, polymethacrylates, ethylene acrylic acid or methacrylic acid copolymers (Nucrel Resins du Pont, Primacor Resins Dow Chemical), acrylic copolymers and terpolymers (Elvacite Resins du Pont) and PMMA. Useful materials for homopolymer/pigment phase separation in high shear melt include, but are not limited to, polyethylene, polypropylene, poly(methyl methacrylate), poly(isobutyl methacrylate), polystyrene, polybutadiene, polyisoprene, polyisobutylene, poly(lauryl methacrylate), poly(stearyl methacrylate), poly(isobornyl methacrylate), poly(t-butyl methacrylate), poly(ethyl methacrylate), poly(methyl acrylate), poly(ethyl acrylate), polyacrylonitrile, and copolymers of two or more of these materials. Some useful pigment/polymer complexes that are commercially available include, but are not limited to, Process Magenta PM 1776 (Magruder Color Company, Inc., Elizabeth, N.J.), Methyl Violet PMA VM6223 (Magruder Color Company, Inc., Elizabeth, N.J.), and Naphthol FGR RF6257 (Magruder Color Company, Inc., Elizabeth, N.J.).

The pigment-polymer composite may be formed by a physical process, (e.g., attrition or ball milling), a chemical process (e.g., microencapsulation or dispersion polymerization), or any other process known in the art of particle production. For example, the processes and materials for both the fabrication of liquid toner particles and the charging of those particles may be relevant.

New and useful electrophoretic particles may still be discovered, but a number of particles already known to those skilled in the art of electrophoretic displays and liquid toners can also prove useful. In general, the polymer requirements for liquid toners and encapsulated electrophoretic inks are similar, in that the pigment or dye must be easily incorporated therein, either by a physical, chemical, or physicochemical process, may aid in the colloidal stability, and may contain charging sites or may be able to incorporate materials which contain charging sites. One general requirement from the liquid toner industry that is not shared by encapsulated electrophoretic inks is that the toner must be capable of "fixing" the image, i.e., heat fusing together to create a uniform film after the deposition of the toner particles.

Typical manufacturing techniques for particles may be drawn from the liquid toner and other arts and include ball milling, attrition, jet milling, etc. The process will be illustrated for the case of a pigmented polymeric particle. In such a case the pigment is compounded in the polymer, usually in some kind of high shear mechanism such as a screw extruder. The composite material is then (wet or dry) ground to a starting size of around 10 μm. It is then dispersed in a carrier liquid, for example ISOPAR® (Exxon, Houston, Tex.), optionally with some charge control agent(s), and milled under high shear for several hours down to a final particle size and/or size distribution.

Another manufacturing technique for particles is to add the polymer, pigment, and suspending fluid to a media mill. The mill is started and simultaneously heated to a temperature at which the polymer swells substantially with the solvent. This temperature is typically near 100° C. In this state, the pigment is easily encapsulated into the swollen polymer. After a suitable time, typically a few hours, the mill is gradually cooled back to ambient temperature while stirring. The milling may be continued for some time to achieve a small enough particle size, typically a few microns in diameter. The charging agents may be added at this time. Optionally, more suspending fluid may be added.

Chemical processes such as dispersion polymerization, mini- or micro-emulsion polymerization, suspension polymerization precipitation, phase separation, solvent evaporation, in situ polymerization, seeded emulsion polymerization, or any process which falls under the general category of microencapsulation may be used. A typical process of this type is a phase separation process wherein a dissolved polymeric material is precipitated out of solution onto a dispersed pigment surface through solvent dilution, evaporation, or a thermal change. Other processes include chemical means for staining polymeric latices, for example with metal oxides or dyes.

B. Suspending Fluid

The suspending fluid containing the particles can be chosen based on properties such as density, refractive index, and solubility. A preferred suspending fluid has a low dielectric constant (about 2), high volume resistivity (about $10^{15}$ ohm-cm), low viscosity (less than 5 centistokes ("cst")), low toxicity and environmental impact, low water solubility (less than 10 parts per million ("ppm")), high specific gravity (greater than 1.5), a high boiling point (greater than 90° C.), and a low refractive index (less than 1.2).

The choice of suspending fluid may be based on concerns of chemical inertness, density matching to the electrophoretic particle, or chemical compatibility with both the electrophoretic particle and bounding capsule. The viscosity of the fluid should be low when movement of the particles is desired. The refractive index of the suspending fluid may also be substantially matched to that of the particles. As used herein, the refractive index of a suspending fluid is substantially matched to that of a particle if the difference between their respective refractive indices is between about zero and about 0.3, and is preferably between about 0.05 and about 0.2.

Additionally, the fluid may be chosen to be a poor solvent for some polymers, which is advantageous for use in the fabrication of microparticles, because it increases the range of polymeric materials useful in fabricating particles of polymers and pigments. Organic solvents, such as halogenated organic solvents, saturated linear or branched hydrocarbons, silicone oils, and low molecular weight halogen-containing polymers are some useful suspending fluids. The suspending fluid may comprise a single fluid. The fluid will, however, often be a blend of more than one fluid in order to tune its chemical and physical properties. Furthermore, the fluid may contain surface modifiers to modify the surface energy or charge of the electrophoretic particle or bounding capsule. Reactants or solvents for the microencapsulation process (oil soluble monomers, for example) can also be contained in the suspending fluid. Charge control agents can also be added to the suspending fluid.

Useful organic solvents include, but are not limited to, epoxides, such as decane epoxide and dodecane epoxide; vinyl ethers, such as cyclohexyl vinyl ether and Decave® (International Flavors & Fragrances, Inc., New York, N.Y.); and aromatic hydrocarbons, such as toluene and naphthalene. Useful halogenated organic solvents include, but are not limited to, tetrafluorodibromoethylene, tetrachloroethylene, trifluorochloroethylene, 1,2,4-trichlorobenzene and carbon tetrachloride. These materials have high densities. Useful hydrocarbons include, but are not limited to, dodecane, tetradecane, the aliphatic hydrocarbons in the Isopar® series (Exxon, Houston, Tex.), Norpar® (a series of normal paraffinic liquids), Shell-Sol® (Shell, Houston, Tex.), and Sol-Trol® (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated Hydrocarbon Inc., River Edge, N.J.), Galden® (a perfluorinated ether from Ausimont, Morristown, N.J.), or Krytox® from du Pont (Wilmington, Del.). In a preferred embodiment, the suspending fluid is a poly (chlorotrifluoroethylene) polymer. In a particularly preferred embodiment, this polymer has a degree of polymerization from about 2 to about 10. Many of the above materials are available in a range of viscosities, densities, and boiling points.

The fluid must be capable of being formed into small droplets prior to a capsule being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets in the case of an emulsion type encapsulation. One surfactant for use in displays of the invention is sodium dodecylsulfate.

It can be advantageous in some displays for the suspending fluid to contain an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the bounding shell.

There are many dyes that can be used in encapsulated electrophoretic displays. Properties important here include light fastness, solubility in the suspending liquid, color, and cost. These dyes are generally chosen from the classes of azo, anthraquinone, and triphenylmethane type dyes and may be chemically modified so as to increase their solubility in the oil phase and reduce their adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O.

C. Charge Control Agents and Particle Stabilizers

Charge control agents are used to provide good electrophoretic mobility to the electrophoretic particles. Stabilizers are used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be a single pure compound or a mixture. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. The charging properties of the pigment itself may be accounted for by taking into account the acidic or basic surface properties of the pigment, or the charging sites may take place on the carrier resin surface (if present), or a combination of the two. Additional pigment properties which may be relevant are the particle size distribution, the chemical composition, and the lightfastness.

Charge adjuvants may also be added. These materials increase the effectiveness of the charge control agents or charge directors. The charge adjuvant may be a polyhydroxy compound or an aminoalcohol compound, and is preferably soluble in the suspending fluid in an amount of at least 2% by weight. Examples of polyhydroxy compounds which contain at least two hydroxyl groups include, but are not limited to, ethylene glycol, 2,4,7,9-tetramethyldecyne-4,7-diol, poly (propylene glycol), pentaethylene glycol, tripropylene glycol, triethylene glycol, glycerol, pentaerythritol, glycerol tris (12-hydroxystearate), propylene glycerol monohydroxystearate, and ethylene glycol monohydroxystearate. Examples of aminoalcohol compounds which contain at least one alcohol function and one amine function in the same molecule include, but are not limited to, triisopropanolamine, triethanolamine, ethanolamine, 3-o-aminophenol, 5-amino-1-pentanol, and tetrakis(2-hydroxy). The charge adjuvant is preferably present in the suspending fluid in an amount of about 1 to about 100 milligrams per gram ("mg/g") of the particle mass, and more preferably about 50 to about 200 mg/g.

The surface of the particle may also be chemically modified to aid dispersion, to improve surface charge, and to improve the stability of the dispersion, for example. Surface modifiers include organic siloxanes, organohalogen silanes and other functional silane coupling agents (Dow Corning® Z-6070, Z-6124, and 3 additive, Midland, Mich.); organic titanates and zirconates (Tyzor® TOT, TBT, and TE Series, du Pont); hydrophobing agents, such as long chain ($C_{12}$ to $C_{50}$) alkyl and alkyl benzene sulphonic acids, fatty amines or diamines and their salts or quaternary derivatives; and amphipathic polymers which can be covalently bonded to the particle surface.

In general, it is believed that charging results as an acid-base reaction between some moiety present in the continuous phase and the particle surface. Thus useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethylhexyl) sulfosuccinate, calcium dodecylbenzenesulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulfate. Useful metal soaps include, but are not limited to, basic or neutral barium petronate, calcium petronate, Co-, Ca-, Cu-, Mn-, Ni-, Zn-, and Fe-salts of naphthenic acid, Ba-, Al-, Zn-, Cu-, Pb-, and Fe-salts of stearic acid, divalent and trivalent metal carboxylates, such as aluminum tristearate, aluminum octanoate, lithium heptanoate, iron stearate, iron distearate, barium stearate, chromium stearate, magnesium octanoate, calcium stearate, iron naphthenate, zinc naphthenate, Mn- and Zn-heptanoate, and Ba-, Al-, Co-, Mn-, and Zn-octanoate. Useful block or comb copolymers include, but are not limited to, AB diblock copolymers of (A) polymers of 2-(N,N-dimethylamino)ethyl methacrylate quaternized with methyl p-toluenesulfonate and (B) poly(2-ethylhexyl methacrylate), and comb graft copolymers with oil soluble tails of poly(12-hydroxystearic acid) and having a molecular weight of about 1800, pendant on an oil-soluble anchor group of poly(methyl methacrylate-methacrylic acid). Useful organic amides include, but are not limited to, polyisobutylene succinimides such as OLOA 1200, and N-vinylpyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents.

Particle dispersion stabilizers may be added to prevent particle flocculation or attachment to the capsule walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

D. Encapsulation

Encapsulation of the internal phase may be accomplished in a number of different ways. Numerous suitable procedures for microencapsulation are detailed in both Microencapsulation, Processes and Applications, (J. E. Vandegaer, ed.), Plenum Press, New York, N.Y. (1974) and Gutcho, Microcapsules and Microencapsulation Techniques, Noyes Data Corp., Park Ridge, N.J. (1976). The processes fall into several general categories, all of which can be applied to the present invention: interfacial polymerization, in situ polymerization, physical processes, such as coextrusion and other phase separation processes, in-liquid curing, and simple/complex coacervation.

Numerous materials and processes should prove useful in formulating displays of the present invention. Useful materials for simple coacervation processes to form the capsule include, but are not limited to, gelatin, poly(vinyl alcohol), poly(vinyl acetate), and cellulosic derivatives, such as, for example, carboxymethylcellulose. Useful materials for complex coacervation processes include, but are not limited to, gelatin, acacia, carageenan, carboxymethylcellulose, hydrolyzed styrene anhydride copolymers, agar, alginate, casein, albumin, methyl vinyl ether co-maleic anhydride, and cellulose phthalate. Useful materials for phase separation processes include, but are not limited to, polystyrene, poly(methyl methacrylate) (PMMA), poly(ethyl methacrylate), poly(butyl methacrylate), ethyl cellulose, poly(vinylpyridine), and polyacrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, methyl methacrylate (MMA) and acrylonitrile. Finally, useful materials for interfacial polymerization processes include, but are not limited to, diacyl chlorides, such as, for example, sebacoyl, adipoyl, and di- or poly-amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

Capsules produced may be dispersed into a curable carrier, resulting in an ink which may be printed or coated on large and arbitrarily shaped or curved surfaces using conventional printing and coating techniques.

In the context of the present invention, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The capsule wall generally has a high electrical resistivity. Although it is possible to use walls with relatively low resistivities, this may limit performance in requiring relatively higher addressing voltages. The capsule wall should also be mechanically strong (although if the finished capsule powder is to be dispersed in a curable polymeric binder for coating, mechanical strength is not as critical). The capsule wall should generally not be porous. If, however, it is desired to use an encapsulation procedure that produces porous capsules, these can be overcoated in a post-processing step (i.e., a second encapsulation). Moreover, if the capsules are to be dispersed in a curable binder, the binder will serve to close the pores. The capsule walls should be optically clear. The wall material may, however, be chosen to match the refractive index of the internal phase of the capsule (i.e., the suspending fluid) or a binder in which the capsules are to be dispersed. For some applications (e.g., interposition between two fixed electrodes), monodispersed capsule radii are desirable.

An encapsulation technique that is suited to the present invention involves a polymerization between urea and formaldehyde in an aqueous phase of an oil/water emulsion in the presence of a negatively charged, carboxyl-substituted, linear hydrocarbon polyelectrolyte material. The resulting capsule wall is a urea/formaldehyde copolymer, which discretely encloses the internal phase. The capsule is clear, mechanically strong, and has good resistivity properties.

The related technique of in situ polymerization utilizes an oil/water emulsion, which is formed by dispersing the electrophoretic fluid (i.e., the dielectric liquid containing a suspension of the pigment particles) in an aqueous environment. The monomers polymerize to form a polymer with higher affinity for the internal phase than for the aqueous phase, thus condensing around the emulsified oily droplets. In one in situ polymerization process, urea and formaldehyde condense in the presence of poly(acrylic acid) (see, e.g., U.S. Pat. No. 4,001,140). In other processes, described in U.S. Pat. No. 4,273,672, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and polyisocyanates.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457.

The interfacial polymerization approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Coating aids can be used to improve the uniformity and quality of the coated or printed electrophoretic ink material. Wetting agents are typically added to adjust the interfacial tension at the coating/substrate interface and to adjust the liquid/air surface tension. Wetting agents include, but are not limited to, anionic and cationic surfactants, and nonionic species, such as silicone or fluoropolymer-based materials. Dispersing agents may be used to modify the interfacial tension between the capsules and binder, providing control over flocculation and particle settling.

Surface tension modifiers can be added to adjust the air/ink interfacial tension. Polysiloxanes are typically used in such an application to improve surface leveling while minimizing other defects within the coating. Surface tension modifiers include, but are not limited to, fluorinated surfactants, such as, for example, the Zonyl® series from du Pont, the Fluorad® series from 3M (St. Paul, Minn.), and the fluoroalkyl series from Autochem (Glen Rock, N.J.); siloxanes, such as, for example, Silwet® from Union Carbide (Danbury, Conn.); and polyethoxy and polypropoxy alcohols. Antifoams, such as silicone and silicone-free polymeric materials, may be added to enhance the movement of air from within the ink to the surface and to facilitate the rupture of bubbles at the coating surface. Other useful antifoams include, but are not limited to, glyceryl esters, polyhydric alcohols, compounded antifoams, such as oil solutions of alkylbenzenes, natural fats, fatty acids, and metallic soaps, and silicone antifoaming agents made from the combination of dimethyl siloxane polymers and silica. Stabilizers such as UV-absorbers and antioxidants may also be added to improve the lifetime of the ink.

E. Binder Material

The binder typically is used as an adhesive medium that supports and protects the capsules, as well as binds the electrode materials to the capsule dispersion. A binder can be non-conducting, semiconductive, or conductive. Binders are available in many forms and chemical types. Among these are water-soluble polymers, water-borne polymers, oil-soluble polymers, thermoset and thermoplastic polymers, and radiation-cured polymers.

Among the water-soluble polymers are the various polysaccharides, the polyvinyl alcohols, N-methylpyrrolidone, N-vinylpyrrolidone, the various Carbowax® species (Union Carbide, Danbury, Conn.), and poly(2-hydroxyethyl acrylate).

The water-dispersed or water-borne systems are generally latex compositions, typified by the Neorez® and Neocryl® resins (Zeneca Resins, Wilmington, Mass.), Acrysol® (Rohm and Haas, Philadelphia, Pa.), Bayhydrol® (Bayer, Pittsburgh, Pa.), and the Cytec Industries (West Paterson, N.J.) HP line. These are generally latices of polyurethanes, occasionally compounded with one or more of the acrylics, polyesters, polycarbonates or silicones, each lending the final cured resin in a specific set of properties defined by glass transition temperature, degree of "tack", softness, clarity, flexibility, water permeability and solvent resistance, elongation modulus and tensile strength, thermoplastic flow, and solids level. Some water-borne systems can be mixed with reactive monomers and catalyzed to form more complex resins. Some can be further cross-linked by the use of a cross-linking reagent, such as an aziridine, for example, which reacts with carboxyl groups.

A typical application of a water-borne resin and aqueous capsules follows. A volume of particles is centrifuged at low speed to separate excess water. After a given centrifugation process, for example 10 minutes at 60×gravity ("g"), the capsules are found at the bottom of the centrifuge tube, while the water portion is at the top. The water portion is carefully removed (by decanting or pipetting). The mass of the remaining capsules is measured, and a mass of resin is added such that the mass of resin is, for example, between one eighth and one tenth of the weight of the capsules. This mixture is gently mixed on an oscillating mixer for approximately one half hour. After about one half hour, the mixture is ready to be coated onto the appropriate substrate.

The thermoset systems are exemplified by the family of epoxies. These binary systems can vary greatly in viscosity, and the reactivity of the pair determines the "pot life" of the mixture. If the pot life is long enough to allow a coating operation, capsules may be coated in an ordered arrangement in a coating process prior to the resin curing and hardening.

Thermoplastic polymers, which are often polyesters, are molten at high temperatures. A typical application of this type of product is hot-melt glue. A dispersion of heat-resistant capsules could be coated in such a medium. The solidification process begins during cooling, and the final hardness, clarity and flexibility are affected by the branching and molecular weight of the polymer.

Oil or solvent-soluble polymers are often similar in composition to the water-borne system, with the obvious exception of the water itself. The latitude in formulation for solvent systems is enormous, limited only by solvent choices and polymer solubility. Of considerable concern in solvent-based systems is the viability of the capsule itself, the integrity of the capsule wall cannot be compromised in any way by the solvent.

Radiation cure resins are generally found among the solvent-based systems. Capsules may be dispersed in such a medium and coated, and the resin may then be cured by a timed exposure to a threshold level of ultraviolet radiation, either long or short wavelength. As in all cases of curing polymer resins, final properties are determined by the branching and molecular weights of the monomers, oligomers and cross-linkers.

A number of "water-reducible" monomers and oligomers are, however, marketed. In the strictest sense, they are not water soluble, but water is an acceptable diluent at low concentrations and can be dispersed relatively easily in the mixture. Under these circumstances, water is used to reduce the viscosity (initially from thousands to hundreds of thousands centipoise). Water-based capsules, such as those made from a protein or polysaccharide material, for example, could be dispersed in such a medium and coated, provided the viscosity could be sufficiently lowered. Curing in such systems is generally by ultraviolet radiation.

Like other encapsulated electrophoretic displays, the encapsulated electrophoretic displays of the present invention provide flexible, reflective displays that can be manufactured easily and consume little power (or no power in the case of bistable displays in certain states). Such displays, therefore, can be incorporated into a variety of applications and can take on many forms. Once the electric field is removed, the electrophoretic particles can be generally stable. Additionally, providing a subsequent electric charge can alter a prior configuration of particles. Such displays may include, for example, a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. Alternatively or in addition, the particles may have a refractive index that substantially matches the refractive index of the suspending fluid.

An encapsulated electrophoretic display may take many forms. The capsules of such a display may be of any size or shape. The capsules may, for example, be spherical and may have diameters in the millimeter range or the micron range, but are preferably from about ten to about a few hundred microns. The particles within the capsules of such a display may be colored, luminescent, light-absorbing or transparent, for example.

From the foregoing description, it will be seen that the present invention can provide a substantial increase in the stability of images produced by electrophoretic displays, thus increasing the utility of such displays, especially in applications such as portable devices in which reducing the energy consumption of the display is of great importance. Furthermore, preferred variants of the present invention allow this increase in image stability to be achieved using inexpensive, non-toxic materials which are readily available commercially.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense, the invention being defined solely by the appended claims.

The invention claimed is:

1. An electrophoretic medium comprising a plurality of at least one type of electrophoretic particle suspended in a suspending fluid and capable of moving therethrough upon application of an electric field to the electrophoretic medium, such that, when application of a specific electric field to the medium for time T suffices to switch the medium between its extreme optical states, variations in the time of application of this specific electric field within the range of 0.9 to 1.1 T will not change the optical properties of either extreme state of the electrophoretic medium by more than 2 units of $L^*$, where $L^*$ has the definition: $L^*=116(R/R_0)^{1/3}-16$, where R is the reflectance and $R_0$ is a standard reflectance value.

2. An electrophoretic medium according to claim 1 such that variations in the time of application of this specific electric field within the range of 0.8 to 1.2 T will not change the optical properties of either extreme state of the electrophoretic medium by more than 2 units of $L^*$.

3. A electrophoretic medium according to claim 1 comprising a single type of electrophoretic particle in a colored suspending fluid.

4. A electrophoretic medium according to claim 1 comprising a first type of electrophoretic particle having a first optical characteristic and a first electrophoretic mobility and a second type of electrophoretic particle having a second optical characteristic different from the first optical characteristic and a second electrophoretic mobility different from the first electrophoretic mobility.

5. A electrophoretic medium according to claim 4 wherein the suspending fluid is uncolored.

6. A electrophoretic medium according to claim 1 wherein the electrophoretic particles and the suspending fluid are retained within a plurality of cavities formed within a carrier medium.

7. A electrophoretic medium according to claim 1 wherein the electrophoretic particles and the suspending fluid are held within a plurality of capsules.

8. An electrophoretic medium according to claim 1 wherein the electrophoretic particles comprise titania.

9. An electrophoretic medium according to claim 8 wherein the electrophoretic particles further comprise dark colored particles formed from carbon black or copper chromite, the dark colored particles formed from carbon black or copper chromite and having an electrophoretic mobility different from the electrophoretic mobility of the titania particles.

10. An electrophoretic medium according to claim 1 wherein the volume fraction of electrophoretic particles in the internal phase is from about 3 to about 40 percent.

11. An electrophoretic medium according to claim 10 wherein the volume fraction of electrophoretic particles in the internal phase is from about 6 to about 18 percent.

12. An electrophoretic medium according to claim 1 wherein the viscosity of the internal phase is less than about 5 mPa sec.

13. An electrophoretic medium according to claim 12 wherein the viscosity of the internal phase is greater than about 1 mPa sec.

14. An electrophoretic medium according to claim 1 wherein the suspending fluid has dissolved or dispersed therein a polymer having a number average molecular weight in excess of about 20,000, the polymer being essentially non-absorbing on the electrophoretic particles.

15. An electrophoretic medium according to claim 14 wherein the suspending fluid is a hydrocarbon, and the polymer is a polyisobutylene having a viscosity average molecular weight in the range of about 400,000 to 1,200,000 g/mole, the polyisobutylene comprising from about 0.25 to about 2.5 percent by weight of the suspending fluid.

16. An electrophoretic medium according to claim 1 wherein the suspending fluid has dissolved or dispersed therein a polymer having an intrinsic viscosity of $\eta$ in the suspending fluid and being substantially free from ionic or ionizable groups in the suspending fluid, the polymer being present in the suspending fluid in a concentration of from about $0.5\ [\eta]^{-1}$ to about $2.0\ [\eta]^{-1}$.

17. An electrophoretic display comprising an electrophoretic medium according to claim 1 and at least one electrode disposed adjacent the electrophoretic medium and arranged to apply an electric field thereto.

18. An electrophoretic display according to claim 17 having a first optical state in which the display displays an optical characteristic of the one type of electrophoretic particle and a second optical state in which the electrophoretic medium is light-transmissive.

19. An electrophoretic display according to claim 18 wherein, in the light-transmissive optical state, the electrophoretic particles are confined in a minor proportion of the cross-sectional area of each microcavity.

20. An electrophoretic display according to claim 18 comprising a backplane comprising a plurality of pixel electrodes, and a color filter or reflector, the color filter or reflector being disposed between the backplane and the electrophoretic medium.

* * * * *